(12) United States Patent
Matsuda et al.

(10) Patent No.: US 12,101,676 B2
(45) Date of Patent: *Sep. 24, 2024

(54) COMMUNICATION APPARATUS, BASE STATION APPARATUS, COMMUNICATION METHOD, AND COMMUNICATION SYSTEM

(71) Applicant: SONY GROUP CORPORATION, Tokyo (JP)

(72) Inventors: Hiroki Matsuda, Tokyo (JP); Naoki Kusashima, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,569

(22) Filed: Nov. 11, 2022

(65) Prior Publication Data

US 2023/0070647 A1 Mar. 9, 2023

Related U.S. Application Data

(63) Continuation of application No. 17/042,090, filed as application No. PCT/JP2019/008306 on Mar. 4, 2019, now Pat. No. 11,516,715.

(30) Foreign Application Priority Data

Apr. 4, 2018 (JP) .................................. 2018-072637

(51) Int. Cl.
*H04W 36/08* (2009.01)
*H04W 36/00* (2009.01)
(52) U.S. Cl.
CPC ....... *H04W 36/08* (2013.01); *H04W 36/0055* (2013.01)

(58) Field of Classification Search
CPC . H04B 7/02; H04B 7/024; H04B 7/04; H04B 7/0404; H04B 7/0408;
(Continued)

(56) References Cited

U.S. PATENT DOCUMENTS 6,512,920 B1* 1/2003 Yaoya ................ H04B 7/18541
455/427
8,831,610 B2 9/2014 Ninagawa
(Continued)

FOREIGN PATENT DOCUMENTS

CN 101635968 A 1/2010
CN 105228200 A 1/2016
(Continued)

OTHER PUBLICATIONS

International Search Report and Written Opinion of PCT Application No. PCT/JP2019/008306, issued on May 28, 2019, 09 pages of English Translation and 08 pages of ISRWO.
(Continued)

*Primary Examiner* — Siu M Lee
(74) *Attorney, Agent, or Firm* — CHIP LAW GROUP

(57) ABSTRACT

A communication apparatus includes an acquisition unit to acquire, from a base station apparatus being connected, switching information including information used for wireless communication with a movably configured base station apparatus to be a switching destination candidate, a determination unit configured to determine whether or not to switch a base station apparatus to be a connection destination, and a connection unit configured to, upon determining by the determination unit to switch the base station apparatus to be the connection destination, execute connection to the base station apparatus to be the switching destination candidate on a basis of the switching information.

12 Claims, 18 Drawing Sheets

(58) Field of Classification Search
CPC .. H04B 7/0413; H04B 7/0608; H04B 7/0613; H04B 7/0617; H04B 7/0626; H04B 7/0628; H04B 7/0696; H04B 7/088; H04W 36/0055; H04W 36/0072; H04W 36/08; H04W 84/005; H04W 84/06; H04W 48/12

See application file for complete search history.

(56) References Cited

U.S. PATENT DOCUMENTS

| | | | | |
|---|---|---|---|---|
| 10,721,658 | B2 * | 7/2020 | Zhang | H04W 36/0038 |
| 11,057,814 | B2 * | 7/2021 | Zhang | H04W 36/0022 |
| 11,516,715 | B2 * | 11/2022 | Matsuda | H04W 36/0072 |
| 2011/0159874 | A1 | 6/2011 | Ninagawa | |
| 2016/0100374 | A1 * | 4/2016 | Choi | H04W 36/04 370/331 |
| 2018/0091567 | A1 | 3/2018 | Bekiares et al. | |
| 2020/0178137 | A1 * | 6/2020 | Hassan Hussein | H04B 7/18541 |
| 2021/0099929 | A1 | 4/2021 | Yadhav et al. | |

FOREIGN PATENT DOCUMENTS

| | | |
|---|---|---|
| CN | 105264978 A | 1/2016 |
| CN | 107371210 A | 11/2017 |
| EP | 3007498 A1 | 4/2016 |
| JP | 2002159055 A | 5/2002 |
| JP | 2006109516 A | 4/2006 |
| JP | 2010-056857 A | 3/2010 |
| JP | 5182369 B2 | 4/2013 |
| JP | 2016-523479 A | 8/2016 |
| JP | 2017-221278 A | 12/2017 |
| JP | 2018-033089 A | 3/2018 |
| KR | 10-2011-0041571 A | 4/2011 |
| KR | 10-2016-0015208 A | 2/2016 |
| WO | 2010/024410 A1 | 3/2010 |
| WO | 2014/196748 A1 | 12/2014 |

OTHER PUBLICATIONS

International Preliminary Report on Patentability of PCT Application No. PCT/JP2019/008306, issued on Oct. 15, 2020, 10 pages of English Translation and 05 pages of IPRP.

Non-Final Office Action for U.S. Appl. No. 17/042,090, issued on Nov. 10, 2021, 29 pages.

Final Office Action for U.S. Appl. No. 17/042,090, issued on Apr. 15, 2022, 38 pages.

Advisory Office Action for U.S. Appl. No. 17/042,090, issued on Jun. 22, 2022, 03 pages.

Notice of Allowance for U.S. Appl. No. 17/042,090, issued on Aug. 2, 2022, 10 pages.

Notice of Allowance for U.S. Appl. No. 17/042,090, issued on Oct. 26, 2022, 02 pages.

* cited by examiner

COMMUNICATION APPARATUS, BASE STATION APPARATUS, COMMUNICATION METHOD, AND COMMUNICATION SYSTEM

This application is a continuation application of U.S. patent application Ser. No. 17/042,090 filed on Sep. 25, 2020, which is a U.S. National Phase of International Patent Application No. PCT/JP2019/008306 filed on Mar. 4, 2019, which claims priority benefit of Japanese Patent Application No. JP 2018-072637 filed in the Japan Patent Office on Apr. 4, 2018. Each of the above-referenced applications is hereby incorporated herein by reference in its entirety.

FIELD

The present disclosure relates to a communication apparatus, a base station apparatus, a communication method, a communication program, and a communication system. Specifically, it relates to switching between base station apparatuses as a connection destination.

BACKGROUND

Mobile communications using radio access technology such as cellular communication technology are known. In such radio access technology, with the movement of a communication apparatus such as cellular phones, the switching is performed between wireless base stations to be a connection destination of the communication apparatus (hereinafter simply referred to as a base station).

CITATION LIST

Patent Literature

Patent Literature 1: JP 5182369 B2

SUMMARY

Technical Problem

In cases such as where a base station or a communication apparatus moves at high speed, where the base station is located far away from the communication apparatus, or the like, the above-mentioned technology in the related art, however, does not necessarily achieve high-quality communication. In one example, a non-terrestrial network is assumed in which a satellite station is used as a base station. In this case, the communication apparatus performs satellite communication with the satellite station, but the satellite station orbits around the earth at high speed, so the relative speed between the base station and the communication apparatus is assumed to be high. In addition, the satellite station is located in space, so the distance between the base station and the communication apparatus is assumed to be large. Thus, if the base station or the communication apparatus is moving at high speed or if the base station is located far away from the communication apparatus, it is assumed that a high possibility that the switching between base stations occurs frequently or the switching between base stations is failed. In this case, there is a risk that the quality of communication is low.

Thus, the present disclosure provides a communication apparatus, base station apparatus, communication method, communication program, and communication system, capable of achieving high-quality communication.

Solution to Problem

To solve the problem described above, a communication apparatus includes: an acquisition unit configured to acquire, from a base station apparatus being connected, switching information including information used for wireless communication with a movably configured base station apparatus to be a switching destination candidate; a determination unit configured to determine whether or not to switch a base station apparatus to be a connection destination; and a connection unit configured to, upon determining by the determination unit to switch the base station apparatus to be the connection destination, execute connection to the base station apparatus to be the switching destination candidate on a basis of the switching information.

(Operation) In the communication apparatus according to an embodiment of the present disclosure, the acquisition unit acquires the switching information from the connected base station apparatus. Then, the determination unit determines whether or not to switch the base station apparatus as a connection destination. The communication apparatus has a connection unit that connects to the base station apparatus to be a switching destination candidate on the basis of the switching information acquired by the acquisition unit. Thus, it is possible to execute connection to the base station apparatus as a switching destination candidate on the basis of the determination of the communication apparatus itself, regardless of whether or not an instruction to switch the connection destination is received from the base station apparatus as the connection destination.

Advantageous Effects of Invention

According to the present disclosure, it is possible to achieve high-quality communication. Note that the advantageous effects described here are not necessarily limitative, and any of the advantageous effects described in the present disclosure may be attained.

DESCRIPTION OF EMBODIMENTS

Figure 1:
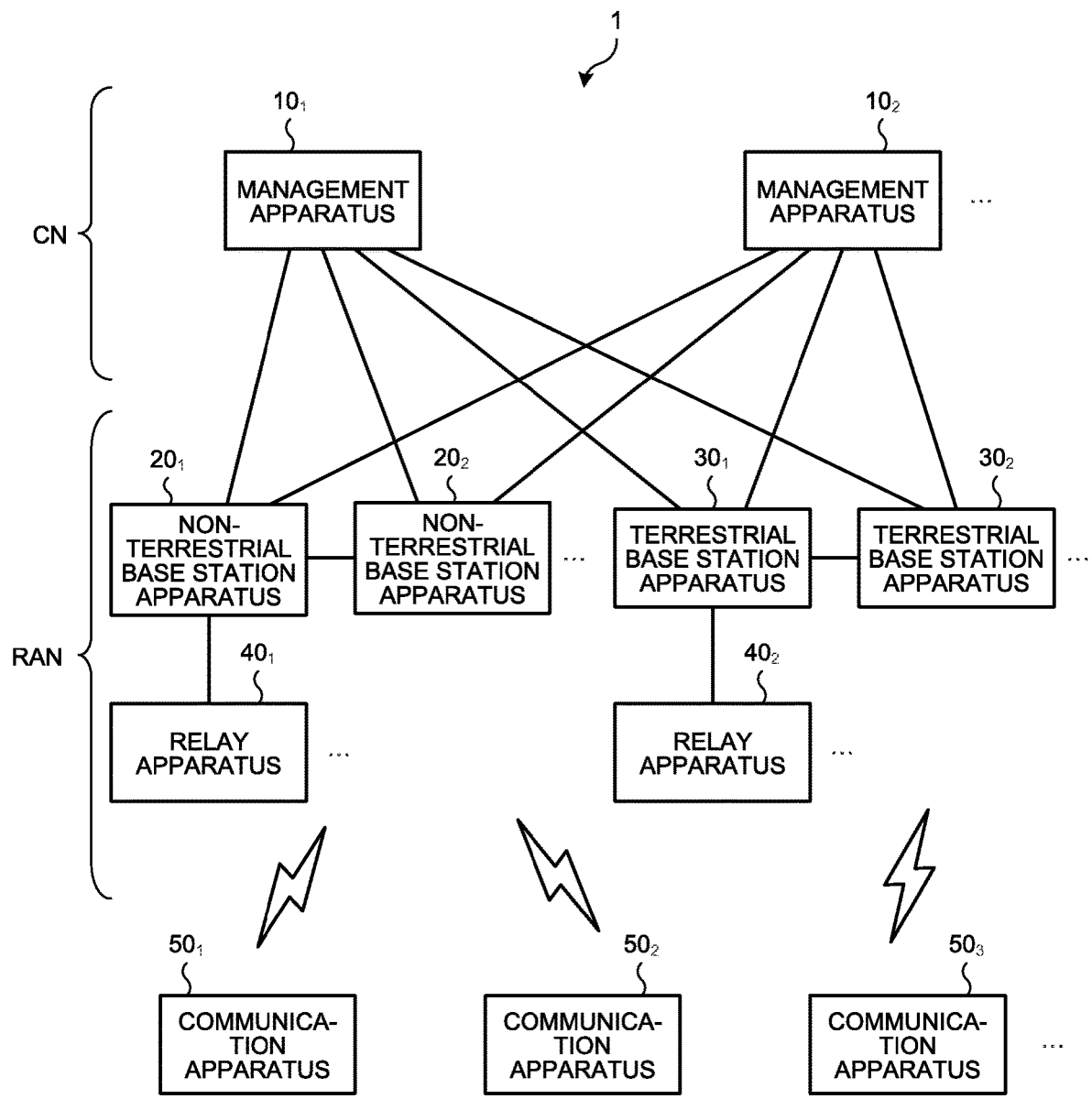
FIG. 1 is a diagram illustrating a configuration example of a communication system according to a first embodiment of the present disclosure.

Embodiments of the present disclosure will be described below in detail with reference to the drawings. In each of the following embodiments, the same parts are denoted by the same reference symbols, and a repetitive description thereof will be omitted.

Further, in the present specification and the drawings, a plurality of components having substantially the same functional configuration is distinguished by attaching different numbers after the same reference numeral in some cases. In one example, a plurality of components having substantially the same functional configuration is distinguished, like communication apparatuses $50_1$, $50_2$, and $50_3$, as necessary. Unless, however, it is necessary to particularly distinguish each of the plurality of components having substantially the same functional configuration, it is only to attach the same reference numeral. In one example, communication apparatuses $50_1$, $50_2$, and $50_3$ are simply referred to as communication apparatus 50 unless it is not particularly necessary to distinguish them.

Further, the present disclosure is described in the order of items given below.

1. Introduction
2. First Embodiment
2-1. Overall configuration of communication system
2-2. Configuration of management apparatus
2-3. Configuration of base station apparatus
2-4. Configuration of relay apparatus
2-5. Configuration of communication apparatus
2-6. Initial connection process
2-7. Random access procedure
2-8. Handover
2-9. Handover process (with handover command)
2-10. Handover process (without handover command)
2-11. Switching information transmission process
3. Second Embodiment
3-1. Configuration of communication system
3-2. Handover process (RACH-less)
4. Third Embodiment
4-1. Configuration of communication system
4-2. Handover process (other examples)
5. Modifications
5-1. Modification regarding system configuration
5-2. Modification regarding switching information
5-3. Modification regarding transmission timing of switching information
5-4. Other modifications
6. Concluding remarks 1. Introduction Radio access technologies such as long-term evolution (LTE) and new radio (NR) are considered by the 3rd generation partnership project (3GPP). LTE and NR are types of cellular communication technologies and enable mobile communication of terminal equipment by arranging a plurality of areas covered by a base station in a cell form. Moreover, the term of "LTE" as used herein includes LTE-advanced (LTE-A), LTE-advanced pro (LTE-A Pro), and evolved-universal terrestrial radio access (EUTRA). In addition, the term of "NR" as used herein includes new radio access technology (NRAT) and further-EUTRA (FEUTRA).

NR is the next-generation (fifth generation) radio access technology (RAT) of LTE. NR is the radio access technology capable of supporting various use cases including enhanced mobile broadband (eMBB), massive machine-type communications (mMTC), and ultra-reliable and low-latency communications (URLLC). NR is considered to build a technical framework that meets usage scenarios, requirements, deployment scenarios, or the like in these use cases.

Furthermore, in NR, studies on non-terrestrial network (NTN) have begun due to growing demands for wide-area coverage, connection stability, or the like. In the non-terrestrial network, the wireless network is planned to be provided for the terminal equipment via a base station other than a terrestrial station, such as satellite stations or aircraft stations. The base station other than the terrestrial stations is called a non-terrestrial station or a non-terrestrial base station. The wireless network provided by the terrestrial station is called a terrestrial network (TN). The use of the same radio access scheme for both terrestrial network and non-terrestrial network enables the integrated operations of the terrestrial network and the non-terrestrial network.

Moreover, in embodiments of the present disclosure, the terrestrial station (also referred to as a ground base station) refers to a base station (including a relay station) installed on the ground. The term "ground" refers to not only the ground (land), but also the ground in the broad sense including underground, over-water, and under-water.

2. First Embodiment

A communication system 1 according to a first embodiment is now described. The communication system 1 includes a non-terrestrial base station and provides wireless communication using a non-terrestrial network for communication apparatus. Moreover, the non-terrestrial network provided in the communication system 1 is not limited to wireless networks using the radio access scheme specified by NR. The non-terrestrial network included in the communication system 1 can be wireless networks of the radio access scheme other than NR, such as LTE, wideband code division multiple access (W-CDMA), and code division multiple access 2000 (cdma2000).

Moreover, the following description is given on the assumption that the concept of a base station (hereinafter also referred to as a base station apparatus) includes a relay station (hereinafter also referred to as relay apparatus). In addition, the concept of the base station includes not only a structure equipped with functions of the base station but also a device installed in the structure. The structure is, in one example, buildings such as tower buildings, houses, steel towers, railway station facilities, airport facilities, harbor facilities, and stadiums. Moreover, the concept of a structure includes not only buildings but also non-building structures such as tunnels, bridges, dams, fences, and steel columns, or also includes facilities such as cranes, gates, and windmills. In addition, the concept of a structure includes not only structures on the ground (land) or structures under the ground but also structures on the water such as piers and mega-floats (very large floating structures) or structures underwater such as ocean observation facilities.

Further, the base station apparatus can be a base station apparatus configured to be movable. In one example, the base station apparatus can be a device installed in a moving body or the moving body itself. The moving body can be a mobile terminal such as smartphones, a moving body that moves on the ground (land) (e.g., a vehicle such as automobiles, buses, trucks, trains, and linear motor cars), or a moving body that moves under (e.g., in a tunnel) the ground (e.g., a subway). In addition, the moving body can be a moving object that moves on water (e.g., a ship such as passenger ships, cargo ships, and hovercrafts), or a moving body that moves underwater (e.g., a submersible ship such as submersible vessels, submarines, and unmanned submarines). In addition, the moving body can be a moving object that moves in the atmosphere (e.g., an aircraft such as airplanes, airships, and drones), or a space moving body that moves outside the atmosphere (e.g., artificial celestial bodies such as artificial satellites, spacecraft, space stations, and space probes).

Moreover, the LTE base station is sometimes referred to as evolved Node B (eNodeB) or eNB. In addition, the NR base station is sometimes referred to as gNodeB or gNB. In addition, in LTE and NR, terminal equipment (also referred to as a mobile station, mobile station equipment, or a terminal) is sometimes referred to as user equipment (UE). Moreover, the terminal equipment is a type of communication apparatus and is also referred to as a mobile station, mobile station equipment, or a terminal. In an embodiment of the present disclosure, the concept of a communication apparatus includes not only portable terminal equipment such as mobile terminal but also a device installed in, in one example, a structure or a moving body. In addition, the concept of a communication apparatus includes not only terminal equipment but also a base station apparatus and a relay apparatus.

[2-1. Overall Configuration of Communication System]

FIG. 1 is a diagram illustrating an exemplary configuration of the communication system 1 according to the first embodiment of the present disclosure. The communication system 1 includes a management apparatus 10, a non-terrestrial base station apparatus 20, a terrestrial base station apparatus 30, a relay apparatus 40, and a communication apparatus 50. The communication system 1 provides a user with a wireless network that allows mobile communication, by operating each wireless communication apparatus constituting the communication system 1 in cooperation with each other. The wireless communication apparatus is a device having a wireless communication function and corresponds to the non-terrestrial base station apparatus 20, the terrestrial base station apparatus 30, the relay apparatus 40, and the communication apparatus 50 in the example of FIG. 1.

The communication system 1 can include a plurality of management apparatuses 10, a plurality of non-terrestrial base station apparatuses 20, a plurality of terrestrial base station apparatuses 30, a plurality of relay apparatuses 40, and a plurality of communication apparatuses 50. In the example of FIG. 1, the communication system 1 includes management apparatuses $10_1$, $10_2$, or the like, as the management apparatus 10. In addition, the communication system 1 includes non-terrestrial base station apparatuses $20_1$, $20_2$, or the like as the non-terrestrial base station apparatus 20, and includes terrestrial base station apparatuses $30_1$, $30_2$, or the like as the terrestrial base station apparatus 30. In addition, the communication system 1 includes relay apparatuses $40_1$, $40_2$, or the like as the relay apparatus 40 and includes communication apparatuses $50_1$, $50_2$, $50_3$, or the like as the communication apparatus 50.

The management apparatus 10 is a device that manages a wireless network. In one example, the management apparatus 10 is a device that functions as a mobility management entity (MME) or an access and mobility management function (AMF). The management apparatus 10 constitutes a core network (CN). The core network (CN) is, in one example, an evolved packet core (EPC) or a 5G core network (5GC). The management apparatuses 10 are connected individually to the plurality of non-terrestrial base station apparatuses 20 and the plurality of terrestrial base station apparatuses 30. The management apparatus 10 manages communication performed by the non-terrestrial base station apparatus 20 and the terrestrial base station apparatus 30.

The non-terrestrial base station apparatus 20 is base station equipment that performs wireless communication with the communication apparatus 50. In the example of FIG. 1, the non-terrestrial base station apparatus $20_1$ is connected to the relay apparatus $40_1$ and is capable of performing wireless communication with the communication apparatus 50 via the relay apparatus $40_1$. In the present embodiment, the non-terrestrial base station apparatus 20 is the base station equipment capable of floating in the air or space. In one example, the non-terrestrial base station apparatus 20 is the non-terrestrial station equipment such as aircraft station equipment and satellite station equipment.

The aircraft station equipment is a wireless communication apparatus capable of floating in the atmosphere, such as aircrafts. The aircraft station equipment can be a device mounted on an aircraft or the like or the aircraft itself. Moreover, the concept of an aircraft includes not only heavy aircraft such as airplanes and gliders but also light aircraft such as balloons and airships. In addition, the concept of an aircraft includes not only heavy aircraft and light aircraft but also a rotorcraft such as helicopters and autogyros. Moreover, the aircraft station equipment (or the aircraft on which the aircraft station equipment is mounted) can be an unmanned aerial vehicle such as drones. Moreover, the concept of unmanned aerial vehicles also includes unmanned aircraft systems (UAS) and tethered unmanned aerial systems (tethered UAS). In addition, the concept of unmanned aerial vehicles includes lighter-than-air (LTA) UAS and heavier-than-air (HTA) UAS. In addition, the concept of unmanned aerial vehicles also includes high-altitude UAS platforms (HAPs).

The satellite station equipment is a wireless communication apparatus capable of floating outside the atmosphere. The satellite station equipment can be a device mounted on a space vehicle such as artificial satellites or the space vehicle itself. The satellite acting as the satellite station can be any of low earth orbit (LEO) satellites, medium earth orbit (MEO) satellites, geostationary earth orbit (GEO) satellites, and highly elliptical orbit (HEO) satellites. The satellite station equipment can understandably be a device mounted on the low earth orbit satellite, medium earth orbit satellite, geostationary earth orbit satellite, or highly elliptical orbit satellite.

The terrestrial base station apparatus 30 is base station equipment that performs wireless communication with the communication apparatus 50. In the example of FIG. 1, the terrestrial base station apparatus $30_1$ is connected to the relay apparatus $40_2$ and is capable of performing wireless communication with the communication apparatus 50 via the relay apparatus $40_2$. The terrestrial base station apparatus 30 can be base station equipment arranged in a structure on the ground or base station equipment installed in a moving body that moves on the ground. In one example, the terrestrial base station apparatus 30 is an antenna installed in a structure such as buildings and a signal-processing device connected to the antenna. The terrestrial base station apparatus 30 can understandably be a structure or a moving body itself.

The relay apparatus 40 is a device that functions as a relay station for the base station. The relay apparatus 40 is a type of a base station apparatus. The relay apparatus 40 relays communication between the non-terrestrial base station apparatus 20 and the communication apparatus 50 or relays communication between the terrestrial base station apparatus 30 and the communication apparatus 50. The relay apparatus 40 can be terrestrial station equipment or non-terrestrial station equipment. The relay apparatus 40 constitutes the radio access network (RAN) together with the non-terrestrial base station apparatus 20 and the terrestrial base station apparatus 30.

The communication apparatus 50 is, in one example, a mobile phone, a smart device (smartphone or tablet), a personal digital assistant (PDA), or a personal computer. In addition, the communication apparatus 50 can be a machine-to-machine (M2M) device or an Internet of things (IoT) device. In addition, the communication apparatus 50 can be a wireless communication apparatus installed in a moving body or the moving body itself. Moreover, the communication apparatus 50 can be relay station equipment that relays satellite communication or the base station apparatus that receives satellite communication. The communication apparatus 50 is compatible with both the terrestrial network and the non-terrestrial network. Thus, the communication apparatus 50 is capable of communicating not only with terrestrial station equipment such as the terrestrial base station apparatus 30 but also with non-terrestrial station equipment such as the non-terrestrial base station apparatus 20.

Figure 2:
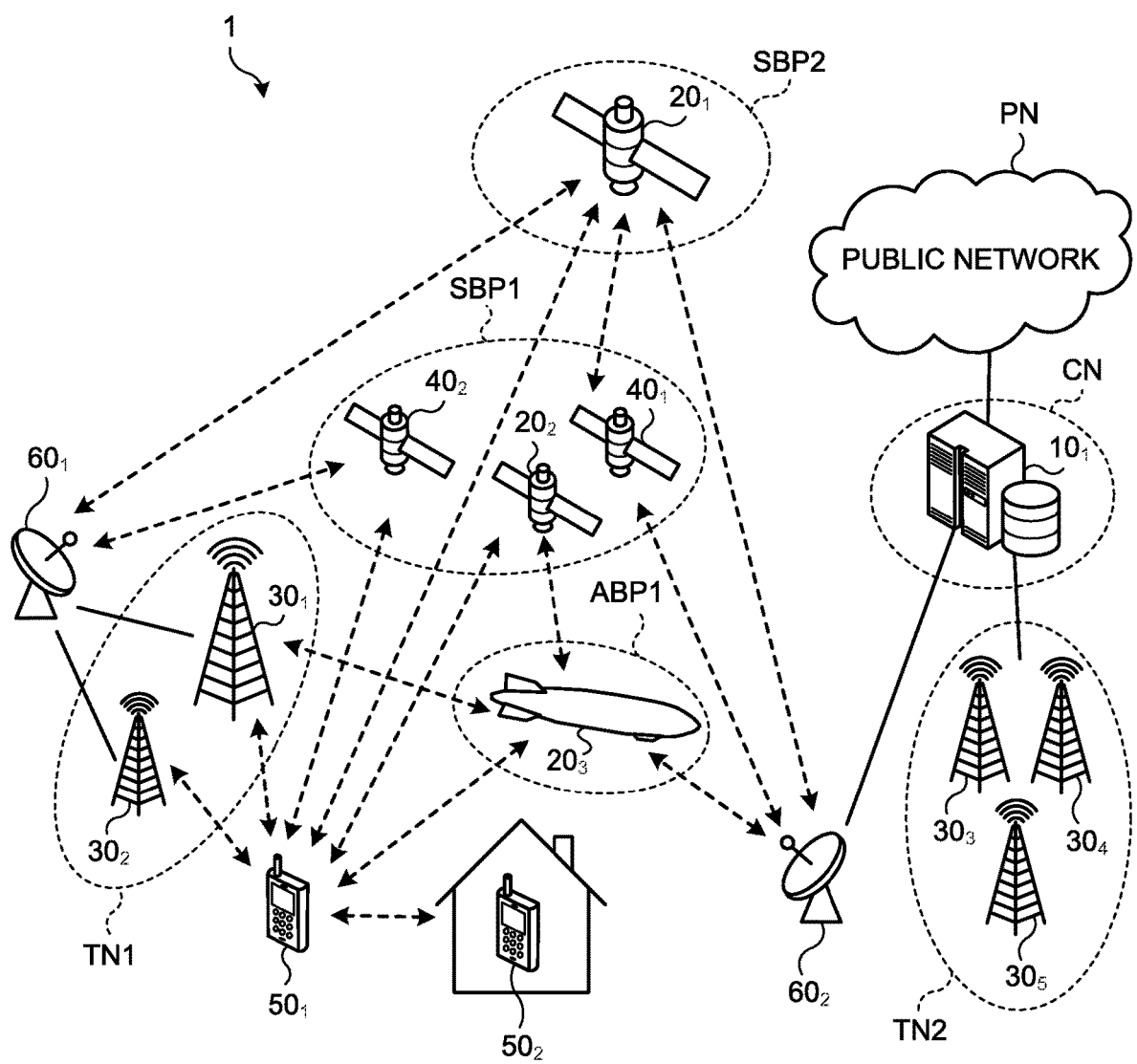
FIG. 2 is a diagram illustrating an example of a wireless network provided by the communication system.

FIG. 2 is a diagram illustrating an example of a wireless network provided by the communication system 1. The non-terrestrial base station apparatus 20 and the terrestrial base station apparatus 30 each constitute a cell. A cell is an area where wireless communication is covered by a base station. The cell constituted by the non-terrestrial base station apparatus 20 and the terrestrial base station apparatus 30 can be any of a macrocell, a microcell, a femtocell, and a small cell. Moreover, the communication system 1 can be configured so that a single base station apparatus can manage a plurality of cells or a plurality of base station apparatuses can manage a single cell.

In the example of FIG. 2, the terrestrial base station apparatuses $30_1$ and $30_2$ constitute a terrestrial network TN1, and the terrestrial base station apparatuses $30_3$, $30_4$, and $30_5$ constitute a terrestrial network TN2. The terrestrial network TN1 and the terrestrial network TN2 are, in one example, terrestrial networks operated by a wireless communication provider such as telephone companies. The terrestrial network TN1 and the terrestrial network TN2 can be operated by different wireless communication providers or can be operated by the same wireless communication provider. It is also possible to regard the terrestrial network TN1 and the terrestrial network TN2 as one terrestrial network.

The terrestrial network TN1 and the terrestrial network TN2 are connected individually to a core network. In the example of FIG. 2, the terrestrial base station apparatus 30 configuring the terrestrial network TN2 is connected to the core network CN constituted by the management apparatus $10_1$ or the like. In the case where the radio access scheme of the terrestrial network TN2 is LTE, the core network CN is EPC. In addition, in the case where the radio access scheme of the terrestrial network TN2 is NR, the core network CN is 5GC. The core network CN is understandably not limited to EPC or 5GC and can be a core network using other radio access schemes. Moreover, the terrestrial network TN1 is not connected to the core network in the example of FIG. 2, but the terrestrial network TN1 can be connected to the core network CN. In addition, the terrestrial network TN1 can be connected to a core network (not shown) different from the core network CN.

The core network CN is provided with a gateway device, an inter-gateway switch, or the like and is connected to a public network PN via the gateway device. The public network PN is, in one example, a public data network such as the Internet, regional IP networks, and telephone networks (such as mobile phone networks and fixed-line phone networks). The gateway device is, in one example, a server device connected to the Internet, a regional IP network, or the like. The inter-gateway switch is, in one example, a telephone switch connected to a telephone network of a telephone company. The management apparatus $10_1$ can have a function as a gateway device or an inter-gateway switch.

The non-terrestrial base station apparatus 20 and the relay apparatus 40 illustrated in FIG. 2 are both non-terrestrial station equipment such as satellite station equipment and aircraft station equipment. The group of satellite station equipment (or satellite station equipment) that constitutes the non-terrestrial network is called a space-borne platform. In addition, the group of aircraft station equipment (or aircraft station equipment) that constitutes the non-terrestrial network is called an airborne platform. In the example of FIG. 2, the non-terrestrial base station apparatus $20_2$, the relay apparatus $40_1$, and the relay apparatus $40_2$ constitute a space-borne platform SBP1. The non-terrestrial base station apparatus $20_1$ constitutes a space-borne platform SBP2. In addition, the non-terrestrial base station apparatus 203 constitutes an airborne platform ABP1.

The communication apparatus 50 can communicate with both the terrestrial station equipment and the non-terrestrial station equipment. In the example of FIG. 2, the communication apparatus $50_1$ is capable of communicating with the terrestrial station equipment that constitutes the terrestrial network TN1. In addition, the communication apparatus $50_1$ is capable of communicating with the non-terrestrial station equipment that constitutes the space-borne platforms SBP1 and SBP2. In addition, the communication apparatus $50_1$ is also capable of communicating with the non-terrestrial station equipment that constitutes the airborne platform ABP1. Moreover, the communication apparatus $50_1$ can be capable of directly communicating with other communication apparatus 50 (the communication apparatus $50_2$ in the example of FIG. 2).

The non-terrestrial station equipment is connected to the terrestrial network or the core network via a relay station 60. The non-terrestrial station equipment, which constitutes the space-borne platforms SBP1 and SBP2, is connected to the terrestrial network TN1 via the relay station 60₁. In addition, the non-terrestrial station equipment, which constitutes the space-borne platforms SBP1, SBP2 and the airborne platform ABP1, is connected to the core network CN via a relay station 60₂. Moreover, it is also possible for the non-terrestrial station equipment to communicate directly with each other without via the relay station 60.

The relay station 60 is, in one example, an aircraft station or an earth station. An aircraft station is a radio station installed on the ground or on a moving body that moves on the ground to communicate with an aircraft station. In addition, the earth station is a radio station located on the earth (including the air) to communicate with a satellite station (a space station). The earth station can be a large earth station or a small earth station such as a very-small-aperture terminal (VSAT). Moreover, the earth station can be a VSAT control earth station (also referred to as a parent station or HUB station) or a VSAT earth station (also referred to as a child station). In addition, the earth station can be a radio station installed in a moving body that moves on the ground. In one example, an example of the earth station mounted on a ship includes earth stations on board vessels (ESV). In addition, the earth station can include an aircraft earth station, which is installed in an aircraft (including helicopters) and communicates with a satellite station. In addition, the earth station can include an aviation earth station, which is installed in a moving body that moves on the ground and communicates with an aircraft earth station via a satellite station. Moreover, the relay station 60 can be a portable mobile station that communicates with a satellite station or an aircraft station. The relay station 60 can be considered as a part of the communication system 1.

Figure 3:
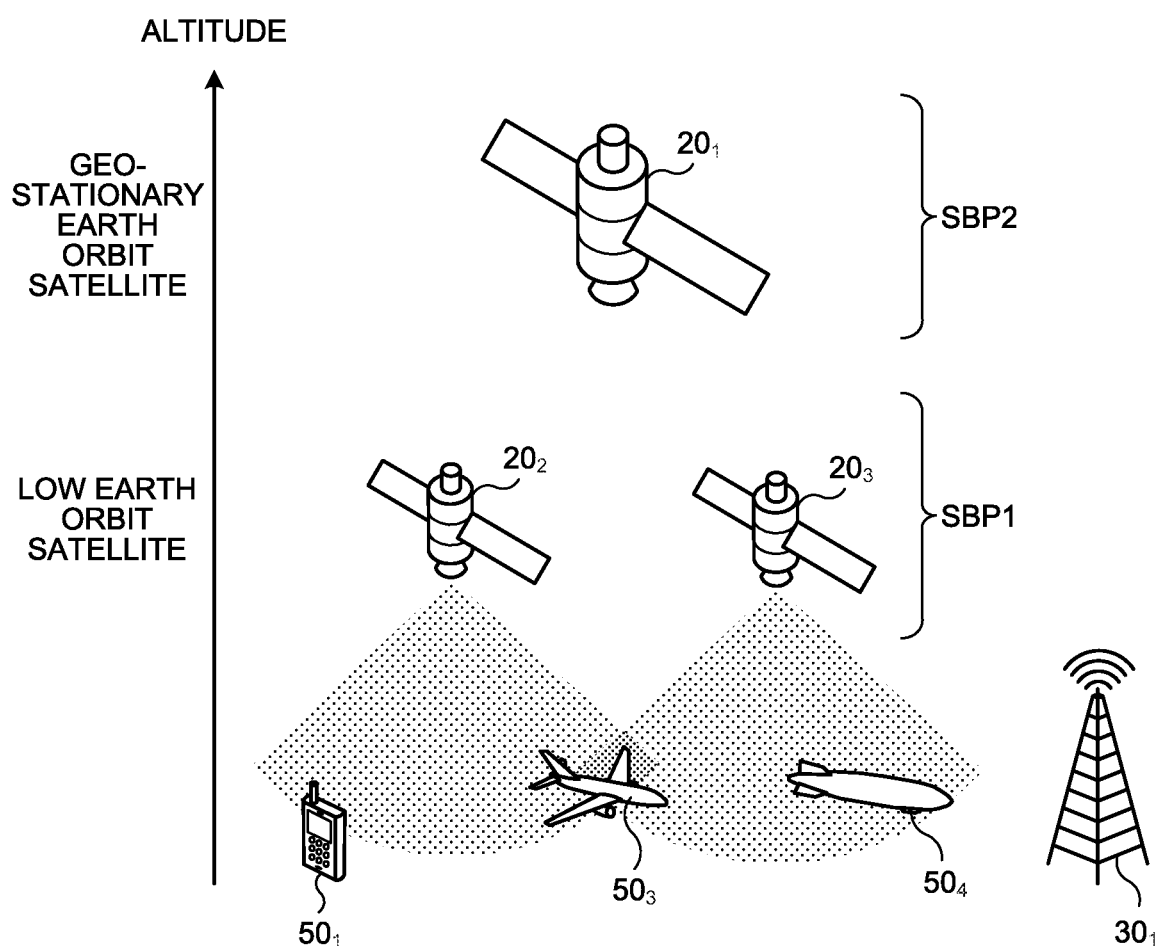
FIG. 3 is a diagram illustrating an overview of satellite communication provided by the communication system.

Each apparatus that constitutes the space-borne platforms SBP1 and SBP2 performs satellite communication with the communication apparatus 50. The satellite communication refers to wireless communication between satellite station equipment and communication apparatus. FIG. 3 is a diagram illustrating an overview of satellite communication provided by the communication system 1. The satellite station equipment is mainly divided into geostationary earth orbit satellite station equipment and low earth orbit satellite station equipment.

The geostationary earth orbit satellite station equipment is located at an altitude of approximately 35,786 km and revolves around the earth at the same speed as the earth's rotation. In the example of FIG. 3, the non-terrestrial base station apparatus 20₁ that constitutes the space-borne platform SBP2 is the geostationary earth orbit satellite station equipment. The geostationary earth orbit satellite station equipment has a relative velocity of approximately zero with the terrestrial communication apparatus 50 and appears stationary when observing from the terrestrial communication apparatus 50. The non-terrestrial base station apparatus 20₁ performs satellite communication with the communication apparatuses 50₁, 50₃, 50₄, and the like located on the earth.

The low earth orbit satellite station equipment is the satellite station equipment that orbits at a lower altitude than geostationary earth orbit satellite station equipment and medium earth orbit satellite station equipment. The low earth orbit satellite station equipment is, in one example, the satellite station equipment located between altitudes of 500 km and 2000 km. In the example of FIG. 3, the non-terrestrial base station apparatus 20₂ and 20₃ that constitute the space-borne platform SBP1 are the low earth orbit satellite station equipment. Moreover, FIG. 3 illustrates only two non-terrestrial base station apparatuses 20₂ and 20₃ as satellite station equipment that constitutes the space-borne platform SBP1. The satellite station equipment that constitutes the space-borne platform SBP1, however, has two or more (e.g., tens to thousands) non-terrestrial base station apparatuses 20, which practically constitute a low earth orbit satellite constellation. The low earth orbit satellite station equipment has a relative speed with respect to the terrestrial communication apparatus 50 unlike the geostationary earth orbit satellite station equipment and appears to be moving when observing from the terrestrial communication apparatus 50. The non-terrestrial base station apparatus 20₂ and 20₃ constitute individually a cell and perform satellite communication with the communication apparatuses 50₁, 50₂, 50₃, and the like located on the earth.

Figure 4:
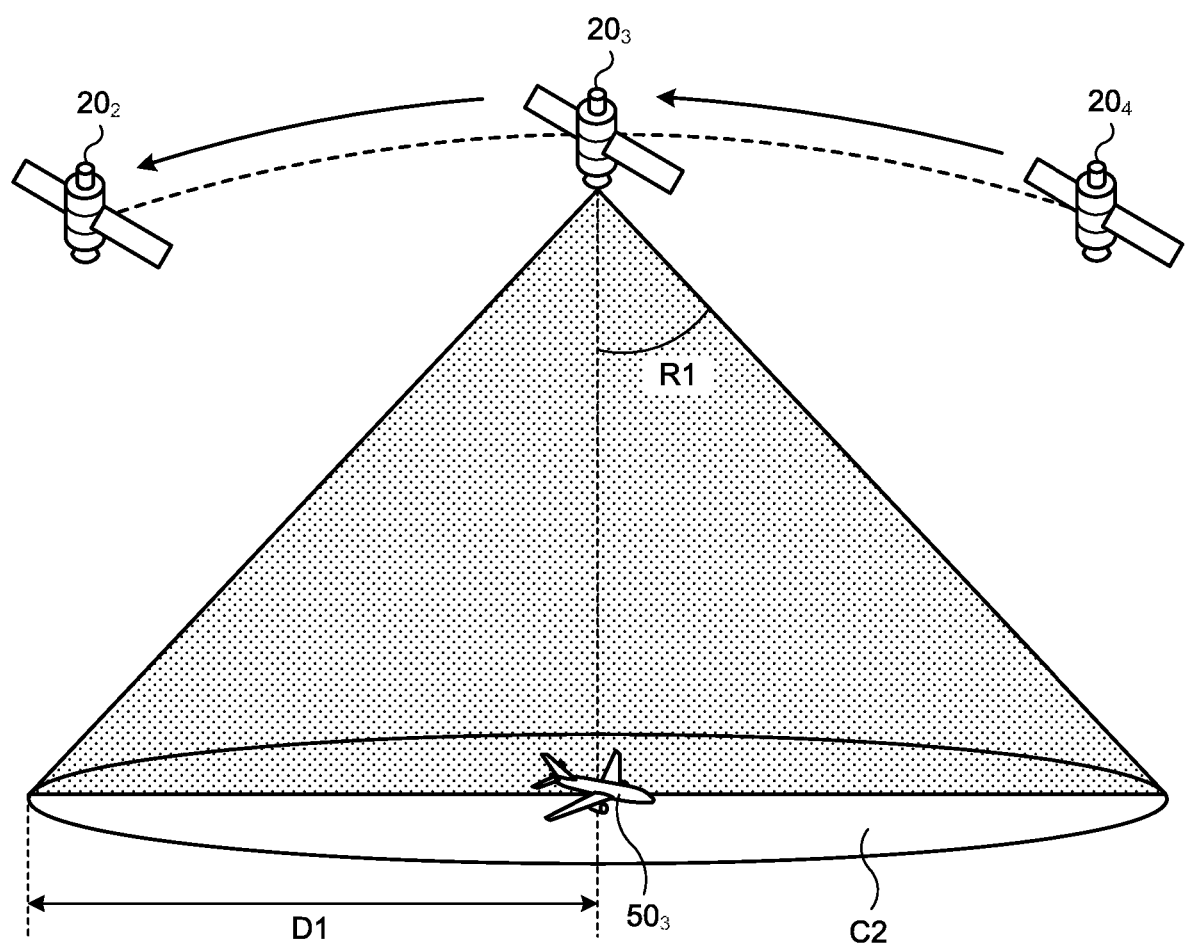
FIG. 4 is a diagram illustrating an example of a cell formed by satellite station equipment.

FIG. 4 is a diagram illustrating an exemplary cell constituted by the satellite station equipment. FIG. 4 illustrates a cell C2 constituted by the non-terrestrial base station apparatus 20₃, which is the low earth orbit satellite station equipment. The satellite station equipment that orbits a low earth orbit communicates with the terrestrial communication apparatus 50 with a predetermined directivity on the ground. In one example, the angle R1 shown in FIG. 4 is 40 degrees. In the case of FIG. 4, the radius D1 of the cell C2 constituted by the non-terrestrial base station apparatus 20₃ is, in one example, 1000 km. The low earth orbit satellite station equipment moves at a constant speed. In the case where the low earth orbit satellite station equipment is difficult to provide satellite communication to the terrestrial communication apparatus 50, the subsequent low earth orbit satellite station equipment provides satellite communication. In the case of the example in FIG. 4, in the case where the non-terrestrial base station apparatus 20₃ is difficult to provide satellite communication to the terrestrial communication apparatus 50, the subsequent non-terrestrial base station apparatus 20₄ provides satellite communication. Moreover, the values of the angle R1 and the radius D1 mentioned above are merely an example and are not limited thereto.

As described above, the communication apparatus 50 is capable of performing wireless communication using a non-terrestrial network. In addition, the non-terrestrial base station apparatus 20 and the relay apparatus 40 in the communication system 1 constitute the non-terrestrial network. This makes it possible for the communication system 1 to extend the service even to the communication apparatus 50 located in the area that is incapable of covering by the terrestrial network. In one example, the communication system 1 is capable of providing public safety and critical communications for the communication apparatus, such as Internet of things (IoT) devices and machine-type communications (MTC) devices. In addition, the use of the non-terrestrial network improves service reliability and recovery, so the communication system 1 is capable of reducing the vulnerability of the service to the physical attack or the natural disaster. In addition, the communication system 1 is capable of implementing service connection to aircraft terminal equipment such as passengers of airplanes and drones and service connection to moving body terminal equipment such as ships and trains. In addition, the communication system 1 is capable of implementing the A/V content services, group communications, IoT-based broadcast services, software download services, high-performance multicast services such as emergency messages, high-performance broadcast service, and the like. Furthermore, the communication system 1 is capable of supporting traffic offload between the terrestrial network and the non-terrestrial network. For the implementation described above, the non-terrestrial network provided by the communication system 1 makes preferably operational integration with the terrestrial network provided by the communication system 1 in the upper layer. In addition, the non-terrestrial network provided by the communication system 1 has preferably a common radio access scheme with the terrestrial network provided by the communication system 1.

Further, even in the case of communication using the non-terrestrial network, switching between base station apparatuses as a connection destination (e.g., a handover from the non-terrestrial base station apparatus 20 to another non-terrestrial base station apparatus 20) is performed similarly to the communication using the terrestrial network. For the communication using the non-terrestrial network, the distance between the communication apparatus 50 and the base station apparatus is, however, likely to be large depending on the state of the base station apparatus. For the communication using the non-terrestrial network, the signal propagation delay is thus likely to increase depending on the state of the base station apparatus. In this case, the communication apparatus 50 is likely to take a long time to perform the switching process (e.g., the handover process) of the base station apparatus as a connection destination. Given the situation, the assumption is given an increase in the possibility that the process of switching the base station apparatus as a connection destination fails to be performed.

In one example, if the signal propagation delay is large, it is likely to take time to transmit and receive information used for the process of handover between the base station apparatus and the communication apparatus 50 (e.g., information necessary for the base station apparatus to determine whether to perform a handover). The assumption is given that the non-terrestrial base station apparatus 20 has a high moving speed relative to the communication apparatus 50 depending on its type. In addition, the communication apparatus 50 has its own high moving speed, so the moving speed of the non-terrestrial base station apparatus 20 that is relative to the communication apparatus 50 is also likely to increase. If the relative moving speed is high, the communication apparatus 50 is likely to get out of the communication range of the base station apparatus connected thereto before receiving by the communication apparatus 50 a switching instruction used for switching the base station apparatus as a connection destination (e.g., a handover command) from the connected base station apparatus. If so, the communication apparatus 50 fails the handover.

Further, the assumption is given that the non-terrestrial station equipment has a high moving speed relative to the communication apparatus 50, as described above, depending on its type. Thus, in the case of communication using the non-terrestrial network, the switching between base stations is likely to occur more frequently than in the communication using a terrestrial network. In one example, in the case where the non-terrestrial network is configured as a low earth orbit satellite constellation constituted by hundreds to thousands of low earth orbit satellites, the switching between base station apparatuses to be a destination to which the communication apparatus 50 is connected is likely to occur repeatedly in a short time regardless of movement of the communication apparatus 50.

Further, even in the case of communication using a terrestrial network, the relative speed between the base station apparatus and the communication apparatus 50 is likely to be high depending on the state of the terrestrial station equipment or the communication apparatus 50. In one example, in the case where one or both of the terrestrial station equipment and the communication apparatus 50 are located inside a moving body that moves at high speed, the relative speed between the base station apparatus and the communication apparatus 50 is high. Even in this case, the switching between base station apparatuses to be a destination to which the communication apparatus 50 is connected is likely to occur repeatedly in a short time.

If there is a high possibility that the process of switching the base station apparatus will fail, or if the switching between the base station apparatuses as a connection destination occurs frequently, the communication quality may deteriorate. In one example, taking time to acquire data, the occurrence of packet loss, failure of seamless communication, or significant fluctuation in communication speed is likely to occur.

Thus, the present embodiment achieves high-quality communication by enabling the process of switching the base station apparatus as a connection destination to be completed in a simple procedure or in a short time. Specifically, the communication apparatus 50 acquires the switching information from the base station apparatus connected thereto before receiving, from the connected base station apparatus, an instruction to switch (e.g., the handover command) the connected base station apparatus connected thereto. The switching information is used for switching the connection to the base station apparatus as a candidate for switching the connection. The switching information includes, in one example, information used for wireless communication with the base station apparatus as the switching destination candidate. Then, the communication apparatus 50 determines by itself whether or not it is necessary to switch the base station before receiving the switching instruction from the connected base station apparatus. In the case where the switching is determined to be necessary, the communication apparatus 50 switches by itself the connection destination using the switching information.

In one example, the assumption is given that, as illustrated in FIG. 4, the communication apparatus $50_3$ is connected to the non-terrestrial base station apparatus $20_3$, and the base station apparatus to be a switching destination candidate is the non-terrestrial base station apparatus $20_4$. In this situation, the communication apparatus $50_3$ acquires the switching information used to switch the connection from the non-terrestrial base station apparatus $20_3$ to the non-terrestrial base station apparatus $20_4$ before receiving the handover command from the non-terrestrial base station apparatus $20_3$.

In this event, the switching information can be handover-related information. In one example, the switching information can include information relating to radio resources (resource information) used by the communication apparatus $50_3$ to perform wireless communication with the non-terrestrial base station apparatus $20_4$. In this event, the resource information can include information regarding a dedicated radio resource exclusively assigned to the communication apparatus $50_3$. In one example, the resource information includes information regarding dedicated physical resources such as time-frequency resources exclusively assigned to the communication apparatus $50_3$ for the communication apparatus $50_3$ to transmit a random access preamble to the non-terrestrial base station apparatus $20_4$. In addition or alternatively, the resource information can include information regarding a dedicated preamble sequence exclusively assigned to the communication apparatus $50_3$.

Then, the communication apparatus $50_3$ performs the handover determination by itself regardless of whether or not the handover command from the non-terrestrial base station apparatus $20_3$ is received, and switches a connection destination using the switching information acquired in advance (e.g., resource information).

This makes it possible to omit a step of transmitting information used for the determination whether to perform a handover (e.g., a measured result of the received power) from the communication apparatus $50_3$ to the non-terrestrial base station apparatus $20_3$ or a step of transmitting a handover command from the non-terrestrial base station apparatus $20_3$ to the communication apparatus $50_3$. Thus, it is possible to reduce the situation where the communication apparatus $50_3$ gets out of the communicable range of the non-terrestrial base station apparatus $20_3$ while executing the above-mentioned steps. In addition, these steps are omitted, so the time taken for the entire handover process is shortened. Thus, the possibility of failure of the handover process is reduced. In addition, the time during the temporary interruption of communication due to the handover process is made to be shorter. Consequently, the communication system 1 is capable of achieving high-quality communication.

The configuration of each apparatus or equipment that constitutes the communication system 1 according to the first embodiment is now described in detail.

[2-2. Configuration of Management Apparatus]

The management apparatus 10 is a device that manages a wireless network. In one example, the management apparatus 10 is a device that manages communication between the non-terrestrial base station apparatus 20 and the terrestrial base station apparatus 30. If the core network is EPC, the management apparatus 10 is, in one example, a device having a function as a mobility management entity (MME). In addition, if the core network is 5GC, the management apparatus 10 is, in one example, a device having a function as an access and mobility management function (AMF). Moreover, the management apparatus 10 can have a function of a gateway. In one example, if the core network is EPC, the management apparatus 10 can function as a serving-gateway (S-GW) or a packet data network gateway (P-GW). In addition, if the core network is 5GC, the management apparatus 10 can have a function as a user plane function (UPF). Moreover, the management apparatus 10 is not necessarily a device that constitutes the core network. In one example, if the core network is a W-CDMA or cdma2000 based core network, the management apparatus 10 can be a device that functions as a radio network controller (RNC).

Figure 5:
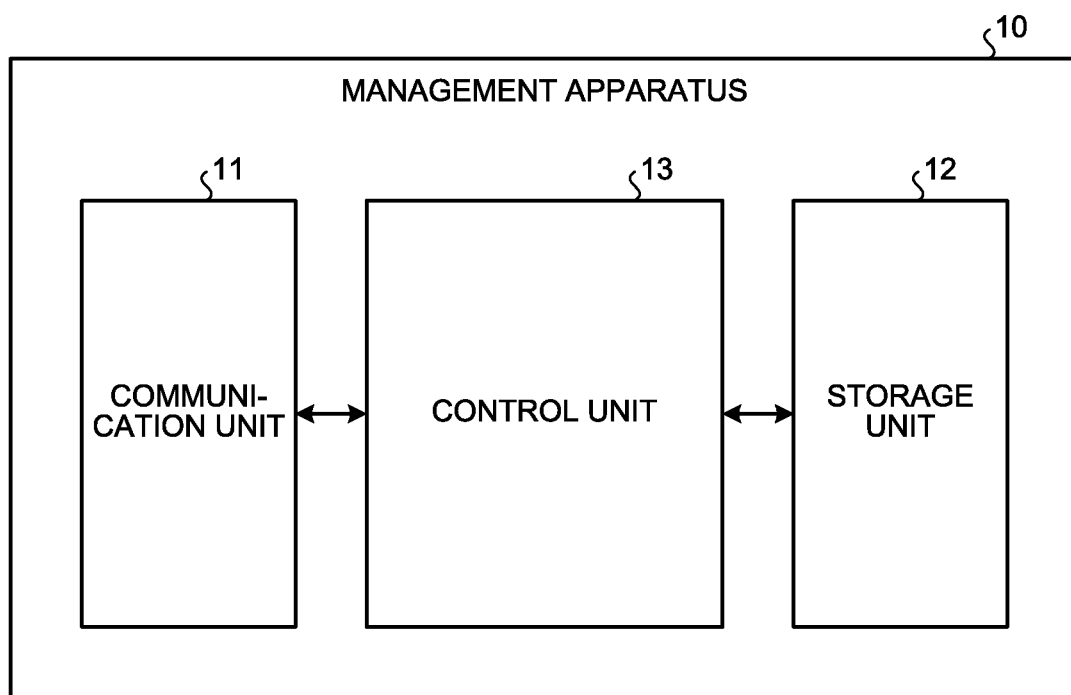
FIG. 5 is a diagram illustrating a configuration example of a management apparatus according to the first embodiment of the present disclosure.

FIG. 5 is a diagram illustrating a configuration example of the management apparatus 10 according to the first embodiment of the present disclosure. The management apparatus 10 includes a communication unit 11, a storage unit 12, and a control unit 13. Moreover, the configuration illustrated in FIG. 5 is a functional configuration and its hardware configuration can be different from that illustrated. In addition, the functions of the management apparatus 10 can be implemented in the form distributed in a plurality of physically separated components. In one example, the management apparatus 10 can be constituted by a plurality of server devices.

The communication unit 11 is a communication interface for communicating with other apparatuses. The communication unit 11 can be a network interface or a device connection interface. In one example, the communication unit 11 can be a local area network (LAN) interface such as a network interface card (NIC) or can be a universal serial bus (USB) interface including a USB host controller, a USB port, and the like. In addition, the communication unit 11 can be a wired interface or a wireless interface. The communication unit 11 functions as a communication means of the management apparatus 10. The communication unit 11 communicates with the terrestrial base station apparatus 30 or the relay station 60 under the control of the control unit 13.

The storage unit 12 is a data readable/writable storage device, such as dynamic random access memory (DRAM), static random access memory (SRAM), flash memory, and hard disk. The storage unit 12 functions as a storage means of the management apparatus 10. The storage unit 12 stores, in one example, the connection state of the communication apparatus 50. In one example, the storage unit 12 stores the radio resource control (RRC) state and the EPS connection management (ECM) state of the communication apparatus 50. The storage unit 12 can function as a home memory that stores the position information of the communication apparatus 50.

The control unit 13 is a controller that controls each component of the management apparatus 10. The control unit 13 is configured by including a processor such as central processing units (CPUs) and micro-processing units (MPUs). In one example, the control unit 13 performs its function by the processor executing various programs stored in the storage device inside the management apparatus 10 using a random access memory (RAM) or the like as a work area. Moreover, the control unit 13 can be configured as an integrated circuit such as application-specific integrated circuits (ASICs) and field-programmable gate arrays (FPGAs). Each of CPU, MPU, ASIC, and FPGA can be regarded as a controller.

[2-3. Configuration of Base Station Apparatus]

The configuration of the base station apparatus is now described. The communication system 1 includes, as a base station apparatus, the non-terrestrial base station apparatus 20 that constitutes a non-terrestrial network and the terrestrial base station apparatus 30 that constitutes a terrestrial network. The non-terrestrial base station apparatuses 20 that constitute the non-terrestrial network are all movable. The configuration of the non-terrestrial base station apparatus 20 is now described.

[Non-Terrestrial Base Station Apparatus]

Figure 6:
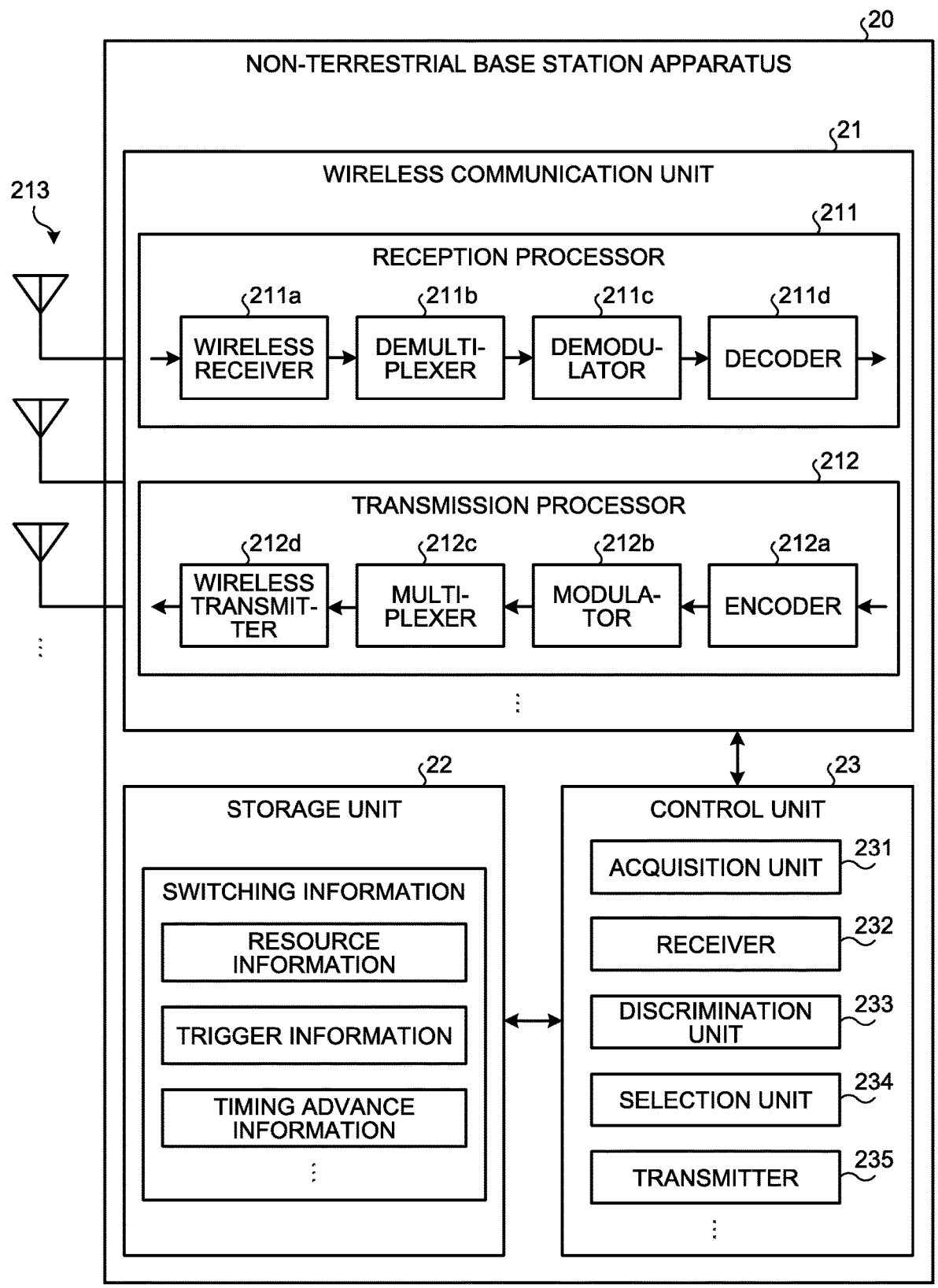
FIG. 6 is a diagram illustrating a configuration example of a non-terrestrial base station apparatus according to the first embodiment of the present disclosure.

FIG. 6 is a diagram illustrating a configuration example of the non-terrestrial base station apparatus 20 according to the first embodiment of the present disclosure. The non-terrestrial base station apparatus 20 includes a wireless communication unit 21, a storage unit 22, and a control unit 23. Moreover, the configuration illustrated in FIG. 6 is a functional configuration and its hardware configuration can be different from that illustrated. In addition, the non-terrestrial base station apparatus 20 can be implemented in the form distributed in a plurality of physically separated components.

The wireless communication unit 21 is a wireless communication interface that wirelessly communicates with other wireless communication apparatuses (e.g., the communication apparatus 50 and the relay station 60). The wireless communication unit 21 supports one or a plurality of radio access schemes. In one example, the wireless communication unit 21 supports both NR and LTE. The wireless communication unit 21 can support W-CDMA or cdma2000 in addition to NR and LTE. The wireless communication unit 21 includes a reception processor 211, a transmission processor 212, and an antenna 213. The wireless communication unit 21 can include a plurality of reception processors 211, transmission processors 212, and antennas 213. Moreover, in the case where the wireless communication unit 21 supports a plurality of radio access schemes, each component of the wireless communication unit 21 can be configured to support individually for each radio access scheme. In one example, the reception processor 211 and the transmission processor 212 can be configured to support individually for LTE and NR.

The reception processor 211 processes an uplink signal received via the antenna 213. The reception processor 211 includes a wireless receiver 211a, a demultiplexer 211b, a demodulator 211c, and a decoder 211d.

The wireless receiver 211a down-converts an uplink signal, removes an unnecessary frequency component, controls an amplification level, performs orthogonal demodulation, performs conversion to a digital signal, removes a guard interval, extracts a frequency domain signal using fast Fourier transform, or the like. The demultiplexer 211b separates the signal output from the wireless receiver 211a into an uplink channel, such as physical uplink shared channel (PUSCH) or physical uplink control channel (PUCCH), and an uplink reference signal. The demodulator 211c demodulates the received signal using a modulation scheme such as binary phase-shift keying (BPSK) and quadrature phase-shift keying (QPSK) for the modulation symbol of the uplink channel. The modulation scheme used by the demodulator 211c can be 16-quadrature amplitude modulation (QAM), 64QAM, or 256QAM. The decoder 211d performs decoding processing on the demodulated coded bits of the uplink channel. The decoded uplink data and uplink control information are output to the control unit 23.

The transmission processor 212 performs transmission processing of downlink control information and downlink data. The transmission processor 212 includes an encoder 212a, a modulator 212b, a multiplexer 212c, and a wireless transmitter 212d.

The encoder 212a encodes the downlink control information and downlink data input from the control unit 23 using an encoding scheme such as block encoding, convolutional encoding, and turbo encoding. The modulator 212b modulates the coded bits output from the encoder 212a using a predetermined modulation scheme such as BPSK, QPSK, 16QAM, 64QAM, and 256QAM. The multiplexer 212c multiplexes the modulation symbol of each channel and the downlink reference signal and arranges the result in a predetermined resource element. The wireless transmitter 212d performs various types of signal processing on the signal from the multiplexer 212c. In one example, the wireless transmitter 212d performs conversion into the time domain by fast Fourier transform, addition of a guard interval, generation of a baseband digital signal, conversion into an analog signal, quadrature modulation, up-conversion, removal of extra frequency components, and processing of power amplification or the like. The signal generated by the transmission processor 212 is transmitted through the antenna 213.

The storage unit 22 is a data readable/writable storage device such as DRAM, SRAM, flash memory, and hard disk. The storage unit 22 functions as a storage means of the non-terrestrial base station apparatus 20. The storage unit 22 stores the switching information. The switching information is the information used by the communication apparatus 50 to switch the base station. The switching information includes, in one example, information such as resource information, trigger information, timing advance information, and the like.

The resource information is the information relating to the radio resource used by the connected communication apparatus 50 to perform wireless communication with the base station apparatus as a switching destination candidate configured to be movable. In addition, the trigger information is the information used by the communication apparatus 50 to determine whether or not to switch the base station as a connection destination. In addition, the timing advance information is the information relating to timing advance for the communication apparatus 50 to connect to the base station as a switching destination candidate. The resource information, trigger information, and timing advance information are described in detail later.

The control unit 23 is a controller that controls each component of the non-terrestrial base station apparatus 20. The control unit 23 is configured by including a processor such as central processing units (CPUs) and micro-processing units (MPUs). In one example, the control unit 23 performs its function by the processor executing various programs stored in the storage device inside the non-terrestrial base station apparatus 20 using a random access memory (RAM) or the like as a work area. Moreover, the control unit 23 can be configured as an integrated circuit such as application-specific integrated circuits (ASICs) and field-programmable gate arrays (FPGAs). Each of CPU, MPU, ASIC, and FPGA can be regarded as a controller.

The control unit 23 includes an acquisition unit 231, a receiver 232, a discrimination unit 233, a selection unit 234, and a transmitter 235 as illustrated in FIG. 6. The respective blocks (the acquisition unit 231 to the transmitter 235) that constitute the control unit 23 are functional blocks indicating the functions of the control unit 23. These functional blocks can be software blocks or hardware blocks. In one example, each of the above-mentioned functional blocks can be one software module implemented by software (including a microprogram) or one circuit block on a semiconductor chip (die). Each functional block can understandably be one processor or one integrated circuit. The method of configuring the functional blocks is optional. Moreover, the control unit 23 can be configured by including functional components different from the above-mentioned functional blocks. The operation of each block (the acquisition unit 231 to the transmitter 235) included in the control unit 23 is described later in detail in the description of a handover process (without handover command) to be described later.

[Terrestrial Base Station Apparatus]

Figure 7:
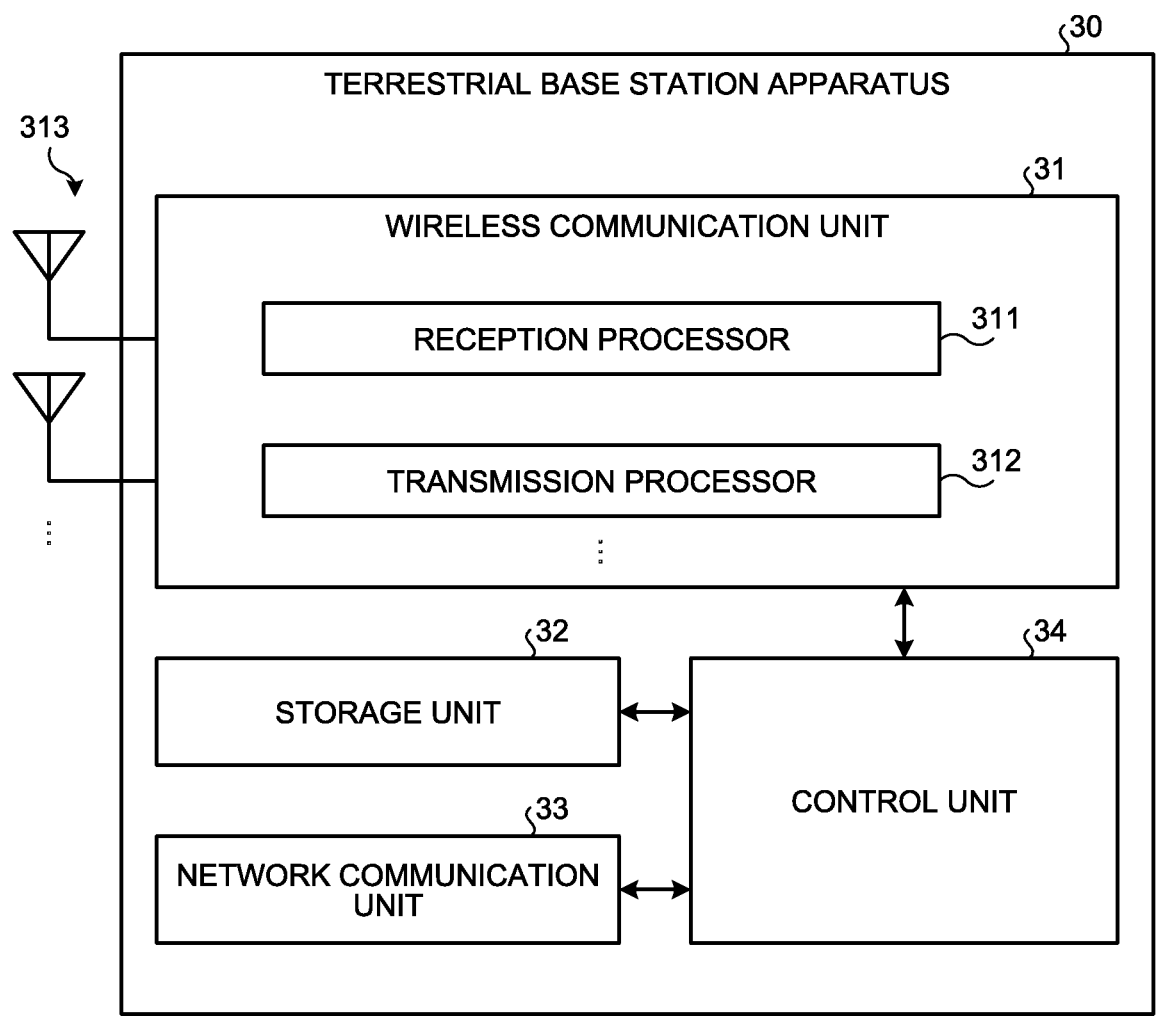
FIG. 7 is a diagram illustrating a configuration example of a terrestrial base station apparatus according to the first embodiment of the present disclosure.

The configuration of the terrestrial base station apparatus 30 is now described. FIG. 7 is a diagram illustrating a configuration example of the terrestrial base station apparatus 30 according to the first embodiment of the present disclosure. The terrestrial base station apparatus 30 includes a wireless communication unit 31, a storage unit 32, a network communication unit 33, and a control unit 34. Moreover, the configuration illustrated in FIG. 7 is a functional configuration and its hardware configuration can be different from that illustrated. In addition, the terrestrial base station apparatus 30 can be implemented in the form distributed in a plurality of physically separated components.

The wireless communication unit 31 is a wireless communication interface that performs wireless communication with other wireless communication apparatuses (e.g., the communication apparatus 50). The wireless communication unit 31 includes a reception processor 311, a transmission processor 312, and an antenna 313. The configurations of the wireless communication unit 31, the reception processor 311, the transmission processor 312, and the antenna 313 are respectively similar to those of the wireless communication unit 21, the reception processor 211, the transmission processor 212, and the antenna 213 of the non-terrestrial base station apparatus 20.

The storage unit 32 is a data readable/writable storage device such as DRAM, SRAM, flash memory, and hard disk. The storage unit 32 functions as a storage means of the terrestrial base station apparatus 30. The configuration of the storage unit 32 is similar to the storage unit 22 of the non-terrestrial base station apparatus 20.

The network communication unit 33 is a communication interface for communicating with other apparatuses. In one example, the network communication unit 33 is a LAN interface such as NIC. The network communication unit 33 can be a wired interface or a wireless interface. The network communication unit 33 functions as a network communication means of the terrestrial base station apparatus 30. The network communication unit 33 communicates with the management apparatus 10 or the relay station 60 under the control of the control unit 34.

The control unit 34 is a controller that controls each component in the terrestrial base station apparatus 30. The configuration of the control unit 34 is similar to that of the control unit 23 of the non-terrestrial base station apparatus 20.

[2-4. Configuration of Relay Apparatus]

Figure 8:
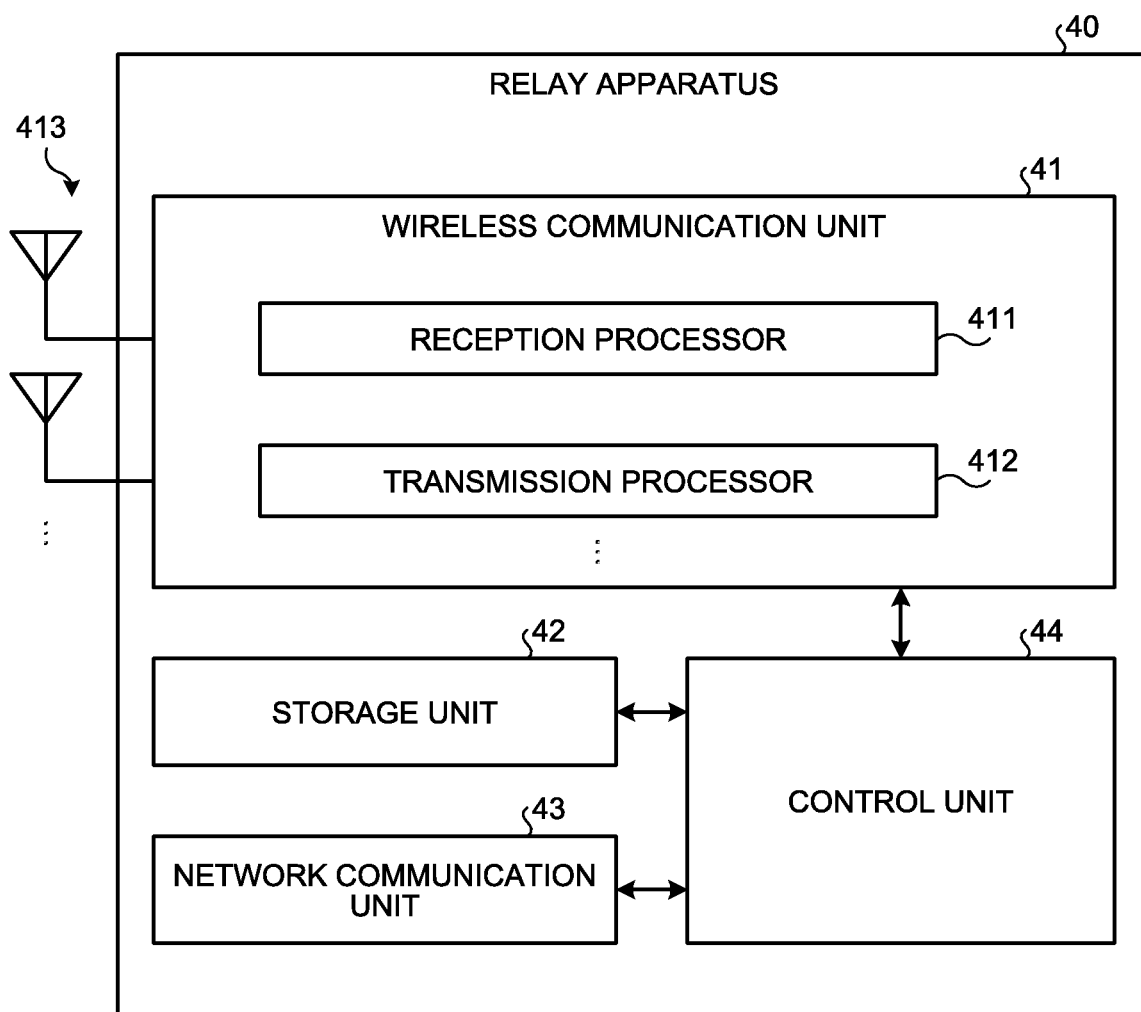
FIG. 8 is a diagram illustrating a configuration example of a relay apparatus according to the first embodiment of the present disclosure.

The configuration of the relay apparatus 40 is now described. FIG. 8 is a diagram illustrating a configuration example of the relay apparatus 40 according to the first embodiment of the present disclosure. The relay apparatus 40 includes a wireless communication unit 41, a storage unit 42, a network communication unit 43, and a control unit 44. Moreover, the configuration illustrated in FIG. 8 is a functional configuration and its hardware configuration can be different from that illustrated. In addition, the relay apparatus 40 can be implemented in the form distributed in a plurality of physically separated components.

The wireless communication unit 41 is a wireless communication interface that performs wireless communication with other wireless communication apparatuses (e.g., the non-terrestrial base station apparatus 20, the terrestrial base station apparatus 30, and the communication apparatus 50). The wireless communication unit 41 includes a reception processor 411, a transmission processor 412, and an antenna 413. The configurations of the wireless communication unit 41, the reception processor 411, the transmission processor 412, and the antenna 413 are respectively similar to those of the wireless communication unit 21, the reception processor 211, the transmission processor 212, and the antenna 213 of the non-terrestrial base station apparatus 20.

The storage unit 42 is a data readable/writable storage device such as DRAM, SRAM, flash memory, and hard disk. The storage unit 42 functions as a storage means of the relay apparatus 40. The configuration of the storage unit 42 is similar to the storage unit 22 of the non-terrestrial base station apparatus 20.

The network communication unit 43 is a communication interface for communicating with other apparatuses. In one example, the network communication unit 43 is a LAN interface such as NIC. The network communication unit 43 can be a wired interface or a wireless interface. The network communication unit 43 functions as a network communication means of the relay apparatus 40. The network communication unit 43 communicates with the non-terrestrial base station apparatus 20 or the terrestrial base station apparatus 30 under the control of the control unit 44.

The control unit 44 is a controller that controls each component in the relay apparatus 40. The configuration of the control unit 44 is similar to that of the control unit 23 of the non-terrestrial base station apparatus 20.

[2-5. Configuration of Communication Apparatus]

Figure 9:
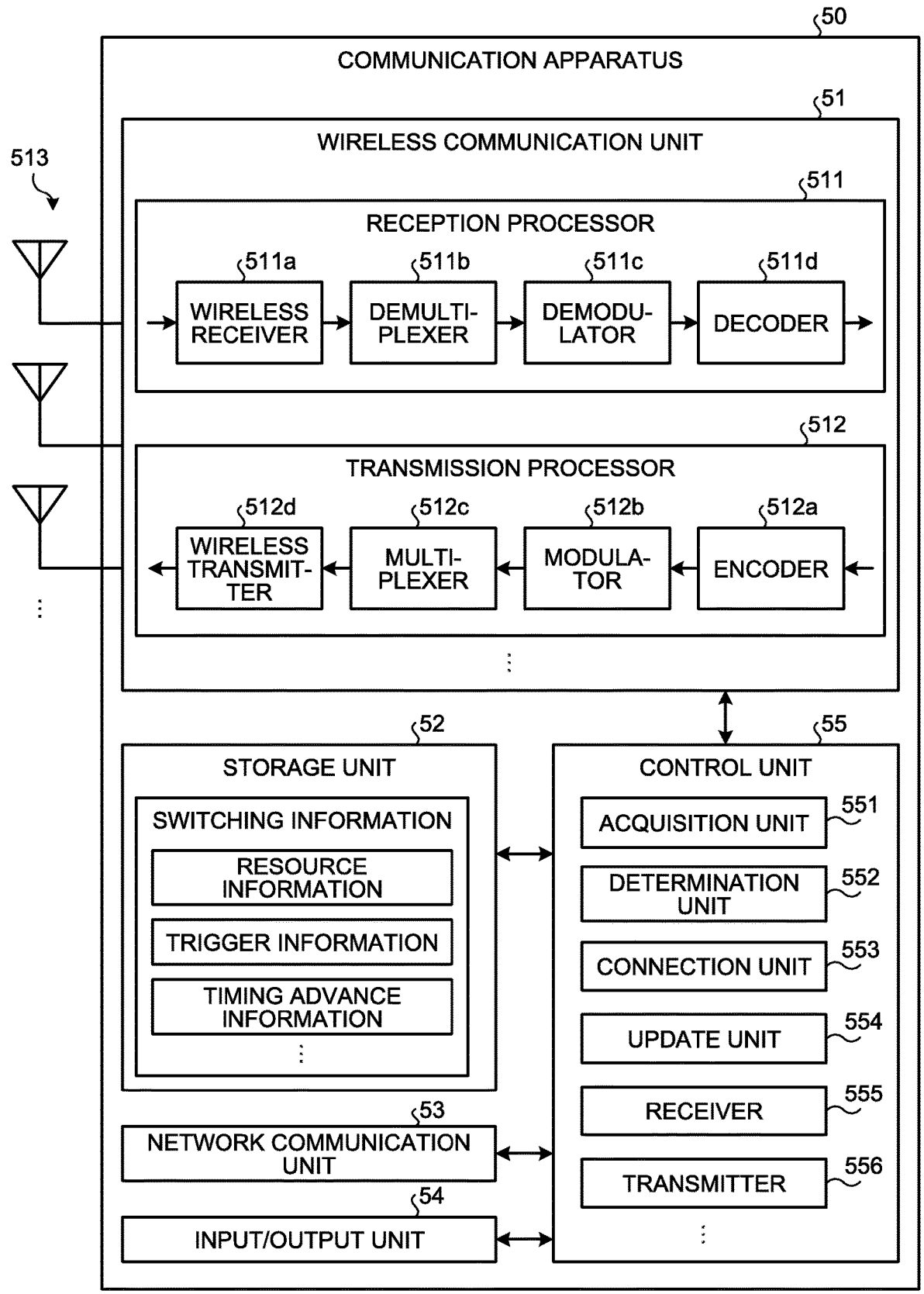
FIG. 9 is a diagram illustrating a configuration example of a communication apparatus according to the first embodiment of the present disclosure.

The configuration of the communication apparatus 50 is now described. FIG. 9 is a diagram illustrating a configuration example of the communication apparatus 50 according to the first embodiment of the present disclosure. The communication apparatus 50 includes a wireless communication unit 51, a storage unit 52, a network communication unit 53, an input/output unit 54, and a control unit 55. Moreover, the configuration illustrated in FIG. 9 is a functional configuration and its hardware configuration can be different from that illustrated. In addition, the communication apparatus 50 can be implemented in the form distributed in a plurality of physically separated components.

The wireless communication unit 51 is a wireless communication interface that wirelessly communicates with other wireless communication apparatuses (e.g., the non-terrestrial base station apparatus 20, the terrestrial base station apparatus 30, and the relay apparatus 40). The wireless communication unit 51 supports one or a plurality of radio access schemes. In one example, the wireless communication unit 51 supports both NR and LTE. The wireless communication unit 51 can support W-CDMA or cdma2000 in addition to NR and LTE. The wireless communication unit 51 includes a reception processor 511, a transmission processor 512, and an antenna 513. The wireless communication unit 51 can include a plurality of reception processors 511, transmission processors 512, and antennas 513. Moreover, in the case where the wireless communication unit 51 supports a plurality of radio access schemes, each component of the wireless communication unit 51 can be configured to support individually for each radio access scheme. In one example, the reception processor 511 and the transmission processor 512 can be configured to support individually for LTE and NR.

The reception processor 511 processes a downlink signal received via the antenna 513. The reception processor 511 includes a wireless receiver 511a, a demultiplexer 511b, a demodulator 511c, and a decoder 511d.

The wireless receiver 511a down-converts a downlink signal, removes an unnecessary frequency component, controls an amplification level, performs orthogonal demodulation, performs conversion to a digital signal, removes a guard interval, extracts a frequency domain signal using fast Fourier transform, or the like. The demultiplexer 511b separates the signal output from the wireless receiver 511a into a downlink channel, a downlink synchronization signal, and a downlink reference signal. The downlink channel is a channel such as physical broadcast channel (PBCH), physical downlink shared channel (PDSCH), and physical downlink control channel (PDCCH). The demodulator 211c demodulates the received signal for a modulation signal of the downlink channel using a modulation scheme such as BPSK, QPSK, 16QAM, 64QAM, and 256QAM. The decoder 511d performs decoding processing on the demodulated coded bits of the downlink channel. The decoded downlink data and downlink control information are output to the control unit 23.

The transmission processor 512 performs transmission processing of uplink control information and uplink data.

The transmission processor 512 includes an encoder 512a, a modulator 512b, a multiplexer 512c, and a wireless transmitter 512d.

The encoder 512a encodes the uplink control information and uplink data input from the control unit 55 using an encoding scheme such as block encoding, convolutional encoding, and turbo encoding. The modulator 512b modulates the coded bits output from the encoder 512a using a predetermined modulation scheme such as BPSK, QPSK, 16QAM, 64QAM, and 256QAM. The multiplexer 512c multiplexes the modulation symbol of each channel and the uplink reference signal and arranges the result in a predetermined resource element. The wireless transmitter 512d performs various types of signal processing on the signal from the multiplexer 512c. In one example, the wireless transmitter 512d performs conversion into the time domain by inverse fast Fourier transform, addition of a guard interval, generation of a baseband digital signal, conversion into an analog signal, quadrature modulation, up-conversion, removal of extra frequency components, and processing of power amplification or the like. The signal generated by the transmission processor 512 is transmitted through the antenna 513.

The storage unit 52 is a data readable/writable storage device such as DRAM, SRAM, flash memory, and hard disk. The storage unit 52 functions as a storage means of the communication apparatus 50. The storage unit 52 stores the switching information. The switching information is the information acquired from the non-terrestrial base station apparatus 20, the terrestrial base station apparatus 30, or the relay apparatus 40, and is used by the communication apparatus 50 for switching the base station. The switching information includes, in one example, information such as resource information, trigger information, timing advance information, and the like. The resource information, trigger information, and timing advance information are described in detail later.

The network communication unit 53 is a communication interface for communicating with other apparatuses. In one example, the network communication unit 53 is a LAN interface such as NIC. The network communication unit 53 can be a wired interface or a wireless interface. The network communication unit 53 functions as a network communication means of the communication apparatus 50. The network communication unit 53 communicates with other devices under the control of the control unit 55.

The input/output unit 54 is a user interface for exchanging information with the user. In one example, the input/output unit 54 is an operation device, such as keyboards, mice, operation keys, and touch panels, for the user to perform various operations. In addition, the input/output unit 54 is a display device such as a liquid crystal display (LCD) and an organic electroluminescence (EL) display. The input/output unit 54 can be an acoustic device such as loudspeakers and buzzers. In addition, the input/output unit 54 can be a lighting device such as a light-emitting diode (LED) lamp. The input/output unit 54 functions as an input/output means (input means, output means, operation means, or notification means) of the communication apparatus 50.

The control unit 55 is a controller that controls each component of the communication apparatus 50. The control unit 55 is configured by including a processor such as central processing units (CPUs) and micro-processing units (MPUs). In one example, the control unit 55 performs its function by the processor executing various programs stored in the storage device inside the communication apparatus 50 using a random access memory (RAM) or the like as a work area. Moreover, the control unit 55 can be configured as an integrated circuit such as application-specific integrated circuits (ASICs) and field-programmable gate arrays (FPGAs). Each of CPU, MPU, ASIC, and FPGA can be regarded as a controller.

The control unit 55 includes an acquisition unit 551, a determination unit 552, a connection unit 553, an update unit 554, a receiver 555, and a transmitter 556 as illustrated in FIG. 9. The respective blocks (the acquisition unit 551 to the transmitter 556) that constitute the control unit 55 are functional blocks indicating the functions of the control unit 55. These functional blocks can be software blocks or hardware blocks. In one example, each of the above-mentioned functional blocks can be one software module implemented by software (including a microprogram) or one circuit block on a semiconductor chip (die). Each functional block can understandably be one processor or one integrated circuit. The method of configuring the functional blocks is optional. Moreover, the control unit 55 can be configured by including functional components different from the above-mentioned functional blocks. The operation of each block (the acquisition unit 551 to the transmitter 556) included in the control unit 55 is described later in detail in the description of a handover process (without handover command) to be described later.

[2-6. Initial Connection Process]

Figure 10:
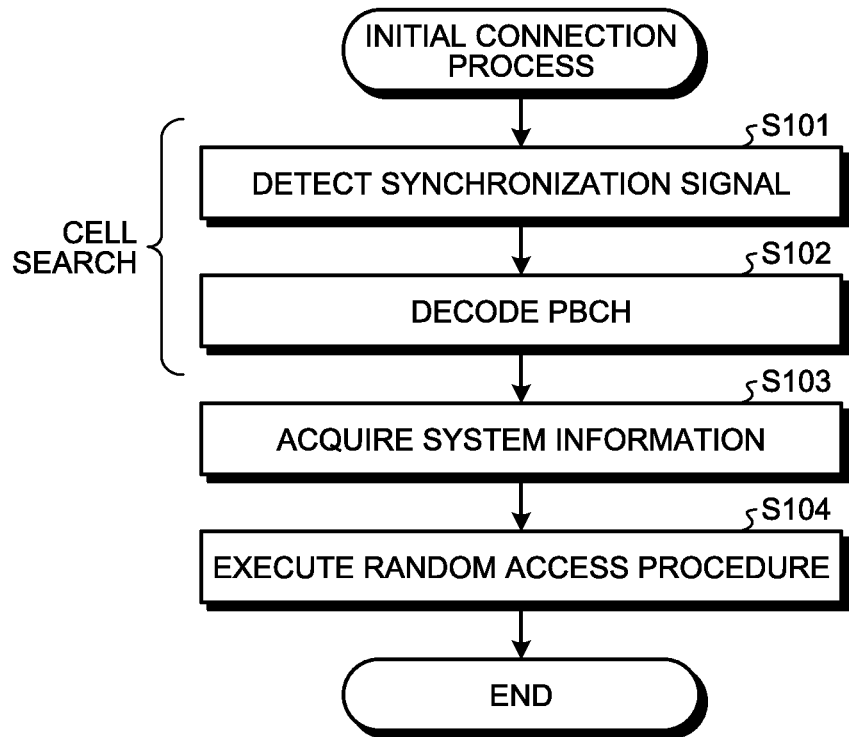
FIG. 10 is a flowchart showing an example of an initial connection process.

The operation of the communication system 1 is now described. The initial connection process is first described. The initial connection process is a process for making a transition from an idle state (RRC_IDLE) in which the communication apparatus 50 is not connected to any cell to a connection state (RRC_CONNECTED) in which the communication apparatus 50 establishes a connection with any cell. FIG. 10 is a flowchart showing an example of the initial connection process. The initial connection process is now described with reference to FIG. 10. The initial connection process described below is executed, in one example, upon powering on the communication apparatus 50.

The communication apparatus 50 in the idle state first performs a cell search. The cell search of the present embodiment includes steps of detecting a synchronization signal and decoding a PBCH. The receiver 555 of the communication apparatus 50 detects a cell synchronization signal (step S101). The receiver 555 performs downlink synchronization with the cell on the basis of the detected synchronization signal. Then, the receiver 555, when establishing the downlink synchronization, attempts to decode the PBCH and acquires a master information block (MIB) that is a part of the system information (step S102).

The system information is the information used to inform the configuration in a cell that transmits the system information. The system information includes, in one example, information relating to access to a cell, information relating to cell selection, information relating to other RATs or other systems, and the like. The system information includes an MIB and a system information block (SIB). The MIB is the information of the physical layer necessary for receiving the SIB or the like and is the information of a fixed payload size informed over PBCH. The MIB includes downlink system bandwidth, part of the system frame number, SIB scheduling information, and the like. The SIB is system information other than MIB and is informed over PDSCH.

Moreover, it is possible to classify the system information into first system information, second system information, and third system information. The first system information and the second system information include information regarding access to a cell, information regarding acquisition of other system information, and information regarding cell selection. In LTE, the information included in the MIB is the first system information. In addition, the information included in SIB1 and SIB2 in the SIB is the second system information. The remaining system information is the third system information.

In NR, the system information is also informed from the NR cell. The physical channel that carries the system information can be transmitted in a slot or mini-slot. A mini-slot is defined by the number of symbols that is smaller than the number of symbols in the slot. The transmission of the physical channel carrying the system information in the mini-slot makes it possible to reduce the time taken for the beam sweeping, thereby reducing the overhead. For NR, the first system information is transmitted over NR-PBCH and the second system information is transmitted over a different physical channel than NR-PBCH.

The acquisition unit 551 of the communication apparatus 50 acquires the second system information on the basis of the MIB (i.e., the first system information) (step S103). The second system information is, as described above, constituted by SIB1 and SIB2. The SIB1 is the cell-access restriction information and the scheduling information for system information other than SIB1. The SIB1 includes cell access information, cell selection information, maximum uplink-transmission power information, TDD configuration information, system information period, system information mapping information, system information (SI) window length, and the like. Meanwhile, the SIB2 includes connection barring information, cell-common radio resource configuration information (radioResourceConfigCommon), uplink carrier information, and the like. The cell-common radio resource configuration information includes the cell common physical random access channel (PRACH) and random access channel (RACH) configuration information.

Moreover, in the case where the acquisition unit 551 is incapable of acquiring the system information necessary for establishing the link, the control unit 55 of the communication apparatus 50 determines that access to the cell is barred. In one example, in the case where both the first system information and the second system information fail to be acquired, the control unit 55 determines that access to the cell is barred. In this case, the control unit 55 terminates the initial connection process.

In the case where the system information is capable of being acquired, the control unit 55 executes the random access procedure on the basis of the first system information and/or the second system information (step S104). The random access procedure is sometimes called random access channel (RACH) procedure or random access (RA) procedure. Upon completion of the random access procedure, the communication apparatus 50 makes a transition from the idle state (RRC_IDLE) to the connected state (RRC_CONNECTED).

[2-7. Random Access Procedure]

The random access procedure is now described. The random access procedure is executed for the purpose of "RRC connection setup" from the idle state to the connected state (or inactive state), "state transition request" from the inactive state to the connected state, and so on. In addition, the random access procedure is also used for the purposes of "scheduling request" for requesting a resource for uplink data transmission and "timing advance adjustment" for adjusting uplink synchronization. In addition, the random access procedure is executed in cases such as "on-demand SI request" for requesting system information that has not been transmitted, "beam recovery" for recovering an interrupted beam connection, and "handover" for switching connected cells.

The "RRC connection setup" is an operation executed when the communication apparatus 50 is connected to the base station apparatus in response to the occurrence of traffic or the like. Specifically, it is an operation of delivering information regarding the connection (e.g., UE context) from the base station apparatus to the communication apparatus 50. The UE context is managed by predetermined communication apparatus identification information (e.g., C-RNTI) indicated by the base station apparatus. The communication apparatus 50, when completing this operation, makes a state transition from the idle state to the inactive state or the connected state.

The "state transition request" is an operation in which the communication apparatus 50 makes a state transition request from the inactive state to the connected state in response to the occurrence of traffic or the like. The transition to the connected state makes it possible for the communication apparatus 50 to transmit or receive unicast data to or from the base station apparatus.

The "scheduling request" is an operation in which the communication apparatus 50 makes a resource request for uplink data transmission in response to the occurrence of traffic or the like. The base station apparatus, when successfully receiving this scheduling request, assigns a PUSCH resource to the communication apparatus. Moreover, the scheduling request is also made over PUCCH.

The "timing advance adjustment" is an operation for adjusting the error between downlink and uplink frames caused by propagation delay. The communication apparatus 50 transmits the PRACH at the timing adjusted to the downlink frame. This makes it possible for the base station apparatus to recognize the propagation delay with the communication apparatus 50 and to indicate the value of the timing advance in the message 2 or the like to the communication apparatus 50.

The "on-demand SI request" is an operation of requesting the base station apparatus to transmit the system information in the case where the system information that has not transmitted because of the overhead of the system information or the like is necessary for the communication apparatus 50.

The "beam recovery" is an operation to request the recovery in the case where the communication quality deteriorates due to the movement of the communication apparatus 50 or the blocking of the communication path by another object after establishing the beam. The base station apparatus, when receiving this request, attempts to connect with the communication apparatus 50 using another beam.

The "handover" is an operation of switching the connection from a connected cell (a serving cell) to a cell adjacent to the cell (a neighbor cell) due to changes in the radio environment such as the movement of the communication apparatus 50. The communication apparatus 50 that has received the handover command from the base station apparatus makes a connection request to the neighbor cell specified by the handover command.

The random access procedure has a contention-based random access procedure and a non-contention based random access procedure. The contention-based random access procedure is first described.

Moreover, the random access procedure described below is a random access procedure assuming that the RAT supported by the communication system 1 is LTE. The random access procedure described below is, however, also applicable in the case where the RAT supported by the communication system 1 is other than LTE.

[Contention-Based Random Access Procedure]

Figure 11:
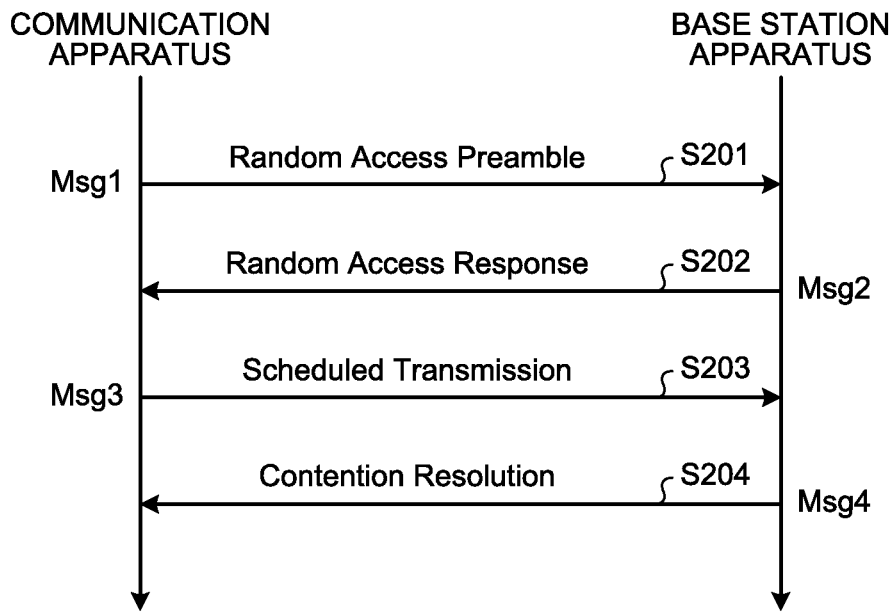
FIG. 11 is a diagram illustrating a contention-based random access procedure.

The contention-based random access procedure is the random access procedure carried out under the initiative of the communication apparatus 50. FIG. 11 is a diagram illustrating the contention-based random access procedure. The contention-based random access procedure is a four-step procedure starting from the transmission of a random access preamble from the communication apparatus 50 as illustrated in FIG. 11. The contention-based random access procedure includes steps of sending a random access preamble (Msg1), receiving a random access response (Msg2), sending a message (Msg3), and receiving a contention resolution message (Msg4).

The connection unit 553 of the communication apparatus 50 first randomly selects a preamble sequence to be used from a plurality of pre-set preamble sequences. The connection unit 553 then transmits a message including the selected preamble sequence (Msg1: random access preamble) to the base station apparatus as a connection destination (step S201). In this event, the base station apparatus can be the non-terrestrial base station apparatus 20 or the terrestrial base station apparatus 30. The description is hereinafter given on the assumption that the base station apparatus to which the connection unit 553 transmits the random access preamble is the non-terrestrial base station apparatus 20. The random access preamble is transmitted over PRACH.

When the non-terrestrial base station apparatus 20 receives the random access preamble, the control unit 23 of the non-terrestrial base station apparatus 20 causes a random access response as a response to the random access preamble (Msg2: random access response) to be transmitted to the communication apparatus 50. This random access response is transmitted over, in one example, PDSCH. The connection unit 553 receives the random access response (Msg2) transmitted from the base station apparatus (step S202). The random access response includes one or a plurality of random access preambles, which are receivable by the base station apparatus, and uplink (UL) resources (hereinafter referred to as an uplink grant) corresponding to the random access preamble. In addition, the random access response includes a temporary cell-radio network temporary identifier (TC-RNTI), which is assigned temporarily to the communication apparatus 50 by the base station apparatus and is a unique identifier of the communication apparatus 50.

When the communication apparatus 50 receives the random access response from the base station apparatus, the connection unit 553 of the communication apparatus 50 discriminates whether or not the received information includes the random access preamble transmitted in step S201. If the random access preamble is included, the connection unit 553 extracts the uplink grant corresponding to the random access preamble transmitted in step S201 from among the uplink grants included in the random access response. The connection unit 553 then transmits an UL message (Msg3: scheduled transmission) using the resource scheduled by the extracted uplink grant (step S203). The transmission of the message (Msg3) is performed using PUSCH. The message (Msg3) includes an RRC message for a radio resource control (RRC) connection request. In addition, the message (Msg3) includes the identifier of the communication apparatus 50.

In the contention-based random access procedure, the random access preamble randomly selected by the communication apparatus 50 is used. For that reason, the case may occur where the communication apparatus 50 transmits the random access preamble and, at the same time, another communication apparatus 50 transmits the same random access preamble to the non-terrestrial base station apparatus 20. Thus, the control unit 23 of the non-terrestrial base station apparatus 20 causes the identifier transmitted by the communication apparatus 50 in step S203 to be received to recognize which communication apparatus has preamble contention and resolve the contention. The control unit 23 causes contention resolution (Msg4: contention resolution) to be transmitted to the communication apparatus 50 selected as the result of the contention resolution. The contention resolution (Msg4) includes the identifier transmitted by the connection unit 553 in step S203. In addition, the contention resolution (Msg4) includes an RRC message for the RRC connection setup. The connection unit 553 receives the contention resolution message (Msg4) transmitted from the base station apparatus (step S204).

The connection unit 553 of the communication apparatus 50 compares the identifier transmitted in step S203 with the identifier received in step S204. If both identifiers do not match, the connection unit 553 restarts the random access procedure from step S201. If both identifiers match, the connection unit 553 performs the RRC connection operation and makes a transition from the idle state (RRC_IDLE) to the connected state (RRC_CONNECTED). The connection unit 553 uses the TC-RNTI acquired in step S202 as a cell-radio network temporary identifier (C-RNTI) in the subsequent communication. After making a transition to the connected state, the connection unit 553 transmits an RRC message of RRC connection setup completion to the base station apparatus. The RRC connection setup complete message is also referred to as "message-5". This series of operations allows the communication apparatus 50 to connect with the base station apparatus.

Moreover, the contention-based random access procedure illustrated in FIG. 11 is the 4-step random access procedure. However, the communication system 1 is also capable of supporting a 2-step random access procedure as the contention-based random access procedure. In one example, the connection unit 553 of the communication apparatus 50 transmits the random access preamble and the message (Msg3) shown in step S203. Then, the control unit 23 of the non-terrestrial base station apparatus 20 transmits the random access response (Msg2) and the contention resolution (Msg4) as a response. In this way, the random access procedure is completed in two steps, so the communication apparatus 50 is capable of connecting to the non-terrestrial base station apparatus 20 in a short time.

[Non-Contention Based Random Access Procedure]

Figure 12:
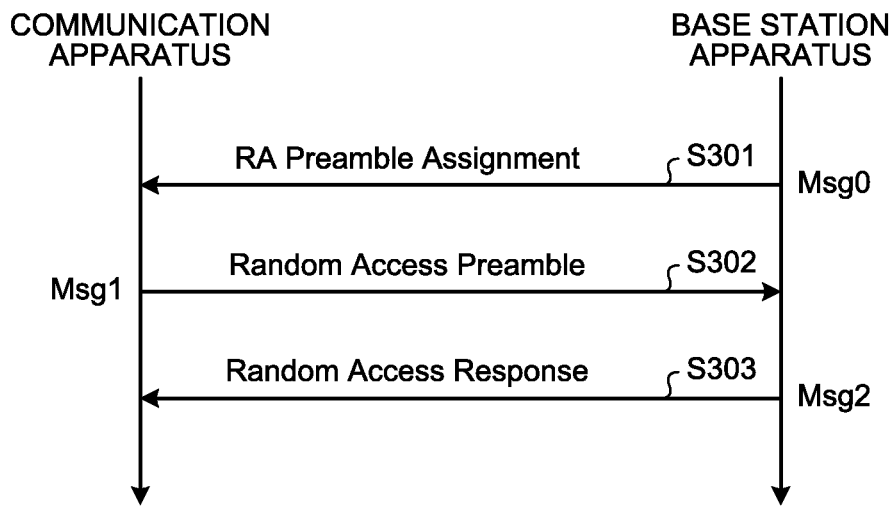
FIG. 12 is a diagram illustrating a non-contention based random access procedure.

The non-contention based random access procedure is now described. The non-contention based random access procedure is a random access procedure carried out under the initiative of the base station apparatus. FIG. 12 is a diagram illustrating the non-contention based random access procedure. The non-contention based random access procedure is a 3-step procedure starting from the transmission of the random access preamble assignment from the base station apparatus. The non-contention based random access procedure includes the steps of receiving a random access preamble assignment (Msg0), transmitting a random access preamble (Msg1), and receiving a random access response (Msg2). Moreover, the following description of the random access procedure is given on the assumption that the base station apparatus is the non-terrestrial base station apparatus 20. However, the base station apparatus can be the terrestrial base station apparatus 30.

In the contention-based random access procedure, the connection unit 553 of the communication apparatus 50 randomly selects the preamble sequence. However, in the non-contention based random access procedure, the non-terrestrial base station apparatus 20 assigns individually a random access preamble to the communication apparatus 50. The connection unit 553 of the communication apparatus 50 receives the random access preamble assignment (Msg0: RA preamble assignment) from the non-terrestrial base station apparatus 20 (step S301).

The connection unit 553 of the communication apparatus 50 executes random access to the non-terrestrial base station apparatus 20 using the random access preamble assigned in step S301. In other words, the connection unit 553 of the communication apparatus 50 transmits the assigned random access preamble (Msg1: random access preamble) to the non-terrestrial base station apparatus 20 over PRACH (step S302).

The control unit 23 of the non-terrestrial base station apparatus 20 receives the random access preamble (Msg1) from the communication apparatus 50. Then, the control unit 23 transmits a random access response to the random access preamble (Msg2: random access response) to the communication apparatus 50 (step S303). The random access response includes, in one example, uplink grant information corresponding to the received random access preamble. The connection unit 553 of the communication apparatus 50, when receiving the random access response (Msg2), performs the RRC connection operation and makes a transition from the idle state (RRC_IDLE) to the connected state (RRC_CONNECTED).

In this way, in the non-contention based random access procedure, the base station apparatus schedules a random access preamble, so preamble collision is difficult to occur.

[Details of NR Random Access Procedure]

The preceding description is given of the random access procedure assuming that the RAT supported by the communication system 1 is LTE. Moreover, the above-mentioned random access procedure is applicable to RATs other than LTE. A random access procedure assuming that the RAT supported by the communication system 1 is NR is now described in detail. Moreover, the following description is given in detail of the four steps relating to Msg1 to Msg4 illustrated in FIG. 11 or 12. The step of Msg1 corresponds to step S201 illustrated in FIG. 11 and step S302 illustrated in FIG. 12. The step of Msg2 corresponds to step S202 illustrated in FIG. 11 and step S303 illustrated in FIG. 12. The step of Msg3 corresponds to step S203 illustrated in FIG. 11. The step of Msg4 corresponds to step S204 illustrated in FIG. 11.

[Random Access Preamble (Msg1) of NR]

In NR, PRACH is called NR-physical random access channel (NR-PRACH). The NR-PRACH is configured using a Zadoff-Chu sequence or an M sequence. In NR, a plurality of preamble formats is defined as the NR-PRACH format. The preamble format is defined by a combination of parameters such as PRACH subcarrier spacing, transmission bandwidth, sequence length, number of symbols used for transmission, number of transmission repetitions, cyclic prefix (CP) length, and guard period length. Moreover, the preamble format may specify the type of sequence (Zadoff-Chu sequence or M sequence) used for NR-PRACH transmission. The types of NR-PRACH preamble sequences are numbered. The type number of the preamble sequences is called a preamble index.

In NR, for the communication apparatus 50 in the idle state, the configuration regarding NR-PRACH is made using the system information. Furthermore, for the communication apparatus 50 in the connected state, the configuration regarding NR-PRACH is made using the dedicated RRC signaling.

The connection unit 553 of the communication apparatus 50 transmits NR-PRACH using a physical resource (NR-PRACH occasion) capable of transmitting NR-PRACH. The physical resource is indicated by the configuration for NR-PRACH. The connection unit 553 of the communication apparatus 50 selects any of physical resources and transmits NR-PRACH. Furthermore, in the case where the communication apparatus 50 is in the connected state, the connection unit 553 transmits NR-PRACH using an NR-PRACH resource. The NR-PRACH resource is a combination of the NR-PRACH preamble and its physical resource. The base station apparatus is capable of indicating the NR-PRACH resource to the communication apparatus 50. In this event, the base station apparatus can be the non-terrestrial base station apparatus 20 or the terrestrial base station apparatus 30. The following description for the NR random access procedure is given on the assumption that the base station apparatus is the non-terrestrial base station apparatus 20.

Moreover, the NR-PRACH is transmitted even when the random access procedure fails. The connection unit 553 of the communication apparatus 50, when retransmitting NR-PRACH, waits for the transmission of NR-PRACH for a waiting period calculated from a backoff value (backoff indicator, BI). Moreover, the backoff value can vary depending on the terminal category of the communication apparatus 50 and the priority of occurred traffic. In this event, a plurality of backoff values is notified, and the communication apparatus 50 selects the backoff value to be used depending on the priority. In addition, the connection unit 553, when retransmitting NR-PRACH, increases the transmission power of NR-PRACH as compared with the initial transmission. This procedure is called power ramping.

[Random Access Response (Msg2) of NR]

The NR random access response is transmitted using an NR-physical downlink shared channel (NR-PDSCH). The NR-PDSCH including the random access response is scheduled using the NR-physical downlink control channel (NR-PDCCH) in which the cyclic redundancy check (CRC) is scrambled by the RA-RNTI. The NR-PDCCH is transmitted on the common control sub-band. The NR-PDCCH is located in the common search space (CSS). Moreover, the value of random access-radio network temporary identifier (RA-RNTI) is decided on the basis of the transmission resource of NR-PRACH corresponding to the random access response. The transmission resources of the NR-PRACH are, in one example, time resources (slots or subframes) and frequency resources (resource blocks). Moreover, the NR-PDCCH can be arranged in the search space associated with the NR-PRACH linked to the random access response. Specifically, the search space in which the NR-PDCCH is arranged is set in association with the preamble of the NR-PRACH and/or the physical resource in which the NR-PRACH is transmitted. The search space in which the NR-PDCCH is arranged is set in association with the preamble index and/or the physical resource index. The NR-PDCCH is an NR-synchronization signal (NR-SS) and Quasi co-location (QCL).

The random access response of NR is medium access control (MAC) information. The random access response of NR includes at least the uplink grant for transmitting the message-3 of NR, the value of the timing advance used for adjusting the uplink frame synchronization, and the value of TC-RNTI. In addition, the random access response of NR includes the PRACH index used for NR-PRACH transmission corresponding to the random access response. In addition, the random access response of NR includes information regarding backoff used for waiting for PRACH transmission.

The control unit 23 of the non-terrestrial base station apparatus 20 transmits the random access response over NR-PDSCH. The connection unit 553 of the communication apparatus 50 determines whether or not the random access preamble is successfully transmitted, from the information included in the random access response. The connection unit 553, when determining that the transmission of the random access preamble fails, performs the process of transmitting the message-3 (Msg3) of NR in accordance with the information included in the random access response. On the other hand, if the transmission of the random access preamble fails, the connection unit 553 determines that the random access procedure fails and performs the NR-PRACH retransmission process.

Moreover, the random access response of NR can include a plurality of uplink grants for transmitting the message-3 (Msg3) of NR. The connection unit 553 of the communication apparatus 50 is capable of selecting one resource for transmitting the message-3 (Msg3) from among the plurality of uplink grants. This makes it possible to mitigate the transmission collision of the message-3 (Msg3) of NR in the case where different communication apparatuses 50 receive the same NR random access response. Consequently, it is possible for the communication system 1 to provide a more stable random access procedure.

[Message-3 (Msg3) of NR]

The message-3 (Msg3) of NR is transmitted over the NR-physical uplink shared channel (NR-PUSCH). The NR-PUSCH is transmitted using the resource indicated by the random access response. The message-3 of NR includes the RRC connection request message. The NR-PUSCH format is indicated by the parameter included in the system information. In one example, which of orthogonal frequency division multiplexing (OFDM) and discrete Fourier transform spread OFDM (DFT-s-OFDM) is used as the NR-PUSCH format is determined depending on the parameter.

The control unit 23 of the non-terrestrial base station apparatus 20, when normally receiving the message-3 of NR, shifts to the process of transmitting the contention resolution (Msg4). On the other hand, the control unit 23, when failing to receive normally the message-3 of NR, attempts to receive the message-3 of NR again for at least a predetermined period. As an example, the control unit 23 instructs the communication apparatus 50 to retransmit the message-3. In this event, the control unit 23 transmits an instruction to retransmit the message-3 using the downlink resource after a predetermined number of slots (or subframes or radio frames) from the resource indicating the transmission of the message-3.

An example of the retransmission of the message-3 and the instruction of the transmission resource can include an instruction by the retransmission of the random access response. The NR-PDSCH including the random access response to be retransmitted is scheduled by the NR-PDCCH of which CRC is scrambled by RA-RNTI. The same value as the value of RA-RNTI used in the initial transmission is used as the value of RA-RNTI. In other words, the value is decided on the basis of the NR-PRACH transmission resource corresponding to the random access response. In addition, the value of RA-RNTI is determined on the basis of the information used to identify the initial transmission and the retransmission each other in addition to the transmission resource of NR-PRACH. The NR-PDCCH is arranged in the common search space (CSS).

Further, the NR-PDSCH including the random access response to be retransmitted is scheduled by the NR-PDCCH of which CRC is scrambled by TC-RNTI or C-RNTI included in the random access response transmitted in the initial transmission.

Another example of the instruction to retransmit the message-3 and the transmission resource includes an instruction by the NR-PDCCH used for the instruction to retransmit the message-3. The NR-PDCCH is an uplink grant. The downlink control information (DCI) of the NR-PDCCH indicates the resource for retransmitting the message-3. The connection unit 553 of the communication apparatus 50 retransmits the message-3 on the basis of the instruction of the uplink grant.

A specific example of the process after failing normally to receive the message-3 of NR includes an example in which the control unit 23 of the non-terrestrial base station apparatus 20 attempts to receive the message-3 in the retransmission resource instructed in advance. Upon transmitting no contention resolution from the non-terrestrial base station apparatus 20 after transmitting the message-3 within the predetermined period, the connection unit 553 of the communication apparatus 50 transmits the NR-PUSCH including the message-3 using the retransmission resource instructed in advance.

Further, the connection unit 553 of the communication apparatus 50, when receiving a negative-acknowledgement (NACK) as a response to the message-3, transmits the NR-PUSCH including the message-3 using the pre-indicated retransmission resource corresponding to the negative-acknowledgement. The information regarding the "pre-indicated retransmission resource" is included, in one example, in the system information or the random access response.

Moreover, if the number of times the message-3 of NR is retransmitted exceeds a predetermined number of times or if the reception of the NR contention resolution is not successful within a predetermined period, the connection unit 553 of the communication apparatus 50 regards the random access procedure as a failure and performs the NR-PRACH retransmission process. Moreover, the transmission beam of the communication apparatus 50 that is used for retransmitting the message-3 of NR can be different from the transmission beam of the communication apparatus 50 that is used for the initial transmission of the message-3. Moreover, if neither the NR contention resolution nor the retransmission instruction of the message-3 is received within the predetermined period, the connection unit 553 of the communication apparatus 50 regards the random access procedure as a failure and performs the NR-PRACH retransmission process. The predetermined period is set, in one example, using the system information.

[Contention Resolution (Msg4) of NR]

The contention resolution of NR is transmitted using the NR-PDSCH. The NR-PDSCH including the contention resolution is scheduled by the NR-PDCCH of which CRC is scrambled by the TC-RNTI or C-RNTI. The NR-PDCCH is transmitted on the common control sub-band. The NR-PDCCH is located in user equipment-specific search space (USS). Moreover, the NR-PDCCH can be placed in the CSS.

The connection unit 553 of the communication apparatus 50 transmits an acknowledgement (ACK) to the non-terrestrial base station apparatus 20 in the case of the normal reception of the NR-PDSCH including the contention resolution. Then, the communication apparatus 50 regards the random access procedure as successful and comes into the connected state (RRC_CONNECTED). On the other hand, if a negative acknowledgement (NACK) to the NR-PDSCH is received from the communication apparatus 50, or if there is no response, the control unit 23 of the non-terrestrial base station apparatus 20 retransmits the NR-PDSCH including the contention resolution. The connection unit 553 of the communication apparatus 50, when failing to receive the NR contention resolution (Msg4) within the predetermined period, regards the random access procedure as a failure and performs the retransmission process of the random access preamble (Msg1).

[2-8. Handover]

The communication apparatus 50 that succeeded in the random access procedure makes a transition to the connected state (RRC_CONNECTED). Moreover, in the communication system 1, even if the communication apparatus 50 is in the connected state, the base station apparatus as a connection destination is switched with the movement of the communication apparatus 50 or the base station apparatus.

Figure 13:
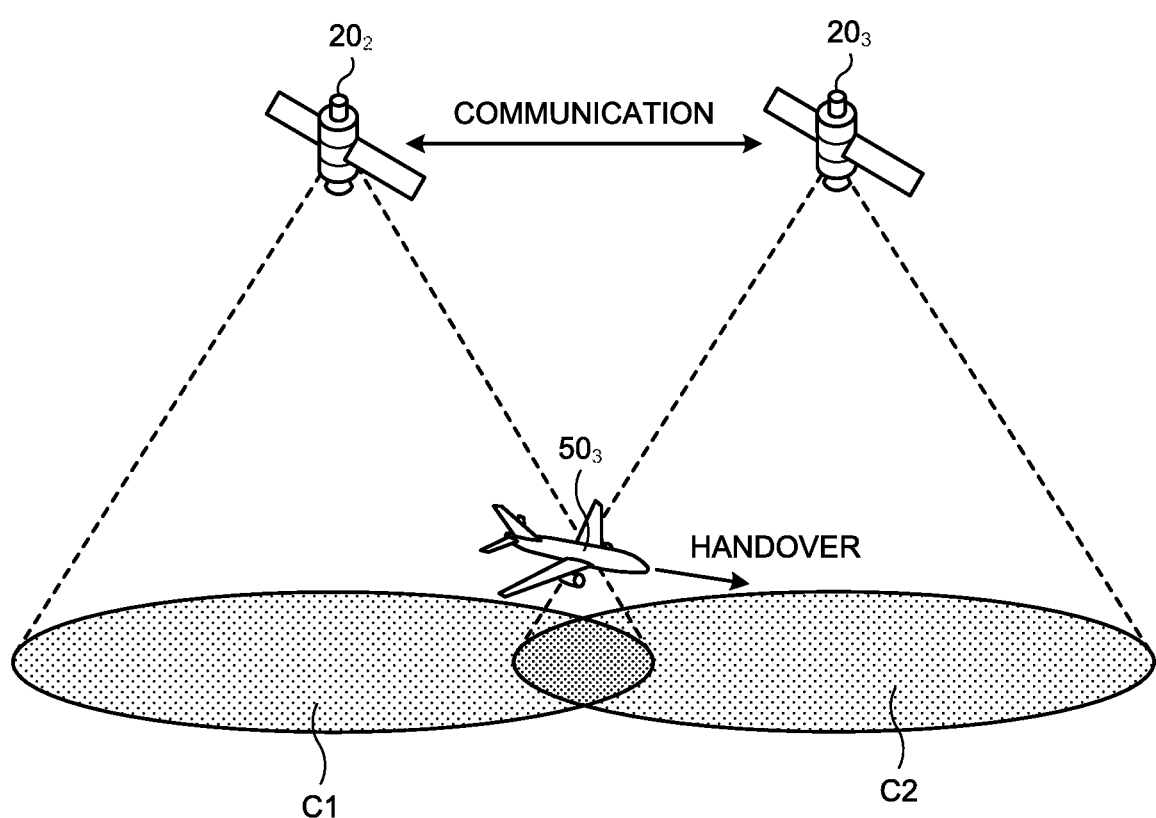
FIG. 13 is a diagram illustrating how to switch a base station apparatus as a connection destination.

FIG. 13 is a diagram illustrating how to switch the base station apparatus as a connection destination. FIG. 13 shows, as an example of the switching of the base station apparatus as a connection destination, a handover in which the communication apparatus 50 switches a cell as the connection destination. In the example of FIG. 13, the non-terrestrial base station apparatus 20₂ and the non-terrestrial base station apparatus 20₃ are shown as base station apparatuses. Both the non-terrestrial base station apparatus 20₂ and the non-terrestrial base station apparatus 20₃ are low earth orbit satellite station equipment. The non-terrestrial base station apparatus 20₂ forms a cell C1 on the ground, and the non-terrestrial base station apparatus 20₂ forms a cell C2 on the ground. In the example of FIG. 13, the communication apparatus 50₃ is a communication apparatus mounted in an aircraft. The communication apparatus 50₃ moves with the movement of the aircraft. With the movement of the non-terrestrial base station apparatuses 20₂, 20₃ and the communication apparatus 50₃, a handover occurs in which the cell as a connection destination of the communication apparatus 50₃ is switched from the cell C1 to the cell C2.

In the case where the non-terrestrial base station apparatus 20 is a satellite, the non-terrestrial base station apparatus 20 is located far away from the communication apparatus 50, so it is envisioned that the signal propagation delay increases. In one example, in the case where the non-terrestrial base station apparatus 20 is a geostationary earth orbit satellite located at 35,786 km above the ground, the propagation delay of a round trip signal is estimated to be, in one example, 272.37 ms. In addition, even in the case where the non-terrestrial base station apparatus 20 is a low earth orbit satellite located at 600 km above the ground, the round-trip propagation delay is estimated to be, in one example, 14.2 ms. Considering that the maximum value of the current timing advance of LTE is approximately 0.67 ms, the propagation delay of these signals is significantly large.

Further, in the case where the non-terrestrial base station apparatus 20 is a satellite (especially, a low earth orbit satellite), it is envisioned that the non-terrestrial base station apparatus 20 moves at high speed. In one example, in the case of a low earth orbit satellite, its speed reaches 270,000 km/h. In addition, it is also envisioned that the communication apparatus 50 moves at high speed. In one example, the speed of an airplane reaches 1000 km/h. In addition, some high-speed trains can reach 500 km/h, and some automobiles can reach 250 km/h.

In these cases, it can be envisaged that the communication apparatus 50 has already been moved out of the communication area of the non-terrestrial base station apparatus 20 as a source before the communication apparatus 50 receives the handover command. In this case, the communication apparatus 50 will fail to perform a handover and so there is a risk that the cell search of the initial connection process is necessary to be performed again. Given the situation, the communication delay increases, and the communication quality of the communication apparatus 50 may deteriorate.

Thus, the present embodiment allows the communication apparatus 50 to switch the base station apparatus as a connection destination without depending on the handover command. This reduces the risk that the communication apparatus 50 will fall into a handover failure. Consequently, the communication apparatus 50 can achieve high-quality communication. In the following description, a handover process that does not depend on a handover command is referred to hereinafter as "handover process without handover command".

The handover process according to the present embodiment is now described in detail. The description of the "handover process with handover command" is first given before the description of the "handover process without handover command" to facilitate understanding of the "handover process without handover command". Then, the description of the "handover process without handover command" is given in detail.

[2-9. Handover Process (with Handover Command)]

Figure 14:
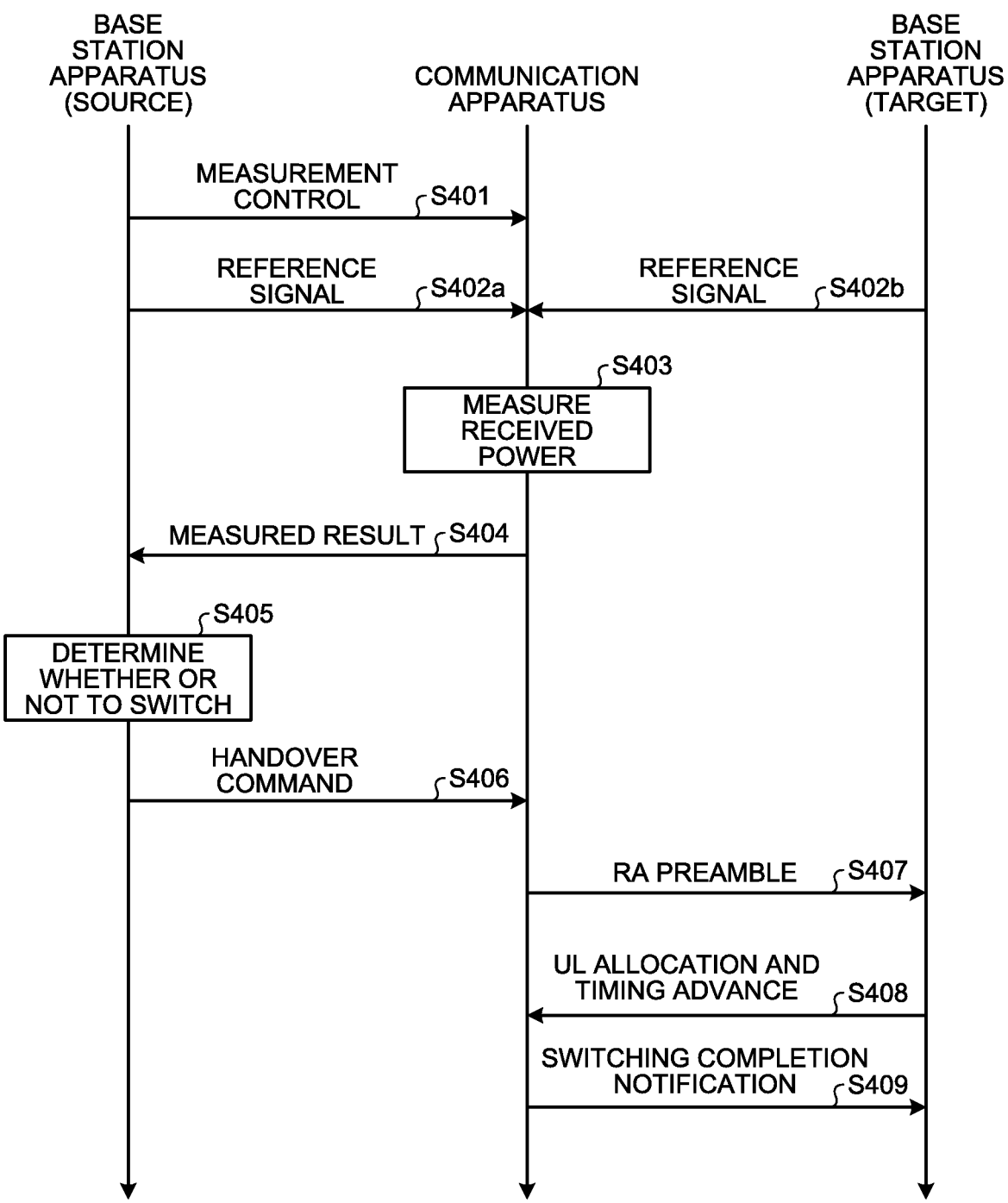
FIG. 14 is a sequence diagram showing an example of a handover process with handover command, according to the first embodiment of the present disclosure.

FIG. 14 is a sequence diagram showing an example of the handover process with a handover command according to the first embodiment of the present disclosure. Moreover, in the handover process with handover command, it is assumed that the connected base station apparatus (source base station apparatus) and a switching destination base station apparatus (target base station apparatus) are both the terrestrial base station apparatus 30. The following description is given on the assumption that the terrestrial base station apparatus 30 connected to the communication apparatus 50 is referred to as "source terrestrial base station apparatus 30" or "terrestrial base station apparatus 30 (source)". In addition, the terrestrial base station apparatus 30 to be a switching destination for connection of the communication apparatus 50 is referred to as "target terrestrial base station apparatus 30" or "terrestrial base station apparatus 30 (target)".

Moreover, the source and target base station apparatuses are not limited to the terrestrial base station apparatus 30, and in one example, can be the non-terrestrial base station apparatus 20. One of the source and target base station apparatuses can be the terrestrial base station apparatus 30 and the other can be the non-terrestrial base station apparatus 20. In addition, a plurality of target base station apparatuses can be provided.

The handover process is now described with reference to FIG. 14. The handover process described below is executed in the case where the connection between the terrestrial base station apparatus 30 (source) and the communication apparatus 50 is established.

The control unit 34 of the terrestrial base station apparatus 30 (source) first transmits measurement control information of the received signal to the communication apparatus 50. In one example, the control unit 34 transmits, as the measurement control information, an RRC connection reconfiguration message including a measurement configuration (MC) of the received signal. The receiver 555 of the communication apparatus 50 receives the measurement control information including the measurement configuration of the received signal from the terrestrial base station apparatus 30 (source) (step S401).

The source and target terrestrial base station apparatuses 30 each transmit a reference signal used for measuring the received signal (steps S402*a* and S402*b*). The acquisition unit 551 of the communication apparatus 50 measures the received power on the basis of the measurement configuration (MC) included in the measurement control information and acquires the measured value obtained by measuring the received power (step S403). The measured value of the received power is, in one example, reference signal received power (RRSP) or reference signal received quality (RSRQ). Then, the transmitter 556 of the communication apparatus 50 sends a measured result (MR) of the received power to the terrestrial base station apparatus 30 (source) in accordance with the condition described in the measurement configuration (MC) (step S404).

The control unit 34 of the terrestrial base station apparatus 30 (source) receives the measured result (MR) from the communication apparatus 50. Then, the control unit 34 determines whether or not to switch the base station apparatus as a connection destination of the communication apparatus 50 on the basis of the measured result (MR) (step S405). In the case where the base station apparatus as a connection destination is not switched, the terrestrial base station apparatus 30 (source) continues communication with the communication apparatus 50.

In the case of switching the base station apparatus as a connection destination, the control unit 34 of the terrestrial base station apparatus 30 (source) selects the terrestrial base station apparatus 30 to be a switching destination (a handover destination) of the communication apparatus 50. Then, the control unit 34 transmits a handover command, which is created by the terrestrial base station apparatus 30 (target), to the communication apparatus 50 (step S406). The handover command can include information such as radio resource configuration and security configuration.

Moreover, the terrestrial base station apparatus 30 (source) can acquire the handover command from the terrestrial base station apparatus 30 (target) through communication that does not involve the core network (CN) (e.g., direct communication using an X2 or Xn interface). The terrestrial base station apparatus 30 (source) can understandably acquire a handover command from the terrestrial base station apparatus 30 (target) through communication via the core network (CN) (e.g., indirect communication using an S1 or NG interface).

The communication apparatus 50, when acquiring the handover command, synchronizes with the terrestrial base station apparatus 30 (target) using the random access procedure. In one example, the connection unit 553 of the communication apparatus 50 transmits the random access preamble (Msg1) to the terrestrial base station apparatus 30 (target) (step S407). Then, the connection unit 553 receives a random access response (Msg2) including information such as uplink radio resource allocation (UL allocation) and timing advance from the terrestrial base station apparatus 30 (target) (step S408). Then, the connection unit 553 synchronizes with the terrestrial base station apparatus 30 (target) on the basis of the received information.

The connection unit 553 of the communication apparatus 50, when synchronizing with the terrestrial base station apparatus 30 (target), sends a switching completion notification to the terrestrial base station apparatus 30 (target) (step S409). In one example, the connection unit 553 transmits a handover completion message (RRC Connection Reconfiguration Complete) to the terrestrial base station apparatus 30 (target) as a switching completion notification. This completes the handover process.

As described above, the communication apparatus 50 in the connected state (RRC_CONNECTED) is capable of switching the base station apparatus as a connection destination without interruption of communication.

[2-10. Handover Process (without Handover Command)]

The handover process without handover command is now described. In the handover process without handover command, the communication apparatus 50 acquires the switching information in advance from the non-terrestrial base station apparatus 20 (source) before acquiring a handover command from the non-terrestrial base station apparatus 20 (source). The switching information is herein information used to switch the base station apparatus as a connection destination. In one example, the switching information is handover-related information. Then, the communication apparatus 50 discriminates whether or not to execute the handover by itself, and connects to the non-terrestrial base station apparatus 20 (target) using the switching information before receiving the handover command.

Figure 15:
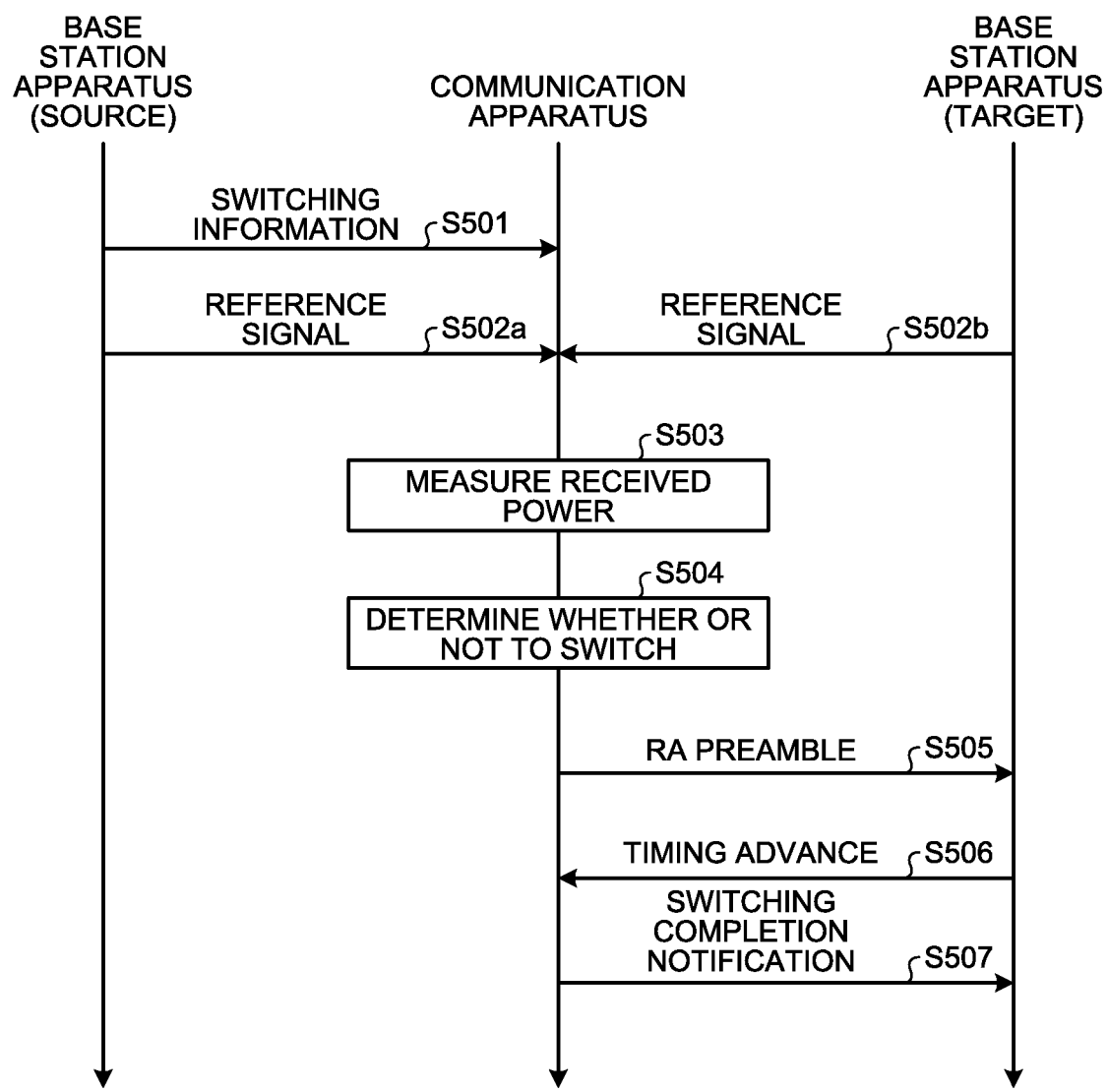
FIG. 15 is a sequence diagram showing an example of a handover process without handover command, according to the first embodiment of the present disclosure.

The handover process without handover command according to the first embodiment is now described. FIG. 15 is a sequence diagram showing an example of the handover process without handover command according to the first embodiment of the present disclosure. The handover process described below is executed in the case where the connection between the non-terrestrial base station apparatus 20 (source) and the communication apparatus 50 is established.

Moreover, in the processing described below, the source and target non-terrestrial base station apparatuses 20 can be satellite station equipment or aircraft station equipment. In addition, the source and target base station apparatuses are not limited to the non-terrestrial base station apparatus 20 and can be, in one example, the terrestrial base station apparatus 30. One of the source and target base station apparatuses can be the non-terrestrial base station apparatus 20 and the other can be the terrestrial base station apparatus 30.

The transmitter 235 of the non-terrestrial base station apparatus 20 (source) first transmits switching information to the communication apparatus 50 connected thereto. The receiver 555 of the communication apparatus 50 receives the switching information from the non-terrestrial base station apparatus 20 (source) (step S501). The receiver 555 then stores the received switching information in the storage unit 52 as the switching information.

In this event, the switching information can be handover-related information. In one example, the switching information is information such as a cell ID of the base station apparatus as a handover destination candidate, the UL/DL carrier frequency of the base station apparatus as a handover destination candidate, and the bandwidth of the base station apparatus as a handover destination candidate. In addition, the handover information can be information such as a unique ID (e.g., C-RNTI) of the communication apparatus 50 after the handover and a radio resource configuration after the handover.

Moreover, the information included in the switching information is not limited to those described above. In one example, the switching information can include information relating to radio resources (resource information) used for wireless communication with the base station apparatus as a switching destination candidate. In this event, the resource information can be, in one example, information relating to a radio resource for random access preamble transmission (hereinafter referred to as PRACH transmission resource information) or information relating to a preamble sequence (hereinafter referred to as preamble sequence information).

The PRACH transmission resource information is information regarding a physical resource used by the communication apparatus 50 to transmit the PRACH to the base station apparatus as a switching destination for connection. In one example, the PRACH transmission resource information is a physical resource (e.g., NR-PRACH occasions) capable of transmitting the PRACH or a PRACH resource. The PRACH resource is, in one example, the above-mentioned NR-PRACH resource.

The preamble sequence information is a sequence relating to random access preamble transmission and is information relating to a sequence used by the communication apparatus 50 to connect to the base station apparatus as a switching destination for connection. In one example, it is information regarding the preamble format (e.g., NR-PRACH format) of the random access preamble that the communication apparatus 50 transmits to the base station apparatus as a switching destination for connection. Moreover, the preamble format can be the information of a combination of parameters such as PRACH subcarrier spacing, transmission bandwidth, sequence length, the number of symbols used for transmission, the number of transmission repetitions, the CP length, and the guard period length. The preamble sequence information can be information indicating the type of a sequence used for PRACH transmission (e.g., information indicating Zadoff-Chu sequence or M sequence).

Moreover, the resource information, such as the PRACH transmission resource information and the preamble sequence information, can be information regarding a dedicated radio resource exclusively assigned to the communication apparatus 50. In this event, both the PRACH transmission resource information and the preamble sequence information can be information regarding a radio resource dedicated to the communication apparatus 50. In addition, either one of the preamble resource information and the preamble sequence information can be the information regarding the radio resource dedicated to the communication apparatus 50. In one example, the PRACH transmission resource information can be a radio resource shared with other communication apparatus 50, and the preamble sequence information can be a radio resource dedicated to the communication apparatus 50. In contrast, the PRACH transmission resource information can be a radio resource dedicated to the other communication apparatus 50, and the preamble sequence information can be a radio resource shared with the other communication apparatus 50. The use of the dedicated radio resource increases the likelihood of success of the random access procedure of the communication apparatus 50.

Moreover, the resource information can be information regarding a radio resource being shared. In this event, the shared radio resource is not necessarily a radio resource common to all the wireless communication apparatuses. In one example, it can be a radio resource shared by a plurality of selected wireless communication apparatuses including the communication apparatus 50. More specifically, the resource information can be information regarding radio resources, which are assigned exclusively to the communication apparatus group including a selected predetermined number of wireless communication apparatuses including the connected communication apparatus 50 but are shared by a predetermined number of wireless communication apparatuses. In addition, the switching information can include resource information of each of the plurality of base station apparatuses as switching destination candidates.

Further, the switching information can include trigger information used by the communication apparatus 50 to discriminate whether or not to switch the base station apparatus as a connection destination. In this event, the trigger information can be information that is used for the communication apparatus 50 to determine whether or not to switch the base station apparatus as a connection destination using the information of the received power (e.g., such as RSRP and RSRQ). In one example, the trigger information can be a determination threshold value (the first trigger value) relating to the measured value (such as RSRP and RSRQ) of the power received from the connected base station apparatus or can be a difference value between two measured values of power (the second trigger value).

Next, the source and target non-terrestrial base station apparatus 20 each transmit a reference signal used for measuring the received signal (steps S502a and S502b). The receiver 555 of the communication apparatus 50 measures the received power and acquires the measured value obtained by measuring the received power (RSRP, RSRQ, or the like) (step S503).

Then, the determination unit 552 of the communication apparatus 50 determines whether or not to switch the base station apparatus as a connection destination on the basis of the measured value of the received power (step S504). In one example, the communication apparatus 50 determines to execute the handover in the case where the measured value of the power received from the non-terrestrial base station apparatus 20 (source) is lower than the first trigger value. In addition, the communication apparatus 50 determines to execute the handover in the case where the measured value of the power received from the non-terrestrial base station apparatus 20 (target) is larger, by the second trigger value or more, than the measured value of the power received from the non-terrestrial base station apparatus 20 (source).

In the case where the base station apparatus as a connection destination is determined not to be switched, the communication apparatus 50 maintains the connection with the non-terrestrial base station apparatus 20 (source). The communication apparatus 50, when determining to switch the base station apparatus as a connection destination, executes connection to the non-terrestrial base station apparatus 20 (target) using the random access procedure. Moreover, in the case where the switching information includes switching information regarding the plurality of base station apparatuses as switching destination candidates (e.g., resource information), the connection to one base station apparatus selected from the plurality of base station apparatuses as switching destination candidates is executed. In this event, the connection unit 553 of the communication apparatus 50 generates a random access preamble on the basis of the PRACH transmission resource information and preamble sequence information included in the switching information. Then, the connection unit 553 transmits the generated random access preamble to the non-terrestrial base station apparatus 20 (target) (step S505).

Then, the connection unit 553 receives a random access response (Msg2) including the timing advance information from the non-terrestrial base station apparatus 20 (target) (step S506). Then, the connection unit 553 synchronizes with the non-terrestrial base station apparatus 20 (target) on the basis of the received information.

The connection unit 553 of the communication apparatus 50, when synchronizing with the non-terrestrial base station apparatus 20 (target), sends a switching completion notification to the non-terrestrial base station apparatus 20 (target) (step S507). In one example, the connection unit 553 transmits a handover completion message to the non-terrestrial base station apparatus 20 (target) as a switching completion notification. This completes the handover process.

As described above, the communication apparatus 50 in the connected state (RRC_CONNECTED) is capable of switching the base station apparatus as a connection destination without involving the step of transmitting the measured result (MR) of the received power and the step of receiving the handover command. The communication apparatus 50 does not move out of the communication area of the source non-terrestrial base station apparatus 20 during the execution of these steps, so the handover is less likely to fail. Thus, it is possible for the communication system 1 to achieve high-quality communication.

Further, in the case where the switching information includes information regarding a dedicated radio resource, the use of the dedicated radio resource by the communication apparatus 50 enables the random access procedure of the communication apparatus 50 to be less likely to fail. Thus, the communication apparatus 50 is capable of maintaining the quality of communication high.

Further, in the case where the switching information includes information regarding a radio resource shared by the plurality of selected wireless communication apparatuses and the connection is switched using the shared radio resource, the communication apparatus 50 is likely to compete for random access procedures with other communication apparatus. However, the possibility of contention is low as compared to the case of using a common radio resource for all the communication apparatuses. Thus, the communication apparatus 50 is capable of maintaining high communication quality while efficiently using radio resources.

Further, in the case where the switching information includes the switching information regarding each of the plurality of base station apparatuses as switching destination candidates (e.g., resource information), the communication apparatus 50 is capable of selecting the connection destination by itself, and so it is possible to maintain high communication quality.

[2-11. Switching Information Transmission Process]

Figure 16:
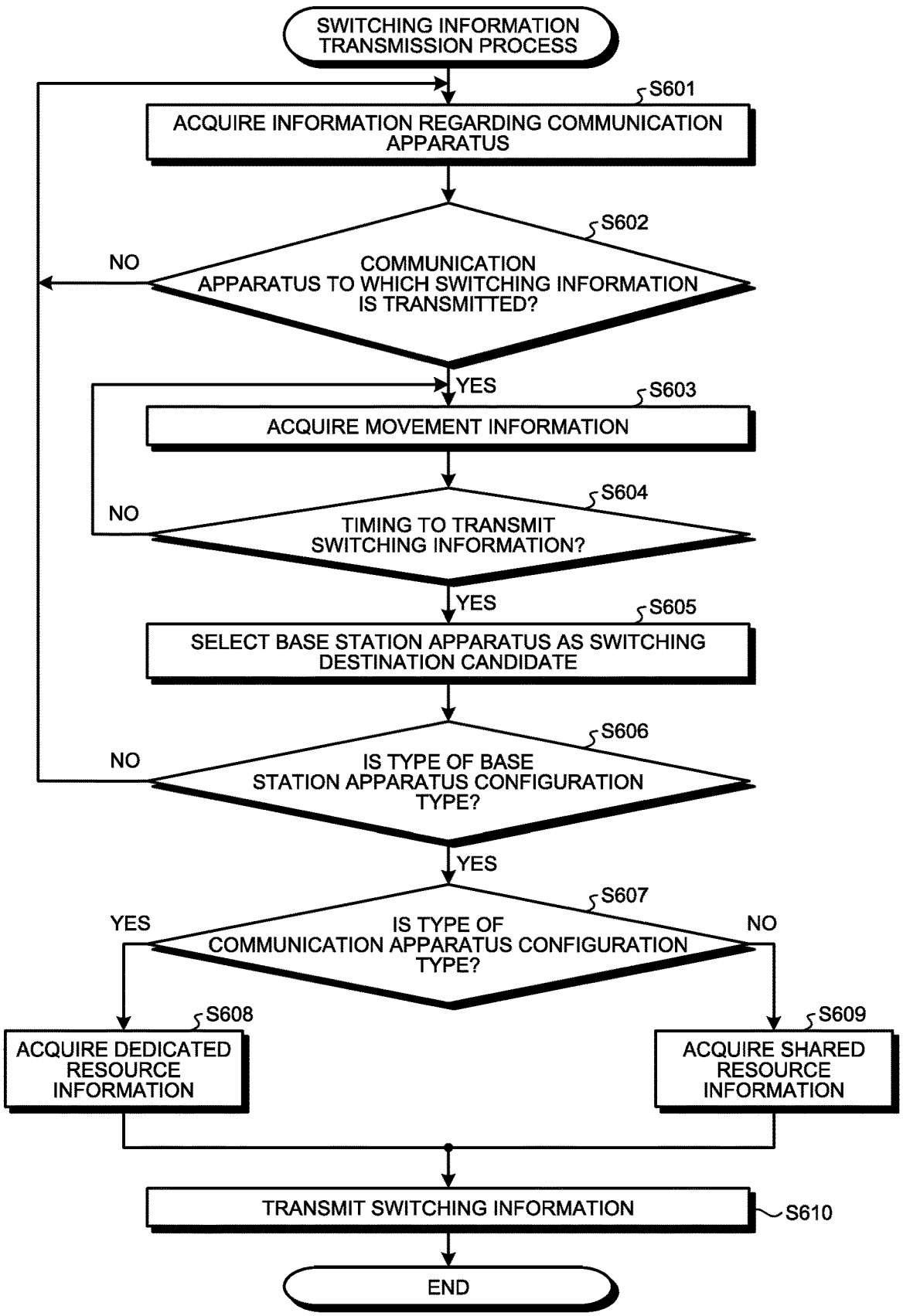
FIG. 16 is a flowchart showing an example of a switching information transmission process according to the first embodiment of the present disclosure.

The base station apparatus transmits the switching information to the communication apparatus 50 connected thereto, in one example, as shown in step S501 of FIG. 15. The process of transmitting the switching information is now described in detail. FIG. 16 is a flowchart showing an example of the switching information transmission process according to the first embodiment of the present disclosure. The following description is given on the assumption that the base station apparatus connected to the communication apparatus 50 is the non-terrestrial base station apparatus 20, but the base station apparatus is not limited to the non-terrestrial base station apparatus 20 and can be the terrestrial base station apparatus 30.

The switching information transmission process is now described with reference to FIG. 16. The non-terrestrial base station apparatus 20, when connecting with the communication apparatus 50, starts the switching information transmission process. The non-terrestrial base station apparatus 20 is capable of executing a plurality of processes in parallel. The non-terrestrial base station apparatus 20, when connecting to a plurality of communication apparatuses 50, executes the switching information transmission process for each of the plurality of communication apparatuses 50.

The acquisition unit 231 of the non-terrestrial base station apparatus 20 acquires information regarding the communication apparatus 50 connected thereto (step S601). In this event, the acquisition unit 231 can acquire the information regarding the communication apparatus 50 from the communication apparatus 50 connected thereto or the management apparatus 10. In addition, the acquisition unit 231 can acquire the information regarding the communication apparatus 50 from a server (e.g., a server of a wireless communication provider) connected via the core network (CN). In addition, if the information regarding the communication apparatus 50 is previously stored in the storage unit 22, the acquisition unit 231 can acquire the information regarding the communication apparatus 50 from the storage unit 22.

In this event, the acquisition unit 231 can acquire information regarding a type of the communication apparatus 50 as the information regarding the communication apparatus 50. In one example, the acquisition unit 231 can acquire, as the type information of the communication apparatus 50, information indicating the hardware type of the communication apparatus 50. The information indicating the hardware type can be, in one example, model information indicating the model number or the like of the communication apparatus 50. In addition, the information indicating the hardware type can be information indicating whether the communication apparatus 50 is a mobile terminal or a stationary terminal fixed to a moving body and the like. In addition, the acquisition unit 231 can acquire, as the type information, information indicating the type of communication service that is receivable by the communication apparatus 50. The information indicating the type of communication service can be, in one example, information regarding the type of communication service contracted by the user of the communication apparatus 50 with the wireless communication provider.

In addition, the type information can be information indicating the priority of communication assigned to the communication apparatus 50. In addition, the type information can be information indicating the type of user who uses the communication apparatus 50. The user type can be, in one example, information regarding a wireless communication provider with which the user has a contract. In addition, the user type can be, in one example, information indicating whether the user is an emergency service worker, a medical service worker, or a general user. The information indicating the type of user who uses the communication apparatus 50 is also the type information of the communication apparatus 50.

Further, the acquisition unit 231 can also acquire, as the information regarding the communication apparatus 50, information indicating the installation location of the communication apparatus 50. The information indicating the installation location is, in one example, information indicating whether the installation location of the communication apparatus 50 is an aircraft, a vehicle, or a structure on the ground. In addition, the acquisition unit 231 can acquire, as the information regarding the communication apparatus 50, information indicating the current position of the communication apparatus 50. The information indicating the current position is, in one example, information regarding longitude and latitude indicating the current position of the communication apparatus 50. In addition, the acquisition unit 231 is capable of acquiring various kinds of information relating to the communication apparatus 50 as information regarding the communication apparatus 50.

The discrimination unit 233 of the non-terrestrial base station apparatus 20 discriminates whether or not the communication apparatus 50 connected thereto is the communication apparatus to which the switching information is transmitted, on the basis of the information acquired in step S601 (step S602). In one example, the non-terrestrial base station apparatus 20 holds, in the storage unit 22, permission type information indicating the type of permission of the communication apparatus 50 to which the switching information is permitted to be transmitted. Then, the discrimination unit 233 discriminates whether or not the connected communication apparatus 50 is the communication apparatus to which the switching information is transmitted by discriminating whether or not the type of the communication apparatus 50 is the type indicated by the permission type information.

Further, the discrimination unit 233 can discriminate whether or not the connected communication apparatus 50 is a communication apparatus to which the switching information is transmitted by discriminating whether or not the communication apparatus 50 is installed in a predetermined location (e.g., whether or not the installation place is a moving body). In addition, the discrimination unit 233 can discriminate whether or not the current position of the communication apparatus 50 is a predetermined position (e.g., whether or not the current position of the communication apparatus 50 is within an area where satellite communication service is provided). Thus, the discrimination unit 233 can discriminate whether or not the connected communication apparatus 50 is a communication apparatus to which the switching information is transmitted.

If the connected communication apparatus 50 is not the communication apparatus to which the switching information is transmitted (step S602: No), the control unit 23 of the non-terrestrial base station apparatus 20 returns the process to step S601. If the connected communication apparatus 50 is the communication apparatus to which switching information is transmitted (step S602: Yes), the acquisition unit 231 acquires the movement information (step S603). In this event, the acquisition unit 231 can acquire the movement information from the communication apparatus 50 connected thereto or the management apparatus 10. In addition, the acquisition unit 231 can acquire the movement information from a server (e.g., a server of a wireless communication provider) connected via the core network (CN). If the movement information is previously stored in the storage unit 22, the acquisition unit 231 can acquire the movement information from the storage unit 22.

In this event, the acquisition unit 231 can acquire, as the movement information, information relating to the movement of the communication apparatus 50 connected thereto. In addition, the acquisition unit 231 can acquire, as the movement information, information relating to the movement of the source base station apparatus (the non-terrestrial base station apparatus 20 itself). In addition, if the source base station apparatus is connected to the communication apparatus 50 via the relay apparatus 40, the acquisition unit 231 can acquire information relating to the movement of the relay apparatus 40. In this case, it is possible to regard the movement information of the relay apparatus 40 as the movement information of the source base station apparatus. In addition, the acquisition unit 231 can acquire, as movement information, information relating to the movement of other base station apparatuses (e.g., other non-terrestrial base station apparatuses 20). In this event, the acquisition unit 231 can acquire information relating to the movement of the plurality of base station apparatuses.

The movement-related information is, in one example, information including at least one piece of information regarding the current position, the moving direction, and the moving speed of the wireless communication apparatus (base station apparatus, relay apparatus, or communication apparatus). Moreover, the movement-related information can be, in one example, information regarding the moving route of the wireless communication apparatus. In one example, if the base station apparatus, the relay apparatus, and the communication apparatus are moving bodies that move regularly or wireless communication apparatuses installed in the moving body, the movement information can be information regarding the moving route of the moving body that moves regularly. Examples of the information regarding the moving route of the moving body that moves regularly include information regarding the flight route of an airplane or satellite, information regarding the traveling route of trains, and the like.

The discrimination unit 233 discriminates whether or not the current time is the timing to transmit the switching information to the communication apparatus 50 on the basis of the movement information acquired in step S603 (step S604). In one example, the discrimination unit 233 discriminates whether or not the connected communication apparatus 50 is located within a predetermined distance from an edge of a cell (hereinafter simply referred to as a cell edge) constituted by the source base station apparatus. This discrimination is performed on the basis of the movement information of the source base station apparatus and/or the movement information of the connected communication apparatus 50. In this event, the movement information can be information regarding the current positions of the connected communication apparatus 50 and the source base station apparatus. In the case where the connected communication apparatus 50 is located within the predetermined distance from the cell edge, the discrimination unit 233 discriminates that the current time is the timing to transmit the switching information to the communication apparatus 50.

Moreover, the discrimination for the transmission timing of the switching information can be performed on the basis of prediction. In one example, the discrimination unit 233 predicts the time taken until the connected communication apparatus 50 reaches the cell edge, on the basis of the movement information of the source base station apparatus and/or the movement information of the connected communication apparatus 50. In this event, the movement information can include information regarding the current position, the moving direction, and the moving speed of the connected communication apparatus 50 and the source base station apparatus. In addition, the movement information can include information regarding the moving route of the connected communication apparatus 50 and the source base station. In the case where the predicted time is shorter than the predetermined time, the discrimination unit 233 discriminates that the current time is the timing to transmit the switching information to the communication apparatus 50.

Further, the discrimination for the transmission timing of the switching information can be performed on the basis of the movement information of other base station apparatuses. In one example, the discrimination unit 233 discriminates whether the connected communication apparatus 50 is within a cell formed by other base station apparatus on the basis of the movement information of the other base station apparatus. If it is within the cell, the discrimination unit 233 discriminates that the current time is the timing to transmit the switching information to the communication apparatus 50.

If the current time is not the timing to transmit the switching information (step S604: No), the control unit 23 returns the process to step S603. If the current time is the timing to transmit the switching information (step S604: Yes), the selection unit 234 of the non-terrestrial base station apparatus 20 selects the base station apparatus as a switching destination candidate (step S605). The selection unit 234 selects the base station apparatus as a switching destination candidate from the other plurality of base station apparatuses on the basis of the movement information of each of the other plurality of base station apparatuses. In one example, the selection unit 234 selects, as the base station apparatus to be a switching destination candidate, the base station apparatus predicted to be located closest to the communication apparatus 50 after elapse of the preset time. This selection is performed on the basis of the movement information of the communication apparatus 50 and the movement information of each of the plurality of moving base station apparatuses. In this event, the selection unit 234 can select the plurality of base station apparatuses as switching destination candidates. The base station apparatus as a switching destination candidate can include not only the non-terrestrial base station apparatus 20 but also the terrestrial base station apparatus 30. The selection of the base station apparatus based on the movement information makes it possible for the communication apparatus 50 to select the optimal base station apparatus with high accuracy.

Subsequently, the discrimination unit 233 discriminates whether the type of the base station apparatus as a switching destination candidate is the preset type (configuration type) (step S606). In one example, the discrimination unit 233 discriminates whether or not the type of the base station apparatus as a switching destination candidate is the non-terrestrial base station apparatus 20. In addition, the discrimination unit 233 can discriminate whether or not the type of the base station apparatus as a switching destination candidate is the base station apparatus that supports NR. If the type of the base station apparatus as a switching destination candidate is not the configuration type, for example, if the base station apparatus as a switching destination candidate is not the non-terrestrial base station apparatus 20 (step S606: No), the control unit 23 returns the process to step S601. Moreover, in this case, the control unit 23 can terminate the switching information transmission process and perform the handover process illustrated in FIG. 14 using one base station apparatus selected in step S605 as the target base station apparatus.

If the type of the base station apparatus as a switching destination candidate is the configuration type, for example, if the base station apparatus as a switching destination candidate is the non-terrestrial base station apparatus 20 (step S606: Yes), the discrimination unit 233 discriminates whether or not the type of the connected communication apparatus 50 is the configuration type (step S607). In this event, the discrimination unit 233 can use the type information of the communication apparatus 50 acquired in step S601 to discriminate whether or not the type of the connected communication apparatus 50 is the configuration type. In one example, it is assumed that the type information is information indicating the priority of the communication apparatus 50. In this event, the discrimination unit 233 discriminates whether or not the priority of the communication apparatus 50 is a preset priority level. The priority can be set to be higher for the communication apparatus 50 that necessitates low delay and high reliability, such as a mobile terminal of an emergency service worker.

If the type of the connected communication apparatus 50 is the configuration type (step S607: Yes), the transmitter 235 of the non-terrestrial base station apparatus 20 transmits, to the base station apparatus as a switching destination candidate, a request to assign a dedicated radio resource that is exclusively used by the connected communication apparatus 50. In the case where there is a plurality of base station apparatuses as switching destination candidates, the request is transmitted to each of the plurality of base station apparatuses. Then, the acquisition unit 231 acquires the information regarding the dedicated radio resource (resource information) that is exclusively used by the communication apparatus 50 from the base station apparatus as a switching destination candidate (step S608).

On the other hand, if the type of the connected communication apparatus 50 is not the configuration type (step S607: No), the acquisition unit 231 of the non-terrestrial base station apparatus 20 acquires information regarding the shared radio resource (resource information) commonly used to connect to the base station apparatus as a switching destination candidate (step S609). Moreover, the shared radio resource is not necessarily a radio resource common to all the wireless communication apparatuses. In one example, it can be a radio resource shared by a plurality of selected wireless communication apparatuses including a communication apparatus. In this case, the acquisition unit 231 can acquire the information regarding the shared radio resource from the base station apparatus as a switching destination candidate. In the case where there is a plurality of base station apparatuses as switching destination candidates, the information regarding the radio resource can be acquired from each of the plurality of base station apparatuses.

Subsequently, the transmitter 235 of the non-terrestrial base station apparatus 20 transmits the switching information including the resource information acquired in step S608 or S609 to the connected communication apparatus 50 (step S610). The switching information can include, in addition to the resource information, trigger information used by the communication apparatus 50 to determine whether or not to switch the base station apparatus connected thereto. In the case where there is a plurality of base station apparatuses as switching destination candidates, the transmitter 235 transmits the switching information including the resource information of each of the base station apparatuses to the connected communication apparatus 50. When the transmission of the switching information is completed, the control unit 23 terminates the switching information transmission process.

As described above, the non-terrestrial base station apparatus 20 does not transmit the switching information to all the communication apparatuses 50, but discriminates the communication apparatus 50 to which the switching information is necessary to be transmitted on the basis of the type information and the like. In addition, even in the case of transmitting the switching information, the information regarding the dedicated radio resource is transmitted only to some communication apparatuses 50. This makes it possible to reduce the situation where the radio resources are exclusively occupied by many communication apparatuses 50, and so the communication system 1 is capable of efficiently using the radio resource. Consequently, the communication system 1 is capable of efficiently using the radio resource.

Further, the non-terrestrial base station apparatus 20 transmits, to some communication apparatuses 50, the switching information including information regarding radio resources shared by a plurality of selected wireless communication apparatuses. In this case, although the communication apparatus 50 may contend with other communication apparatus for the random access procedure, the possibility of contention is lower than the case of using the radio resource common to all the communication apparatuses. Thus, it is possible for the non-terrestrial base station apparatus 20 to keep the communication quality of the communication apparatus 50 high while efficiently using the radio resource.

Further, the non-terrestrial base station apparatus 20 discriminates whether or not the timing to transmit the switching information is reached. In other words, the non-terrestrial base station apparatus 20 dynamically decides the timing to transmit the switching information. This makes it possible to reduce the situation in which the radio resource is occupied exclusively by some communication apparatuses 50 for a long time, and thus the communication system 1 is capable of efficiently using the radio resource.

3. Second Embodiment

The handover process of the first embodiment uses the random access preamble for the communication apparatus 50 to connect to the target base station apparatus. However, if it is possible to acquire the timing advance information for the communication apparatus 50 to connect to the target base station apparatus in advance, the RACH-less handover without using the random access preamble is also possible. The achievement of the RACH-less handover makes it possible to shorten further the handover process. Thus, the second embodiment describes a communication system 1 capable of achieving the RACH-less handover process.

[3-1. Configuration of Communication System]

A communication system 1 according to the second embodiment includes a management apparatus 10, a non-terrestrial base station apparatus 20, a terrestrial base station apparatus 30, a relay apparatus 40, and a communication apparatus 50, similarly to the communication system 1 according to the first embodiment. The configuration of each device included in the communication system 1 according to the second embodiment is the same as that of the communication system 1 according to the first embodiment, and so the description thereof is omitted.

[3-2. Handover Process (RACH-Less)]

Figure 17:
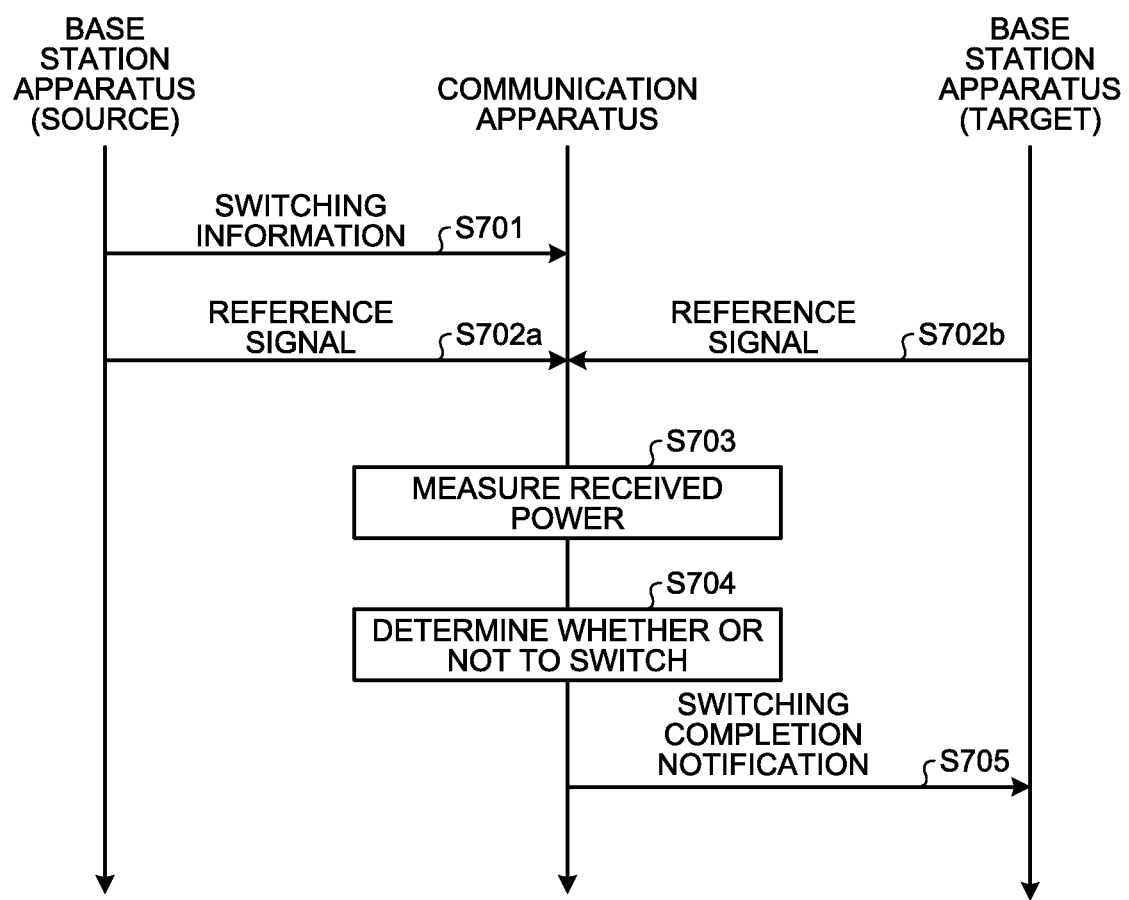
FIG. 17 is a sequence diagram showing an example of a handover process according to a second embodiment of the present disclosure.

The handover process according to the second embodiment of the present disclosure is now described. FIG. 17 is a sequence diagram showing an example of the handover process according to the second embodiment of the present disclosure. The handover process described below is executed in the case where the connection between the non-terrestrial base station apparatus 20 (source) and the communication apparatus 50 is established.

Moreover, the source and target non-terrestrial base station apparatuses 20 can be satellite station equipment or aircraft station equipment. In addition, the source and target base station apparatuses are not limited to the non-terrestrial base station apparatus 20 and can be, in one example, the terrestrial base station apparatus 30. One of the source and target base station apparatuses can be the non-terrestrial base station apparatus 20 and the other can be the terrestrial base station apparatus 30. In addition, a plurality of target base station apparatuses can be provided.

The transmitter 235 of the non-terrestrial base station apparatus 20 (source) first transmits switching information to the communication apparatus 50 connected thereto. The receiver 555 of the communication apparatus 50 receives the switching information from the non-terrestrial base station apparatus 20 (source) (step S701).

The switching information includes the timing advance information in addition to the information shown in the first embodiment (e.g., such as resource information and trigger information). The timing advance information is information regarding timing advance for the communication apparatus 50 to connect to the non-terrestrial base station apparatus 20 (target). The information regarding the timing advance can be the timing advance value itself for adjusting the transmission timing of the upstream signal of the communication apparatus 50. The information regarding the timing advance can be calculated by the control unit 23 of the non-terrestrial base station apparatus 20 (source) on the basis of the movement information of the communication apparatus 50 and the non-terrestrial base station apparatus 20 (target). Moreover, the timing advance is disclosed in the specification of Patent Application No. 2017-221278, which is a prior application. This prior application discloses details of timing advance technology for satellite communication.

Moreover, the communication apparatus 50 or the non-terrestrial base station apparatus 20 (target) is likely to move at high speed. In this case, at the timing when the communication apparatus 50 transmits information to the non-terrestrial base station apparatus 20 (target), the timing advance value is likely to vary previously. Thus, the transmitter 235 can use information necessary for calculating the timing advance value (e.g., movement information of the non-terrestrial base station apparatus 20 (target)) as the timing advance information. In the case where the non-terrestrial base station apparatus 20 (target) moves regularly such as the case where the non-terrestrial base station apparatus 20 (target) is satellite station equipment, the communication apparatus 50 is capable of calculating the timing advance value.

Next, the source and target non-terrestrial base station apparatus 20 each transmit a reference signal used for measuring the received signal (steps S702a and S702b). The receiver 555 of the communication apparatus 50 measures the received power and acquires the measured value obtained by measuring the received power (RSRP, RSRQ, or the like) (step S703).

Then, the determination unit 552 of the communication apparatus 50 determines whether or not to switch the base station apparatus as a connection destination on the basis of the measured value of the received power (step S704). In the case where the base station apparatus as a connection destination is determined not to be switched, the communication apparatus 50 maintains the connection with the non-terrestrial base station apparatus 20 (source).

If it is determined that the base station apparatus as a connection destination is switched, the connection unit 553 of the communication apparatus 50 specifies the timing advance value on the basis of the timing advance information. Then, the connection unit 553 establishes a connection with the non-terrestrial base station apparatus 20 (target) on the basis of the specified timing advance value. Then, the switching completion notification is sent to the non-terrestrial base station apparatus 20 (target) (step S705). This completes the handover process.

As described above, the communication apparatus 50 in the connected state (RRC_CONNECTED) acquires previously the timing advance information from the base station apparatus connected thereto. Thus, the communication apparatus 50 is capable of switching the base station apparatus as a connection destination without involving the step of transmitting the random access preamble and the step of receiving the timing advance information. This further reduces the number of steps in the handover process, thereby further reducing the possibility of handover failure. Thus, the communication apparatus 50 is capable of achieving high-quality communication.

4. Third Embodiment

In the handover process of the second embodiment, the base station apparatus as a connection destination is switc
hed under the judgment of the communication apparatus 50 without using a handover command. However, it is possible to have a configuration of using a handover command in the handover process. A communication system 1 according to a third embodiment of the present disclosure is now described.

[4-1. Configuration of Communication System]

A communication system 1 according to the third embodiment includes a management apparatus 10, a non-terrestrial base station apparatus 20, a terrestrial base station apparatus 30, a relay apparatus 40, and a communication apparatus 50, similarly to the communication system 1 according to the first embodiment. The configuration of each device included in the communication system 1 according to the third embodiment is the same as that of the communication system 1 according to the first embodiment, and so the description thereof is omitted.

[4-2. Handover Process (Other Examples)]

Figure 18:
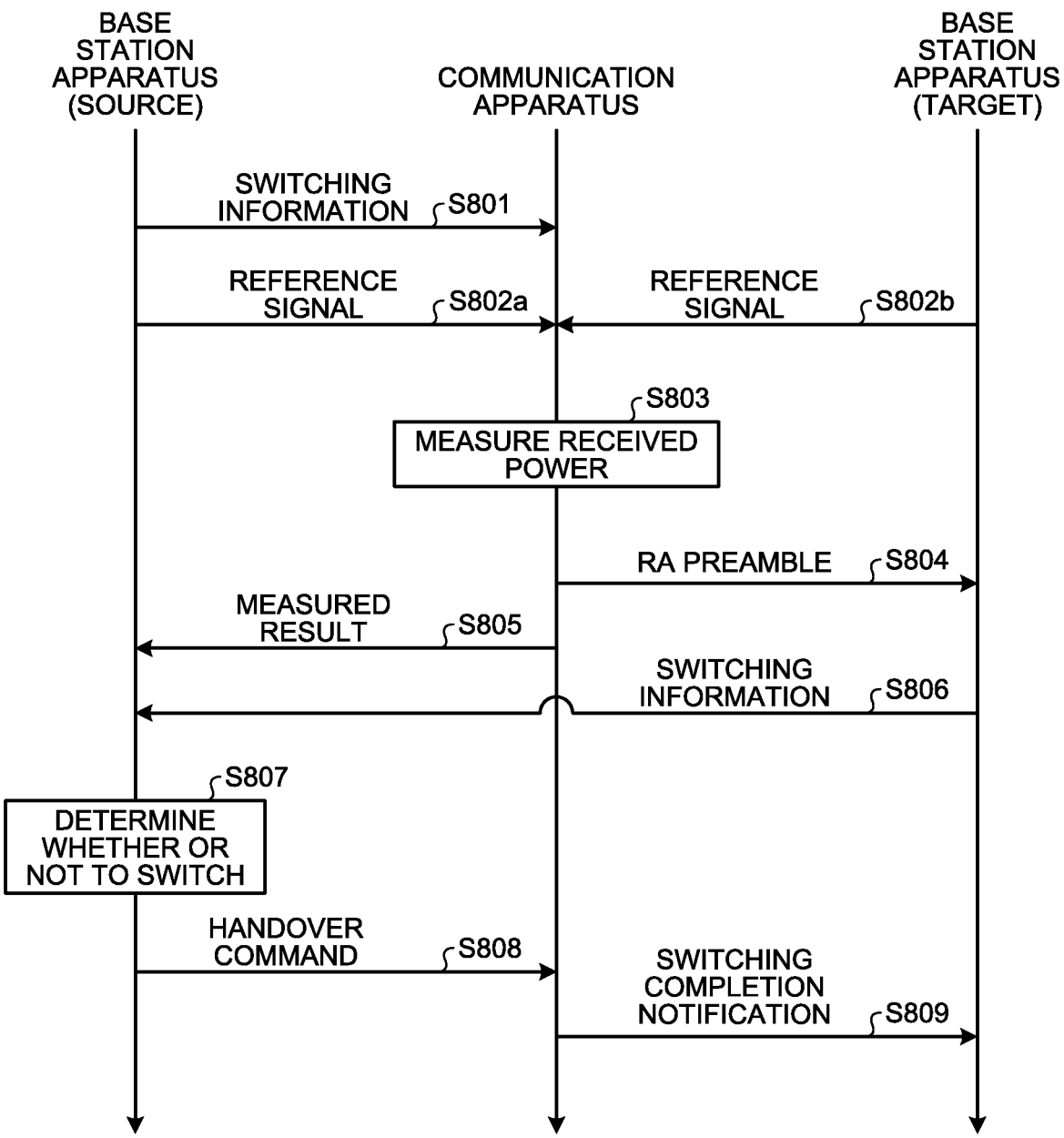
FIG. 18 is a sequence diagram showing an example of a handover process according to a third embodiment of the present disclosure.

The handover process according to the third embodiment of the present disclosure is now described. FIG. 18 is a sequence diagram showing an example of the handover process according to the third embodiment of the present disclosure. The handover process described below is executed in the case where the connection between the non-terrestrial base station apparatus 20 (source) and the communication apparatus 50 is established.

Moreover, the source and target non-terrestrial base station apparatuses 20 can be satellite station equipment or aircraft station equipment. In addition, the source and target base station apparatuses are not limited to the non-terrestrial base station apparatus 20 and can be, in one example, the terrestrial base station apparatus 30. One of the source and target base station apparatuses can be the non-terrestrial base station apparatus 20 and the other can be the terrestrial base station apparatus 30. In addition, a plurality of target base station apparatuses can be provided.

The transmitter 235 of the non-terrestrial base station apparatus 20 (source) first transmits switching information to the communication apparatus 50 connected thereto. In one example, the transmitter 235 transmits the switching information as the switching information. The receiver 555 of the communication apparatus 50 receives the switching information from the non-terrestrial base station apparatus 20 (source) (step S801).

Next, the source and target non-terrestrial base station apparatus 20 each transmit a reference signal used for measuring the received signal (steps S802a and S802b). The receiver 555 of the communication apparatus 50 measures the received power and acquires the measured value obtained by measuring the received power (RSRP, RSRQ, or the like) (step S803).

Then, the connection unit 553 of the communication apparatus 50 selects the non-terrestrial base station apparatus 20 to be the switching destination on the basis of the switching information stored in the storage unit 52. Then, the connection unit 553 of the communication apparatus 50 transmits the random access preamble to the selected non-terrestrial base station apparatus 20 (target) (step S804). Subsequently, the connection unit 553 sends the measured result (MR) of the received power to the non-terrestrial base station apparatus 20 (source) (step S805).

The receiver 232 of the non-terrestrial base station apparatus 20 (target), when receiving the random access preamble, generates the information regarding timing advance on the basis of the received signal. Then, the transmitter 235 of the non-terrestrial base station apparatus 20 (target) transmits the switching information including the information regarding timing advance to the non-terrestrial base station apparatus 20 (source) (step S806). In one example, the transmitter 235 transmits a handover command including the timing advance value as the switching information.

The receiver 232 of the non-terrestrial base station apparatus 20 (source) receives the handover command including the information regarding timing advance from the non-terrestrial base station apparatus 20 (target). Furthermore, the receiver 232 of the non-terrestrial base station apparatus 20 (source) receives the measured result (MR) from the communication apparatus 50. Then, the discrimination unit 233 of the non-terrestrial base station apparatus 20 (source) discriminates whether or not to switch the base station apparatus as a connection destination of the communication apparatus 50 on the basis of the measured result (MR) (step S807). If the base station apparatus as a connection destination is not switched, the non-terrestrial base station apparatus 20 (source) continues communication with the communication apparatus 50.

In the case of switching the base station apparatus as a connection destination, the transmitter 235 of the non-terrestrial base station apparatus 20 (source) transmits, to the communication apparatus 50, the handover command created by the non-terrestrial base station apparatus 20 (target) (step S808). This handover command includes the timing advance information.

Upon acquisition of the handover command, the connection unit 553 of the communication apparatus 50 specifies the timing advance value on the basis of the timing advance information included in the handover command. Then, the connection unit 553 establishes a connection with the non-terrestrial base station apparatus 20 (target) on the basis of the specified timing advance value. Then, the connection unit 553 sends the switching completion notification to the non-terrestrial base station apparatus 20 (target) (step S809). This completes the handover process.

As described above, the communication apparatus 50 in the connected state (RRC_CONNECTED) is not necessary to receive the timing advance information from the non-terrestrial base station apparatus 20 (target) after acquiring the handover command. Accordingly, the communication apparatus 50 is capable of immediately switching the base station apparatus as a connection destination after acquiring the handover command, and so it is possible to achieve high-quality communication.

5. Modifications

Each of the above-described embodiments is an example, and various modifications and applications are possible.

[5-1. Modification Regarding System Configuration]

In the above-described first to third embodiments, the non-terrestrial base station apparatus 20, the terrestrial base station apparatus 30, and the relay apparatus 40 are assumed to support cellular communication systems such as W-CDMA, cdma2000, LTE, and NR. However, the cellular communication systems supported by the non-terrestrial base station apparatus 20, the terrestrial base station apparatus 30, and the relay apparatus 40 are not limited to the above-mentioned cellular communication system, and other cellular communication systems such as ultra-mobile broadband (UMB) can be supported. In addition, these apparatuses can support other wireless communication systems such as a short-range wireless communication system, a close proximity wireless communication system, or a wireless local area network (LAN) system, in addition to the cellular communication system.

Further, in the above-described embodiment, the low earth orbit satellite constellation is assumed to be formed by the plurality of non-terrestrial base station apparatuses 20, but the satellite constellation formed by the plurality of non-terrestrial base station apparatuses 20 is not limited to the low earth orbit satellite constellation. The satellite constellation formed by the plurality of non-terrestrial base station apparatuses 20 can be a satellite constellation such as a medium earth orbit satellite constellation and a geostationary earth orbit satellite constellation.

Figure 19:
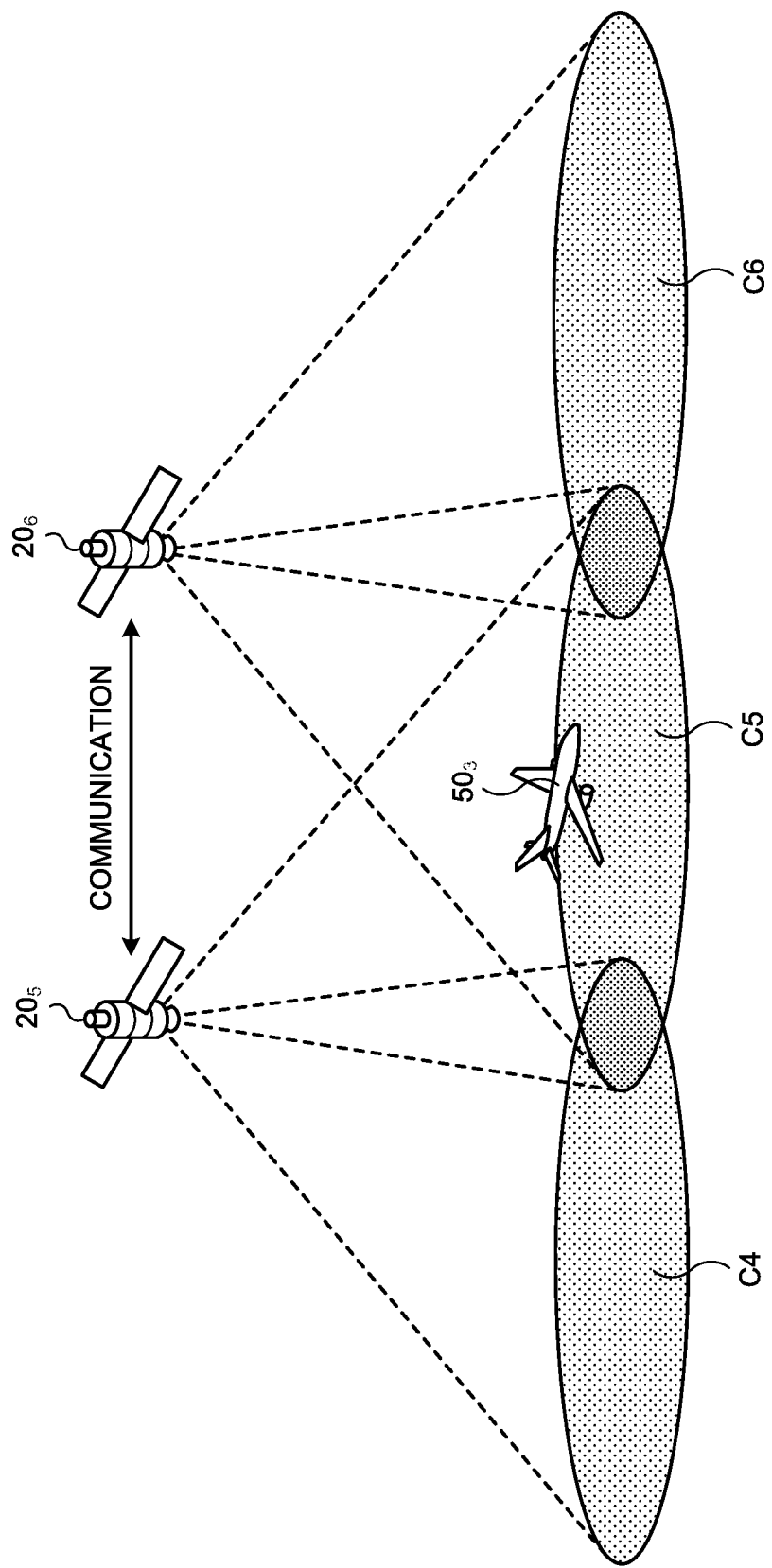
FIG. 19 is a diagram illustrating an example in which a plurality of base station apparatuses cooperates to form one cell.

Further, in the above-described first to third embodiments, one base station apparatus forms one cell, in one example, as illustrated in FIG. 13. However, a plurality of base station apparatuses can cooperate to form one cell. FIG. 19 is a diagram illustrating an example in which a plurality of base station apparatuses cooperates to form one cell. In the example of FIG. 19, the non-terrestrial base station apparatus $20_5$ forms cells C4 and C5, and the non-terrestrial base station apparatus $20_6$ forms cells C5 and C6. In the example of FIG. 19, the non-terrestrial base station apparatus $20_5$ and the non-terrestrial base station apparatus $20_6$ cooperate to form the cell C5. Moreover, the cells C4, C5, and C6 can be regarded as one cell.

In the example of FIG. 19, the communication apparatus $50_3$ moves within the cell C5. While the communication apparatus 50 moves within the same cell, no handover for switching cells is performed. However, a case can be considered in which the communication apparatus 50 is desirable to change the base station apparatus as a connection destination. In one example, in the example of FIG. 19, the communication apparatus $50_3$ is assumed to be connected to the non-terrestrial base station apparatus $20_5$. There may be a case where the communication apparatus $50_3$ moves away from the non-terrestrial base station apparatus $20_5$ in the cell C5 and approaches to the non-terrestrial base station apparatus $20_6$. In this case, there is a possibility for the communication apparatus $50_3$ to secure higher quality communication by switching the connection destination to the non-terrestrial base station apparatus $20_6$ in consideration of the propagation loss and delay.

Thus, the communication apparatus 50 and the base station apparatus execute the handover process illustrated in FIGS. 14, 15, 17, and 18 in cases other than the handover illustrated in FIG. 19. In this case, the term "handover" used in the above description of the handover process can be replaced with "switching". In one example, "handover process" can be replaced with "switching process" and "handover command" can be replaced with "switching command". In addition, the base station apparatus executes the switching information transmission process illustrated in FIG. 16 even in cases other than the handover as illustrated in FIG. 19. Even in this case, the term "handover" can be replaced with "switching". Even in this case, the communication apparatus 50 and the base station apparatus can ensure high-quality communication similarly to the first to third embodiments.

[5-2. Modification Regarding Switching Information]

In the above-described first to third embodiments (e.g., such as step S501 illustrated in FIG. 15, step S701 illustrated in FIG. 17, and step 801 illustrated in FIG. 18), the acquisition unit 551 of the communication apparatus 50 acquires the switching information (e.g., handover-related information) from the source base station apparatus. However, the information included in the switching information is not limited to the information described in these embodiments. In one example, the switching information can include the information (A) to (J) as follows. Moreover, to describe collectively the information that is desirable to be included in the switching information, the information described above is also shown below.

(A) PRACH transmission resource information
(B) Preamble sequence information
(C) Base station ID information of base station apparatus as switching destination candidate
(D) UL/DL carrier frequency information of base station apparatus as switching destination candidate
(E) Bandwidth information of base station apparatus as switching destination candidate
(F) Unique ID information of communication apparatus 50 after switching
(G) Radio resource configuration information after switching
(H) Update information
(I) Trigger information
(J) Timing advance information Each of the information (A) to (J) is now described.

(A) "PRACH transmission resource information" is a type of resource information. Specifically, the PRACH transmission resource information is information regarding a physical resource used by the communication apparatus 50 to transmit the PRACH to the base station apparatus as a switching destination for connection. The PRACH transmission resource information can be information regarding a dedicated physical resource exclusively assigned to the communication apparatus 50 or information regarding a shared physical resource. In addition, the PRACH transmission resource information can be similar to the PRACH transmission resource information described in step S501 of the handover process (without handover command) of the first embodiment.

(B) "Preamble sequence information" is a type of resource information. Specifically, the preamble sequence information is a sequence relating to random access preamble transmission, and is information relating to a sequence used by the communication apparatus 50 to connect to the base station apparatus as a switching destination for connection. The preamble sequence information can be information regarding a dedicated physical resource exclusively assigned to the communication apparatus 50 or can be information regarding a shared physical resource. In addition, the preamble sequence information can be similar to the preamble sequence information described in step S501 of the handover process (without handover command) of the first embodiment.

(C) "Base station ID information of base station apparatus as switching destination candidate" is the identification information of the base station apparatus to be a switching destination candidate of the communication apparatus 50. In one example, the base station ID information is information regarding an ID of a cell formed by the base station apparatus to be a switching destination candidate of the communication apparatus 50. Moreover, a plurality of base station apparatuses can form one cell in some cases. In this case, the base station ID information can be identification information of different base stations in the same cell instead of the cell ID.

(D) "UL/DL carrier frequency information of base station apparatus as switching destination candidate" is uplink carrier frequency information or downlink carrier frequency information of the base station apparatus to be a switching destination candidate of the communication apparatus 50.

(E) "Bandwidth information of base station apparatus as switching destination candidate" is information regarding the bandwidth of the base station apparatus to be a switching destination candidate of the communication apparatus 50.

(F) "Unique ID information of communication apparatus 50 after switching" is a unique ID of the communication apparatus 50 that is used after the communication apparatus 50 switches the connection to the base station apparatus to be a switching destination candidate. The unique ID is, in one example, C-RNTI.

(G) "Radio resource configuration information after switching" is information regarding the radio resource configuration that is used after the communication apparatus 50 switches the connection to the base station apparatus to be a switching destination candidate.

(H) "Update information" is information relating to the conditions for updating the switching information. The update condition is a condition for updating the switching information specified by the communication apparatus 50 from equipment forming the wireless network. In this event, the equipment forming the wireless network can be a device that manages the radio access network RAN (e.g., the management apparatus 10) or base station apparatus that is connected to the communication apparatus 50 (e.g., the non-terrestrial base station apparatus 20). Specific examples of the update information include, in one example, information indicating a condition that "updates after a certain number of times (e.g., three times) of the handover of the communication apparatus" and a condition that "updates each time the communication apparatus performs handover".

Moreover, the update unit 554 of the communication apparatus 50 can request new switching information from the base station apparatus connected thereto in the case where the update condition indicated in the update information is satisfied after the acquisition of the switching information including the update information. Then, the update unit 554 can acquire new switching information from the base station apparatus connected thereto and can update the switching information stored in the storage unit 52 with the new switching information.

Moreover, the acquisition unit 551 of the communication apparatus 50 can acquire the switching information from the base station apparatus connected thereto when first connecting to the radio access network RAN supported by the communication system 1 after the power is turned on. Then, the update unit 554 of the communication apparatus 50 can repeat the update of the switching information in accordance with the update information included in the switching information.

The switching information including the update information allows the apparatus on the wireless network side (such as the management apparatus 10 or the non-terrestrial base station apparatus 20) to be easy to manage the switching information of the communication apparatus 50. The communication apparatus 50 is capable of updating the switching information at the optimal timing on the basis of the judgment on the wireless network side. Moreover, the update of the switching information does not necessarily depend on the request from the side of the communication apparatus 50 based on the update information. The base station apparatus connected to the communication apparatus 50 can request the communication apparatus 50 to update the switching information. Even in this case, the effects similar to the switching information including the update information can be achieved.

(I) "Trigger information" is information used by the communication apparatus 50 to determine whether or not to switch the base station apparatus as a connection destination. The trigger information is, in one example, information used by the communication apparatus 50 to determine whether or not to switch the base station apparatus as a connection destination using the information regarding the received power (e.g., such as RSRP or RSRQ). In one example, the trigger information can be a determination threshold value (the first trigger value) relating to the measured value (such as RSRP and RSRQ) of the power received from the connected base station apparatus or can be a difference value between two measured values of power (the second trigger value). The first trigger value and the second trigger value can be respectively similar to the first trigger value and the second trigger value described in step S501 of the handover process (without handover command) of the first embodiment.

Moreover, the trigger information is not limited to the information used for the switching determination (e.g., such as the first trigger value or the second trigger value) using the information regarding the received power. In one example, the trigger information can be information regarding the movement of the apparatus relating to the connection switching. In this event, the movement information is, in one example, information including at least one piece of information on the current position, the movement direction, and the movement speed of the apparatus relating to the connection switching. The apparatus relating to the connection switching is, in one example, at least one of the communication apparatus 50, the connected base station apparatus, and the base station apparatus as a switching destination candidate. In this event, if the trigger information is the movement information, the determination unit 552 of the communication apparatus 50 can perform the switching determination as follows.

The determination unit 552 first determines whether or not the communication apparatus 50 is within a predetermined distance from the edge of the cell (hereinafter, simply referred to as a cell edge) formed by the base station apparatus connected thereto. This determination is performed on the basis of the movement information of the communication apparatus 50 itself and/or the movement information of the base station apparatus connected to the communication apparatus 50. In this event, the movement information can be information regarding the current positions of the communication apparatus 50 and the connected base station apparatus. In the case where the communication apparatus 50 is within the predetermined distance from the cell edge, the determination unit 552 discriminates that the current time is the switching timing of the base station apparatus. Then, the connection unit 553 of the communication apparatus 50 executes a connection destination switching process (e.g., a handover process).

Moreover, the determination of the connection destination switching timing can be based on the prediction. In one example, the determination unit 552 predicts the time to be taken until the communication apparatus 50 reaches the cell edge, on the basis of the movement information of the communication apparatus 50 itself and/or the movement information of the base station apparatus connected to the communication apparatus 50. In this event, the movement information can include information regarding the current position, movement direction, and movement speed of the communication apparatus 50 and the connected base station apparatus. In addition, if the communication apparatus 50 and the base station apparatus connected thereto are regularly moving, the movement information can include the movement route information of the communication apparatus 50 and the base station apparatus connected thereto. In the case where the predicted time is shorter than the predetermined time, the determination unit 552 discriminates that the current time is the connection switching timing. Then, the connection unit 553 executes the connection destination switching process (e.g., the handover process).

Further, the discrimination of the connection destination switching timing can be based on the movement information of the base station apparatus as a switching destination candidate. In one example, the discrimination unit 233 discriminates whether the communication apparatus 50 is in the cell formed by the base station apparatus as a switching destination candidate on the basis of the movement information of the base station apparatus as a switching destination candidate. If so, the discrimination unit 233 discriminates that the current timing is the connection destination switching timing. Then, the connection unit 553 executes the connection destination switching process (e.g., the handover process).

The switching information including the trigger information allows the apparatus on the side of the wireless network (such as the management apparatus 10 or the non-terrestrial base station apparatus 20) to be easy to manage the switching timing of the base station for the communication apparatus 50. In addition, the communication apparatus 50 is also capable of switching the base station apparatus at the optimal timing at each time.

(J) "Timing advance information" is information regarding timing advance used by the communication apparatus 50 to connect to the base station apparatus to be a switching destination candidate. The timing advance information can be the timing advance value itself or can be information necessary for the communication apparatus 50 to calculate the timing advance value. In addition, the timing advance information can be similar to the timing advance information described in step S701 of the handover process (RACH-less handover) according to the second embodiment.

Moreover, the switching information does not necessarily include all the above-mentioned information (A) to (J). The switching information can include all the above-mentioned information (A) to (J) or can include only some of them. In one example, the base station apparatus connected to the communication apparatus 50 transmits the switching information to the communication apparatus 50 without including information, which is not necessary to be changed among the above-mentioned information, in the switching information. In one example, the base station apparatus connected to the communication apparatus 50 does not include the information, which is previously transmitted to the communication apparatus 50 connected thereto, in the switching information. This makes it possible to shorten the transmission time.

Further, both the PRACH transmission resource information (A) and the preamble sequence information (B) can be information of a radio resource dedicated to the communication apparatus 50 or one of them can be information of a radio resource dedicated to the communication apparatus 50. In addition, the resource information can be information regarding a radio resource shared by a predetermined number of wireless communication apparatuses selected by the base station apparatus being connected or the like. This makes it possible to use efficiently radio resources.

Further, the radio resource indicated by the resource information can be a plurality of radio resources for each of the base station apparatuses as switching destination candidates. In one example, the base station apparatus acquires, from a predetermined one of the base station apparatuses, plurality pieces of the PRACH transmission resource information (A) and the preamble sequence information (B) used by the communication apparatus 50 being connected to connect to the predetermined one of the base station apparatuses. Then, the base station apparatus includes the plurality pieces of PRACH transmission resource information and the plurality pieces of preamble sequence information in the switching information to be transmitted to the communication apparatus 50 so that the communication apparatus 50 connected thereto is capable of performing the selection. This makes it possible to reduce failure in switching the connection destination by the communication apparatus 50.

Moreover, the base station apparatus connected to the communication apparatus 50 can acquire the switching information (e.g., resource information such as PRACH transmission resource information) of the plurality of base station apparatuses as switching destination candidates. In this case, the connected base station apparatus can store the switching information for each of the plurality of base station apparatuses to be switching destination candidates by setting as one piece of switching information. In one example, it is assumed that the communication apparatus 50 is connected to the non-terrestrial base station apparatus 20 and there are three cells that are likely to be targets subjected to the handover. In this case, the transmitter 235 of the non-terrestrial base station apparatus 20 includes the switching information of each of the three cells (e.g., resource information such as PRACH transmission resource information) in the switching information and transmits the switching information. Moreover, the transmitter 235 does not necessarily store a plurality of pieces of switching information in one piece of switching information, but can use it as different pieces of switching information.

Moreover, the information included in the switching information is not limited to the above-mentioned information (A) to (J). The switching information can include information other than the above-mentioned information (A) to (J). In one example, the switching information can include movement information of each of the plurality of base station apparatuses that are likely to be switching destination candidates. Then, the determination unit 552 of the communication apparatus 50 can select the base station apparatus to be the switching destination (target base station apparatus) from among the plurality of base station apparatuses that are likely to be switching destination candidates, on the basis of the plurality pieces of movement information. The connection unit 553 of the communication apparatus 50, in the case where the determination unit 552 determines to switch the base station apparatus, can execute the connection to the selected base station apparatus on the basis of the resource information included in the switching information.

Further, the switching information to be acquired by the acquisition unit 551 can further include switching information of the base station apparatus assumed to be a switching destination candidate (e.g., resource information) after connecting to the base station apparatus as a switching destination candidate, in addition to the switching information of the base station apparatus as a switching destination candidate. In one example, the acquisition unit 551 acquires, from the base station apparatus connected thereto, the first switching information used to switch the connection to the first base station apparatus (base station apparatus one ahead) to be a switching destination candidate. At the same time, the acquisition unit 551 can also acquire, from the base station apparatus connected thereto, the second switching information used to switch the connection to the second base station apparatus (base station apparatus two ahead) to be a switching destination candidate after connecting to the first base station apparatus. Moreover, the switching information can include the third switching information used for switching the connection to the third base station apparatus (base station apparatus three ahead) to be a further switching destination candidate after connecting to the second base station apparatus. The switching information can include resource information used to connect to base station apparatus three or more ahead.

In this event, the base station apparatus connected to the communication apparatus 50 can discriminate the base station apparatus to be the first base station apparatus, the second base station apparatus, and the third base station apparatus from among the plurality of base station apparatuses on the basis of the movement information of the other base station apparatuses. The base station apparatus can also understandably discriminate a base station apparatus ahead three or more.

The previous acquisition of not only the switching information used for the next switching but also further switching information in advance makes it possible for the communication apparatus 50 to smoothly switch the connection even in the case where switching frequently occurs at short intervals. Thus, the communication apparatus 50 is capable of maintaining the quality of communication high.

[5-3. Modification Regarding Transmission Timing of Switching Information]

In the above-described first embodiment, the base station apparatus executes the switching information transmission process illustrated in FIG. 16. This switching information transmission process can also be executed by the base station apparatus according to the second embodiment or by the base station apparatus according to the third embodiment. In this event, the base station apparatus is not limited to the non-terrestrial base station apparatus 20 and can be, in one example, the terrestrial base station apparatus 30.

Further, in step S604 of the switching information transmission process, the discrimination unit 233 of the non-terrestrial base station apparatus 20 (source) discriminates whether or not the current time is the timing to transmit the switching information to the communication apparatus 50 on the basis of the movement information of the communication apparatus 50 or the like. However, the information used to discriminate the transmission timing of the switching information is not limited to the movement information and can be information regarding the received power measured by the communication apparatus 50 (e.g., such as RSRP or RSRQ). In one example, the receiver 232 of the non-terrestrial base station apparatus 20 (source) acquires the measured result (MR) of the received power from the communication apparatus 50. Then, the discrimination unit 233 of the non-terrestrial base station apparatus 20 (source) determines whether or not the current time is the switching information transmission timing, on the basis of the measured result (MR). In one example, if the measured value of the power of the reference signal from the non-terrestrial base station apparatus 20 (source) is below a certain value, the discrimination unit 233 discriminates that the current time is the switching information transmission timing. This also makes it possible to reduce the situation in which the radio resource is occupied exclusively by many communication apparatuses 50 for a long time.

Further, the source base station apparatus is not limited to the non-terrestrial base station apparatus 20 and can be, in one example, the terrestrial base station apparatus 30. In addition, the order of steps (steps S601 to S610) of the switching information transmission process illustrated in FIG. 16 can vary appropriately. In one example, the base station apparatus discriminates whether or not the connected communication apparatus is the transmission target of the switching information (step S602), and then, in the case where the communication apparatus is the transmission target, can transmit the switching information to the communication apparatus 50 without involving the discrimination of steps of S604, S606, and S607. In addition, the base station apparatus discriminates the switching information transmission timing (step S604), and then, in the case where the current time is the transmission timing of the switching information, can transmit the switching information to the communication apparatus 50 without involving the discrimination of step S606 or step S607. Similarly, the base station apparatus discriminates whether or not the base station apparatus as a switching destination candidate is the configuration type (step S606), and then, if the base station apparatus as a switching destination candidate is the configuration type, can transmit the switching information to the communication apparatus 50 without involving the discrimination of step S607.

It is understandably also possible to execute the respective discrimination steps without involving the discrimination step preceding the respective steps. In one example, the discrimination of step S604, step S606, or step S607 can be performed without performing the discrimination of step S602. Moreover, the process according to the present modification is also applicable to the base station apparatus according to the second embodiment or to the base station apparatus according to the third embodiment.

[5-4. Other Modifications]

The control device for controlling the management apparatus 10, the non-terrestrial base station apparatus 20, the terrestrial base station apparatus 30, the relay apparatus 40, or the communication apparatus 50 of the present embodiment can be configured as a dedicated computer system or a general-purpose computer system.

In one example, a communication program used for executing the above-mentioned operations (e.g., such as initial connection process, handover process, and switching information transmission process) is stored and delivered in a computer-readable recording medium such as optical disks, semiconductor memory, magnetic tapes, and flexible disks. Then, in one example, the control device is configured by installing the program in a computer and executing the above-described process. In this event, the control device can be a device (e.g., a personal computer) external to the management apparatus 10, the non-terrestrial base station apparatus 20, the terrestrial base station apparatus 30, the relay apparatus 40, or the communication apparatus 50. In addition, the control device can be a device (e.g., the control unit 13, the control unit 23, the control unit 34, the control unit 44, or the control unit 55) in the non-terrestrial base station apparatus 20, the terrestrial base station apparatus 30, the relay apparatus 40, or the communication apparatus 50.

Further, the above-mentioned communication program can be stored in a disk device provided in a server device on a network such as the Internet in such a way to be downloaded to a computer. Further, the above-mentioned functions can be implemented by cooperation between an operating system (OS) and application software. In this case, other parts than OS can be stored in a medium for delivery, or other parts than OS can be stored in the server device and downloaded to a computer.

Further, among the processes described in the above-described embodiments, the entirety or a part of the processes described as being performed automatically can be manually performed, or the entirety or a part of the processes described as manually performed can be automatically performed by a known method. In addition, the processing procedures, specific terms, information including various data and parameters disclosed in the specification and drawings can be optionally changed unless otherwise specified. In one example, the various types of information shown in each drawing are not limited to the illustrated information.

Further, each component of each apparatus shown in the drawings is functionally conceptual and is not necessarily configured physically as illustrated. In other words, the specific forms of distribution or integration of each apparatus are not limited to the illustrated examples, and the entirety or a part of them can be functionally or physically distributed or integrated on an optional unit basis depending on various loads and usage conditions.

Further, an appropriate combination between the above-described embodiments is possible within the range that the details of the process do not contradict. In addition, the order of the steps shown in the flow charts or sequence diagrams of the above-described embodiments can be changed appropriately.

6. Concluding Remarks

As described above, according to the embodiments of the present disclosure, the communication apparatus 50 is capable of executing the process of switching the base station apparatus as a connection destination in a reduced number of steps or in a short time. The communication apparatus 50 is less likely to move out of the communication area of the source base station apparatus during the execution of the switching process, and so the possibility of handover failure is reduced. Thus, the communication apparatus 50 is capable of achieving high-quality communication.

Although the above description is given of the respective embodiments of the present disclosure, the technical scope of the present disclosure is not limited to the above-described respective embodiments as they are, and various modifications can be made without departing from the scope of the present disclosure. In addition, the components in different embodiments and modifications can be combined suitably.

Further, the effects in each embodiment described in the present specification are merely examples and are not restrictive of the disclosure herein, and other effects not described herein also can be achieved.

Moreover, the present technology can also have the configuration described below.

(1)

A communication apparatus comprising:
an acquisition unit configured to acquire, from a base station apparatus being connected, switching information including information used for wireless communication with a movably configured base station apparatus to be a switching destination candidate;
a determination unit configured to determine whether or not to switch a base station apparatus to be a connection destination; and
a connection unit configured to, upon determining by the determination unit to switch the base station apparatus to be the connection destination, execute connection to the base station apparatus to be the switching destination candidate on a basis of the switching information.

(2)

The communication apparatus according to (1),
wherein the acquisition unit acquires the switching information including resource information relating to a radio resource used for wireless communication with the base station apparatus to be the switching destination candidate, and
the connection unit executes connection to the base station apparatus to be the switching destination candidate using the radio resource.

(3)

The communication apparatus according to (2),
wherein the acquisition unit acquires the resource information including information regarding a dedicated radio resource exclusively assigned to the communication apparatus from the connected base station apparatus, and
the connection unit executes connection to the base station apparatus to be the switching destination candidate using the dedicated radio resource.

(4)

The communication apparatus according to (2) or (3),
wherein the acquisition unit acquires the resource information including information regarding a shared radio resource common to a plurality of selected wireless communication apparatuses including the communication apparatus from the connected base station apparatus, and
the connection unit executes connection to the base station apparatus to be the switching destination candidate using the shared radio resource.

(5)

The communication apparatus according to any one of (1) to (4),
wherein the acquisition unit acquires the switching information including timing advance information relating to timing advance for connecting to the base station apparatus to be the switching destination candidate from the connected base station apparatus, and
the connection unit executes connection to the base station apparatus to be the switching destination candidate on a basis of the timing advance information.

(6)

The communication apparatus according to any one of (1) to (5),
wherein the acquisition unit acquires, from the connected base station apparatus, the switching information used for a handover from the connected base station apparatus to the base station apparatus to be the switching destination candidate,
the determination unit determines whether or not to execute the handover, and
the connection unit executes, upon determining by the determination unit to execute the handover, the handover from the connected base station apparatus to the base station apparatus to be the switching destination candidate on the basis of the switching information.

(7)

The communication apparatus according to any one of (1) to (6),
wherein the acquisition unit acquires, from the connected base station apparatus among a plurality of base station apparatuses cooperatively constituting one cell, the switching information used for wireless communication with the base station apparatus to be the switching destination candidate among the plurality of base station apparatuses.

(8)

The communication apparatus according to any one of (1) to (7),
  wherein the acquisition unit acquires the switching information including trigger information used for determining whether or not to switch the base station apparatus from the connected base station apparatus, and
  the determination unit determines whether to switch the base station apparatus on a basis of the trigger information.

(9)

The communication apparatus according to any one of (1) to (8),
  wherein the acquisition unit acquires the switching information regarding each of a plurality of base station apparatuses to be switching destination candidates, and
  the connection unit executes, upon determining by the determination unit to switch the base station apparatus, connection to the base station apparatus selected from among the plurality of base station apparatuses to be the switching destination candidates on the basis of the switching information.

(10)

The communication apparatus according to any one of (1) to (9), further comprising:
  an update unit configured to update the switching information,
  wherein the acquisition unit acquires the switching information including update information relating to an update condition of the switching information, and
  the update unit updates the switching information to new switching information acquired from the connected base station apparatus upon satisfying the update condition.

(11)

The communication apparatus according to any one of (1) to (10),
  wherein the acquisition unit acquires, from the connected base station apparatus, first switching information used for switching connection to a movably configured first base station apparatus to be a switching destination candidate and second switching information used for switching connection to a movably configured second base station apparatus to be a switching destination candidate after being connected to the first base station apparatus.

(12)

A base station apparatus comprising:
  an acquisition unit configured to acquire switching information including information used by a connected communication apparatus for wireless communication with a movably configured base station apparatus to be a switching destination candidate for connection; and
  a transmitter configured to transmit the switching information to the communication apparatus,
  wherein the switching information includes trigger information used by the connected communication apparatus for determining whether or not to switch the base station apparatus to be a connection destination, and
  the transmitter transmits the switching information including the trigger information.

(13)

The base station apparatus according to (12),
  wherein the base station apparatus is configured to be movable,
  the base station apparatus includes a discrimination unit configured to discriminate whether or not a current time is a timing for transmitting the switching information on a basis of at least one piece of information regarding a current position, a moving direction, and a moving speed of the base station apparatus, and
  the transmitter transmits the switching information upon determining that the current time is the timing to transmit the switching information.

(14)

The base station apparatus according to (12) or (13), further comprising:
  a selection unit configured to select the base station apparatus to be the switching destination candidate from among a plurality of base station apparatuses configured to be movable,
  wherein the selection unit selects the base station apparatus to be the switching destination candidate on a basis of movement information of each of the plurality of base station apparatuses configured to be movable, the movement information including at least one piece of information regarding a current position, a moving direction, and a moving speed of the base station apparatus, and
  the acquisition unit acquires the switching information used for wireless communication with the base station apparatus selected by the selection unit.

(15)

The base station apparatus according to any one of (12) to (14), further comprising:
  a discrimination unit configured to discriminate whether or not the connected communication apparatus is a communication apparatus to which the switching information is transmitted,
  wherein the transmitter transmits the switching information to the connected communication apparatus upon discriminating by the discrimination unit that the connected communication apparatus is the communication apparatus to which the switching information is transmitted.

(16)

A communication method comprising:
  acquiring, from a base station apparatus being connected, switching information including information used for wireless communication with a movably configured base station apparatus to be a switching destination candidate;
  determining whether or not to switch a base station apparatus to be a connection destination; and
  executing, upon determining to switch the base station apparatus to be the connection destination, connection to the base station apparatus to be the switching destination candidate on a basis of the switching information.

(17)

A communication method comprising:
  acquiring switching information including information used by a connected communication apparatus for wireless communication with a movably configured base station apparatus to be a switching destination candidate for connection, the switching information including trigger information used by the connected communication apparatus for determining whether or not to switch a base station apparatus to be a connection destination; and
  transmitting the switching information including the trigger information to the communication apparatus.

(18)

A communication program for causing a computer included in a communication apparatus to function as:
an acquisition unit configured to acquire, from a base station apparatus being connected, switching information including information used for wireless communication with a movably configured base station apparatus to be a switching destination candidate; a determination unit configured to determine whether or not to switch a base station apparatus to be a connection destination; and
a connection unit configured to, upon determining by the determination unit to switch the base station apparatus to be the connection destination, execute connection to the base station apparatus to be the switching destination candidate on a basis of the switching information.

(19)

A communication program for causing a computer included in a base station apparatus to function as:
an acquisition unit configured to acquire switching information including information used by a connected communication apparatus for wireless communication with a movably configured base station apparatus to be a switching destination candidate for connection, the switching information including trigger information used by the connected communication apparatus for determining whether or not to switch a base station apparatus to be a connection destination; and
a transmitter configured to transmit the switching information including the trigger information to the communication apparatus.

(20)

A communication system comprising:
a plurality of base station apparatuses configured to be movable; and
a communication apparatus connecting to at least one of the plurality of base station apparatuses,
wherein the plurality of base station apparatuses each includes
a transmitter configured to transmit, to the communication apparatus being connected, switching information including information used by the connected communication apparatus for wireless communication with the movably configured base station apparatus to be a switching destination candidate for connection,
the communication apparatus includes
an acquisition unit configured to acquire the switching information from a connected based station apparatus from among the plurality of base station apparatuses,
a determination unit configured to determine whether or not to switch a base station apparatus to be a connection destination, and
a connection unit configured to execute, upon determining by the determination unit to switch the base station apparatus, connection to the base station apparatus to be the switching destination candidate on a basis of the switching information.

REFERENCE SIGNS LIST

1 COMMUNICATION SYSTEM
10 MANAGEMENT APPARATUS
20 NON-TERRESTRIAL BASE STATION APPARATUS
30 TERRESTRIAL BASE STATION APPARATUS
40 RELAY APPARATUS
50 COMMUNICATION APPARATUS
60 RELAY STATION
211, 311, 411, 511 RECEPTION PROCESSOR
211a, 511a WIRELESS RECEIVER
211b, 511b DEMULTIPLEXER
211c, 511c DEMODULATOR
211d, 511d DECODER
212, 312, 412, 512 TRANSMISSION PROCESSOR
212a, 512a ENCODER
212b, 512b MODULATOR
212c, 512c MULTIPLEXER
212d, 512d WIRELESS TRANSMITTER
213, 313, 413, 513 ANTENNA
231, 551 ACQUISITION UNIT
232, 555 RECEIVER
233 DISCRIMINATION UNIT
234 SELECTION UNIT
235, 556 TRANSMITTER
552 DETERMINATION UNIT
553 CONNECTION UNIT
554 UPDATE UNIT

What is claimed is:

1. A communication apparatus, comprising:
circuitry configured to:
receive handover-related information from a first base station apparatus, wherein
the handover-related information is used for a handover from the first base station apparatus to a second base station apparatus to be a switching destination candidate;
determine whether to execute the handover, wherein
the determination is based on:
trigger condition information,
a first radio quality between the communication apparatus and the first base station apparatus after the reception of the handover-related information, and
a second radio quality between the communication apparatus and the second base station apparatus after the reception of the handover-related information, and
the trigger condition information indicates at least one of:
a first threshold value related to the first radio quality and a second threshold value related to the second radio quality, or
an offset value related to the first radio quality and the second radio quality;
execute the handover from the first base station apparatus to the second base station apparatus based on the handover-related information and the determination to execute the handover; and
execute connection to the second base station apparatus using a radio resource, wherein
the handover-related information includes resource information related to the radio resource and the trigger condition information.

2. The communication apparatus according to claim 1, wherein
the circuitry is further configured to execute the connection to the second base station apparatus using a dedicated radio resource, and
the resource information includes information regarding the dedicated radio resource that is exclusively assigned to the communication apparatus from the first base station apparatus.

3. The communication apparatus according to claim 1, wherein the circuitry is further configured to:

receive the handover-related information regarding each of a plurality of base station apparatuses to be switching destination candidates; and execute, based on the handover-related information and the determination to execute the handover, the connection to the second base station apparatus selected from the plurality of base station apparatuses.

4. The communication apparatus according to claim 1, wherein the handover-related information further includes update information related to an update condition of the handover-related information, and the circuitry is further configured to update the handover-related information to new handover-related information received from the first base station apparatus upon satisfaction of the update condition.

5. The communication apparatus according to claim 1, wherein the circuitry is further configured to:

receive, from the first base station apparatus, first handover-related information used for switching the connection to the second base station apparatus; and receive, from the first base station apparatus, second handover-related information used for switching the connection to a third base station apparatus to be the switching destination candidate subsequent to the connection with the second base station apparatus.

6. The communication apparatus according to claim 1, wherein the circuitry is further configured to:

measure the first radio quality between the communication apparatus and the first base station apparatus after the reception of the handover-related information, and determine, based on the measured first radio quality between the communication apparatus and the first base station apparatus, whether to execute the handover.

7. A first base station apparatus, comprising:
circuitry configured to:
acquire handover-related information, wherein the handover-related information includes information used by a communication apparatus for a handover from the first base station apparatus to a second base station apparatus to be a switching destination candidate; and transmit the handover-related information to the communication apparatus, wherein the handover-related information is used by the communication apparatus to determine whether to execute the handover, the determination is based on:
trigger condition information,
a first radio quality between the communication apparatus and the first base station apparatus after the acquisition of the handover-related information, and
a second radio quality between the communication apparatus and the second base station apparatus after the acquisition of the handover-related information,
the trigger condition information indicates at least one of:
a first threshold value related to the first radio quality and a second threshold value related to the second radio quality, or
an offset value related to the first radio quality and the second radio quality, and
the handover-related information includes resource information related to a radio resource that is used for connection to the second base station apparatus by the communication apparatus and the trigger condition information.

8. A communication method, comprising:
in a communication apparatus:
receiving handover-related information from a first base station apparatus, wherein
the handover-related information is used for a handover from the first base station apparatus to a second base station apparatus to be a switching destination candidate;
determining whether to execute the handover, wherein the determination is based on:
trigger condition information,
a first radio quality between the communication apparatus and the first base station apparatus after the reception of the handover-related information, and
a second radio quality between the communication apparatus and the second base station apparatus after the reception of the handover-related information, and
the trigger condition information indicates at least one of:
a first threshold value related to the first radio quality and a second threshold value related to the second radio quality, or
an offset value related to the first radio quality and the second radio quality;
executing the handover from the first base station apparatus to the second base station apparatus based on the handover-related information and the determination to execute the handover; and
executing connection to the second base station apparatus using a radio resource, wherein
the handover-related information includes resource information related to the radio resource and the trigger condition information.

9. A communication method, comprising:
in a first base station apparatus:
acquiring handover-related information, wherein the handover-related information includes information used by a communication apparatus for a handover from the first base station apparatus to a second base station apparatus to be a switching destination candidate; and
transmitting the handover-related information to the communication apparatus, wherein
the handover-related information is used by the communication apparatus to determine whether to execute the handover,
the determination is based on:
trigger condition information,
a first radio quality between the communication apparatus and the first base station apparatus after the acquisition of the handover-related information, and
a second radio quality between the communication apparatus and the second base station apparatus after the acquisition of the handover-related information,
the trigger condition information indicates at least one of:
a first threshold value related to the first radio quality and a second threshold value related to the second radio quality, or an offset value related to the first radio quality and the second radio quality, and the handover-related information includes resource information related to a radio resource that is used for connection to the second base station apparatus by the communication apparatus and the trigger condition information.

10. A non-transitory computer-readable medium having stored thereon computer-executable instructions which, when executed by a communication apparatus, cause the communication apparatus to execute operations, the operations comprising:

receiving handover-related information from a first base station apparatus, wherein
the handover-related information is used for a handover from the first base station apparatus to a second base station apparatus to be a switching destination candidate;

determining whether to execute the handover, wherein the determination is based on:
trigger condition information,
a first radio quality between the communication apparatus and the first base station apparatus after the reception of the handover-related information, and
a second radio quality between the communication apparatus and the second base station apparatus after the reception of the handover-related information, and
the trigger condition information indicates at least one of:
a first threshold value related to the first radio quality and a second threshold value related to the second radio quality, or
an offset value related to the first radio quality and the second radio quality;

executing the handover from the first base station apparatus to the second base station apparatus based on the handover-related information and the determination to execute the handover; and executing connection to the second base station apparatus using a radio resource, wherein
the handover-related information includes resource information related to the radio resource and the trigger condition information.

11. A non-transitory computer-readable medium having stored thereon computer-executable instructions which, when executed by a first base station apparatus, cause the first base station apparatus to execute operations, the operations comprising:

acquiring handover-related information, wherein the handover-related information includes information used by a communication apparatus for a handover from the first base station apparatus to a second base station apparatus to be a switching destination candidate; and transmitting the handover-related information to the communication apparatus, wherein
the handover-related information is used by the communication apparatus to determine whether to execute the handover,
the determination is based on:
trigger condition information,
a first radio quality between the communication apparatus and the first base station apparatus after the acquisition of the handover-related information, and
a second radio quality between the communication apparatus and the second base station apparatus after the acquisition of the handover-related information,
the trigger condition information indicates at least one of:
a first threshold value related to the first radio quality and a second threshold value related to the second radio quality, or
an offset value related to the first radio quality and the second radio quality, and
the handover-related information includes resource information related to a radio resource that is used for connection to the second base station apparatus by the communication apparatus and the trigger condition information.

12. A communication system, comprising:
a communication apparatus that is connected to a first base station apparatus of a plurality of base station apparatuses, wherein
the first base station apparatus is configured to:
acquire handover-related information, wherein the handover-related information includes information used by the communication apparatus for a handover from the first base station apparatus to a second base station apparatus of the plurality of base station apparatuses to be a switching destination candidate; and
transmit the handover-related information to the communication apparatus, and
the communication apparatus is configured to:
receive the handover-related information from the first base station apparatus, wherein the handover-related information is used for the handover from the first base station apparatus to the second base station apparatus;
determine whether to execute the handover, wherein the determination is based on:
trigger condition information,
a first radio quality between the communication apparatus and the first base station apparatus after the reception of the handover-related information, and
a second radio quality between the communication apparatus and the second base station apparatus after the reception of the handover-related information, and
the trigger condition information indicates at least one of:
a first threshold value related to the first radio quality and a second threshold value related to the second radio quality, or
an offset value related to the first radio quality and the second radio quality;
execute the handover from the first base station apparatus to the second base station apparatus based on the handover-related information and the determination to execute the handover; and
execute connection to the second base station apparatus using a radio resource, wherein
the handover-related information includes resource information related to the radio resource and the trigger condition information.

* * * * *